(12) United States Patent (10) Patent No.: US 8,027,900 B1
Chaffee (45) Date of Patent: *Sep. 27, 2011

(54) SYSTEM AND METHODS FOR FINANCIAL INSTRUMENT TRADING AND TRADING SIMULATION USING DYNAMICALLY GENERATED TRADESCREENS

(75) Inventor: Arthur Willard Chaffee, Del Mar, CA (US)

(73) Assignee: SummaLP Applications, Inc., Del Mar, CA (US)

( * ) Notice: Subject to any disclaimer, the term of this patent is extended or adjusted under 35 U.S.C. 154(b) by 1636 days.

This patent is subject to a terminal disclaimer.

(21) Appl. No.: 10/150,990

(22) Filed: May 17, 2002

(51) Int. Cl.
*G06Q 40/00* (2006.01)
(52) U.S. Cl. .......................................... 705/37
(58) Field of Classification Search ................ 705/36 R, 705/35, 37, 36 T, 1, 10, 26; 273/256; 463/16, 463/25, 42, 1, 17
See application file for complete search history.

(56) References Cited

U.S. PATENT DOCUMENTS

| | | | |
|---|---|---|---|
| 4,363,489 A | 12/1982 | Chodak et al. | |
| 4,431,195 A | 2/1984 | Brand et al. | |
| 4,799,156 A | 1/1989 | Shavit et al. | |
| 4,856,788 A | 8/1989 | Fischel | |
| 4,913,446 A | 4/1990 | Winkelman | |
| 4,953,085 A | 8/1990 | Atkins | |
| 5,644,727 A | 7/1997 | Atkins | |
| 5,713,793 A | 2/1998 | Holte | |
| 5,819,238 A * | 10/1998 | Fernholz | 705/36 R |
| 5,826,878 A * | 10/1998 | Kiyosaki et al. | 273/256 |
| 5,842,185 A | 11/1998 | Chancey et al. | |
| 5,846,132 A | 12/1998 | Junkin | |
| 5,875,435 A | 2/1999 | Brown | |
| 5,890,963 A | 4/1999 | Yen | |
| 5,903,881 A | 5/1999 | Schrader et al. | |
| 5,911,136 A | 6/1999 | Atkins | |

(Continued)

OTHER PUBLICATIONS

Hypothetical. Merriam-Webster OnLine Thesaurus. Oct. 24, 2009.*

*Primary Examiner* — Olabode Akintola
*Assistant Examiner* — Muriel Tinkler
(74) *Attorney, Agent, or Firm* — Foley & Lardner LLP

(57) ABSTRACT

A financial instruments trading system provides a front end user interface comprising dynamically generated tradescreens that enable the trader to calculate the effects of a hypothetical trade or transfer of a financial instrument on the corresponding portfolio and on aggregate holdings of the financial instrument in that portfolio before the trade or transaction is actually executed. The tradescreens display financial information characterizing the current status of the portfolio and the current status of all holdings of the financial instrument in the portfolio. The tradescreens further include fields for entry of information characterizing the hypothetical trade or transfer, and routines for calculating the revised values of the displayed financial information for the portfolio and the holdings of the financial instrument that reflect changes that will occur in the event that the hypothetical trade or transfer is executed. Each tradescreen further enables the trader to submit the trade or transfer for execution from the tradescreen. The tradescreens are dynamically generated by a server based on portfolio data maintained in a portfolio database, and are customized to the selected financial instrument and the type of action to be taken. The submission of a trade or transfer causes data entered into the tradescreen to be communicated to the server, where the tradescreen calculations are replicated and the portfolio database and a general ledger are updated to reflect the trade or transfer. The server also dynamically generates reports describing various aspects of the portfolio's holdings based on the data stored in the portfolio database.

39 Claims, 119 Drawing Sheets

U.S. PATENT DOCUMENTS

| | | | |
|---|---|---|---|
| 5,934,674 A | 8/1999 | Bukowsky | |
| 5,950,176 A | 9/1999 | Keiser et al. | |
| 5,963,925 A | 10/1999 | Kolling et al. | |
| 6,078,904 A | 6/2000 | Rebane | |
| 6,080,063 A | 6/2000 | Khosla | |
| 6,155,927 A | 12/2000 | Levasseur et al. | |
| 6,173,270 B1 | 1/2001 | Cristofich et al. | |
| 6,175,824 B1 | 1/2001 | Breitzman et al. | |
| 6,371,848 B1 | 4/2002 | Ashby | |
| 6,371,855 B1 | 4/2002 | Gavriloff | |
| 6,687,681 B1 | 2/2004 | Schulz et al. | |
| 6,773,350 B2 | 8/2004 | Yoshimi et al. | |
| 6,939,137 B1 * | 9/2005 | Colaio et al. | 434/107 |
| 7,006,991 B2 | 2/2006 | Keiser et al. | |
| 7,031,937 B2 | 4/2006 | Brown et al. | |
| 7,165,044 B1 | 1/2007 | Chaffee | |
| 2002/0059135 A1 * | 5/2002 | Ma et al. | 705/37 |
| 2002/0194106 A1 * | 12/2002 | Kocher | 705/37 |
| 2003/0101125 A1 * | 5/2003 | McGill et al. | 705/37 |
| 2003/0199319 A1 | 10/2003 | Culbert | |
| 2004/0064395 A1 * | 4/2004 | Mintz et al. | 705/37 |
| 2005/0064937 A1 | 3/2005 | Ballman | |

* cited by examiner 3-2

| Symbol to Action | | | |
|---|---|---|---|
| Company Name | AOL - AMERICA ONLINE | | 3-4 |
| Exchange | NYSE | | |
| Delay | 20 minutes | Shares Outstanding | 2,308,897,000 |
| Last Price | 57.93 at 10:55 EDT | Market Capital | 133,754,403,210 |
| Change | Up 0.83 (+1.45%) | 52 - Week High | 95.81 |
| High | 58.25 at 10:47 EDT | 52 - Week Low | 48.18 |
| Low | 56.38 at 9:43 EDT | Beta | 2.48 |
| Open | 57.03 | Yield | Nil |
| Previous Close | 57.10 on 10/9 | P/E Ration | 120.69 |
| Volume | 3,327,100 | EPS | 0.48 |
| 30 - Day Average Volume | 10,236,000 | Currency Units | US Dollars |

| S / S / S | Calls | Puts | Buy Long Open | Sell Short Open |
|---|---|---|---|---|

3-14  3-12  3-10  3-6  3-8

Stock — 3-16

| | H/P | Date | Days Held | Type | Shares | Share Price (no c & oc) | Market Value | Net Gain/Loss | Net CAGR (pre-tax) |
|---|---|---|---|---|---|---|---|---|---|
| Ⓒ Ⓔ Ⓧ | ☐ | 2/16/2001 | 406 | Long | 500 | 34.87 | 29,315 | 118,749 | 65.60% |
| Ⓒ Ⓔ Ⓧ | ☐ | 9/15/2001 | 195 | Long | 200 | Stk Div | 11,726 | 11,726 | 0.00% |
| Ⓒ Ⓔ Ⓧ | ☐ | 2/16/2001 | 406 | Short | 500 | (34.87) | 29,315 | 118,749 | 65.60% |
| Ⓒ Ⓔ Ⓧ | ☐ | 9/15/2001 | 195 | Short | 200 | (34.87) | 11,726 | 11,726 | 65.60% |
| | | | | | | | Sell to Open | Buy to Open | |

Puts — 3-18

| | H/P | Date Open | Date Expire | Type | Contracts | Price Open | Price Strike | Net Gain/Loss | Net CAGR (pre-tax) |
|---|---|---|---|---|---|---|---|---|---|
| Ⓒ Ⓔ Ⓧ | ☐ | 02/16/01 | 02/16/01 | Long | 10 | 2.50 | 35.50 | 118,749 | 65.60% |
| Ⓒ Ⓔ Ⓧ | ☐ | 09/15/01 | 09/15/01 | Long | 5 | 4.25 | 55.25 | 11,726 | 65.60% |
| Ⓒ Ⓔ Ⓧ | ☐ | 02/16/01 | 02/16/01 | Shrt-Cov | 10 | (2.50) | 45.65 | 118,749 | 65.60% |
| Ⓒ Ⓔ Ⓧ | ☐ | 09/15/01 | 09/15/01 | Shrt-UnCov | 15 | (3.50) | 24.50 | 11,726 | 65.60% |
| | | | | | Sell to Open-Cov | Sell to Open-UnCov | Buy to Open | | |

Calls — 3-20

| | H/P | Date Open | Date Expire | Type | Contracts | Price Open | Price Strike | Net Gain/Loss | Net CAGR (pre-tax) |
|---|---|---|---|---|---|---|---|---|---|
| Ⓒ Ⓔ Ⓧ | ☐ | 02/16/01 | 02/16/01 | LG | 10 | 2.50 | 35.50 | 118,749 | 65.60% |
| Ⓒ Ⓔ Ⓧ | ☐ | 09/15/01 | 09/15/01 | LG | 5 | 4.25 | 55.25 | 11,726 | 65.60% |
| Ⓒ Ⓔ Ⓧ | ☐ | 02/16/01 | 02/16/01 | SH-C | 10 | (2.50) | 45.65 | 118,749 | 65.60% |
| Ⓒ Ⓔ Ⓧ | ☐ | 09/15/01 | 09/15/01 | SH-UC | 15 | (3.50) | 24.50 | 11,726 | 65.60% |
| | | | | | Sell to Open-Cov | Sell to Open-UnCov | Buy to Open | | |

| 4-2 | 4-4 | 4-6 | |
|---|---|---|---|
| Open Positions | Closed Positions | Corporate | Charts |

Holdings & Performance

| Holdings | | | Performance | |
|---|---|---|---|---|
| | Stock | Options | Net Gain/(Loss) b/f Taxes | $ 23,575 |
| Number of Positions | 4 | 3 | Net Gain/(lLoss) Percentage | 134.98% |
| Number of Shares/Contracts | 600.0 | 65 | Average Holding Period (mos) | 10.35 |
| Market Value | | | Net Annualized Return (CAGR) | 129.69% |
| Weighted Average Price | | | Initial Maintenance Requirement | |

Stock

| | H/P | Date | Days Held | Type | Shares | Share Price (no c & oc) | Market Value | Net Gain/Loss | Net CAGR (pre-tax) |
|---|---|---|---|---|---|---|---|---|---|
| ⒸⒺⓍ | ☐ | 02/16/2001 | 438 | Long | 500 | 34.87 | 29,315 | 118,749 | 65.60% |
| ⒸⒺⓍ | ☐ | 09/15/2001 | 227 | Long | 200 | Stk Div | 11,726 | 11,726 | 0.00% |
| ⒸⒺⓍ | ☐ | 02/16/2001 | 438 | Short | 500 | (34.87) | 29,315 | 118,749 | 65.60% |
| ⒸⒺⓍ | ☐ | 09/15/2001 | 227 | Short | 200 | (34.87) | 11,726 | 11,726 | 65.60% |
| | | | | | | Sell to Open | | Buy to Open | |
| | | | | | | 4-12 | | 4-14 | |

Puts

| | H/P | Date Open | Date Expire | Type | Contracts | Price Open | Strike | Net Gain/Loss | Net CAGR (pre-tax) |
|---|---|---|---|---|---|---|---|---|---|
| ⒸⒺⓍ | ☐ | 02/16/01 | 02/16/01 | Long | 10 | 2.50 | 35.50 | 118,749 | 65.60% |
| ⒸⒺⓍ | ☐ | 09/15/01 | 09/15/01 | Long | 5 | 4.25 | 55.25 | 11,726 | 65.60% |
| ⒸⒺⓍ | ☐ | 02/16/01 | 02/16/01 | Shrt-Cov | 10 | (2.50) | 45.65 | 118,749 | 65.60% |
| ⒸⒺⓍ | ☐ | 09/15/01 | 09/15/01 | Shrt-UnCov | 15 | (3.50) | 24.50 | 11,726 | 65.60% |
| | | | | Sell to Open-Cov | | Sell to Open-UnCov | | Buy to Open | |
| | | | | 4-18 | | 4-20 | | 4-22 | |

Calls

| | H/P | Date Open | Date Expire | Type | Contracts | Price Open | Strike | Net Gain/Loss | Net CAGR (pre-tax) |
|---|---|---|---|---|---|---|---|---|---|
| ⒸⒺⓍ | ☐ | 02/16/01 | 02/16/01 | LG | 10 | 2.50 | 35.50 | 118,749 | 65.60% |
| ⒸⒺⓍ | ☐ | 09/15/01 | 09/15/01 | LG | 5 | 4.25 | 55.25 | 11,726 | 65.60% |
| ⒸⒺⓍ | ☐ | 02/16/01 | 02/16/01 | SH-C | 10 | (2.50) | 45.65 | 118,749 | 65.60% |
| ⒸⒺⓍ | ☐ | 09/15/01 | 09/15/01 | SH-UC | 15 | (3.50) | 24.50 | 11,726 | 65.60% |
| | | | | Sell to Open-Cov | | Sell to Open-UnCov | | Buy to Open | |
| | | | | 4-26 | | 4-28 | | 4-30 | |

| Open Positions | Closed Positions | Corporate | Charts |

History & Performance

Holdings

| | Stocks | Options |
|---|---|---|
| Number of Positions | 4 | 3 |
| Number of Shares/Contracts | 600.0 | 65 |

Performance

| | |
|---|---|
| Net Gain/(Loss) b/f Taxes | $ 23,575 |
| Net Gain/(lLoss) Percentage | 134.98% |
| Average Holding Period (mox) | 10.35 |
| Net Annualized Return (CAGR) | 129.69% |

Stock

| | H/P | Date | Days Held | Type | Shares | Share Price Open | Share Price Close | Net Gain/Loss | Net CAGR |
|---|---|---|---|---|---|---|---|---|---|
| ⓤ Ⓔ ⓧ ☐ | | 02/16/2001 | 438 | LG | 500 | 34.87 | 29,315 | 118,749 | 65.60% |
| ⓤ Ⓔ ⓧ ☐ | | 09/15/2001 | 227 | LG | 200 | Stk Div | 11,726 | 11,726 | n/a |
| ⓤ Ⓔ ⓧ ☐ | | 02/16/2001 | 438 | SH | 500 | (34.87) | 29,315 | 118,749 | 65.60% |
| ⓤ Ⓔ ⓧ ☐ | | 09/15/2001 | 227 | SH | 200 | (34.87) | 11,726 | 11,726 | 0.00% |

Puts

| | H/P | Date Close | Date Expire | Type | Contracts | Price Open | Price Close | Net Gain/Loss | Net CAGR |
|---|---|---|---|---|---|---|---|---|---|
| ⓤ Ⓔ ⓧ ☐ | | 02/16/01 | 02/16/01 | LG | 10 | 2.50 | 2.75 | 118,749 | 65.60% |
| ⓤ Ⓔ ⓧ ☐ | | 09/15/01 | 09/15/01 | LG | 5 | 4.25 | 4.50 | 11,726 | 65.60% |
| ⓤ Ⓔ ⓧ ☐ | | 02/16/01 | 02/16/01 | SH-C | 10 | (2.50) | (2.25) | 118,749 | 65.60% |
| ⓤ Ⓔ ⓧ ☐ | | 09/15/01 | 09/15/01 | SH-UC | 15 | (3.50) | (3.25) | 11,726 | 65.60% |

Calls

| | H/P | Date Close | Date Expire | Type | Contracts | Price Open | Price Close | Net Gain/Loss | Net CAGR |
|---|---|---|---|---|---|---|---|---|---|
| ⓤ Ⓔ ⓧ ☐ | | 02/16/01 | 02/16/01 | LG | 10 | 2.50 | 2.75 | 118,749 | 65.60% |
| ⓤ Ⓔ ⓧ ☐ | | 09/15/01 | 09/15/01 | LG | 5 | 4.25 | 4.50 | 11,726 | 65.60% |
| ⓤ Ⓔ ⓧ ☐ | | 02/16/01 | 02/16/01 | SH-C | 10 | (2.50) | (2.25) | 118,749 | 65.60% |
| ⓤ Ⓔ ⓧ ☐ | | 09/15/01 | 09/15/01 | SH-UC | 15 | (3.50) | (3.25) | 11,726 | 65.60% |

Figure 4b

| Open Positions | Closed Positions | Corporate | Charts |
|---|---|---|---|

Dividends — 4-40

| | Date | | Cash | Shares Received | |
|---|---|---|---|---|---|
| | Record | Distribution | Dividend | Number | Symbol |
| Ⓔ Ⓧ | 08/10/00 | 12/15/00 | | 200 | D |
| Ⓔ Ⓧ | 08/10/00 | 12/15/00 | 150.00 | | |

Stock Dividend ** | Cash Dividend *

Stock Splits — 4-42

| | Date | | | Number of Shares | | Price per Share | |
|---|---|---|---|---|---|---|---|
| | Record | Distribution | Split Ratio | Before | After | Before | After |
| Ⓔ Ⓧ | 08/10/00 | 12/15/00 | 2:1 | 100 | 200 | 80.00 | 40.00 |
| Ⓔ Ⓧ | 08/10/00 | 12/15/00 | 1:4 | 100 | 25 | 10.00 | 40.00 |

Stock Split ***

Mergers — 4-44

| | Date | | Share | Shares Received | |
|---|---|---|---|---|---|
| | Record | Effective | Ratio | Number | Symbol |
| Ⓔ Ⓧ | 08/10/00 | 12/15/00 | 2:1 | 200 | D |

Merger ****

**Stock Dividend \*\*** — 4-46

Record Date [08/10/2000]
Distribution Date [12/15/2000]
Symbol [D]
Shares Received [100]

Cancel | Reset | Submit

Cash Dividend \* — 4-48

Record Date [08/10/2000]
Distribution Date [12/15/2000]
Amount [150.00]

Cancel | Reset | Submit

**Stock Split \*\*\*** — 4-50

Record Date [08/10/2000]
Effective Date [12/15/2000]
Split Ratio
Received | Surrendered
[2] | [1]

Cancel | Reset | Submit

**Merger \*\*\*\*** — 4-52

New Symbol [IBM]
Record Date [08/10/2000]
Effective Date [12/15/2000]
Merger Ratio
Received | Surrendered
[2] | [1]

Cancel | Reset | Submit

Figure 4c

| Add Portfolio Administration - Portfolio Information | | |
|---|---|---|
| Portfolio Name | ⬜ 5-2 | |
| Portfolio Type | ⬜ ▼ 5-4 | |
| Brokerage Firm | ⬜ 5-6 | |
| Broker | ⬜ 5-8 | |
| Broker Phone Number | ⬜ 5-10 | |
| | Cancel | Reset | Submit 5-12 |

Figure 5a

| Add Taxable Portfolio Administration | | |
|---|---|---|
| | Financial/Brokerage Statement Tracking Setup | 5-14 |
| | (use selected month-end brokerage statement to enter the following information) | |
| Step 1 | Setup Date - Required | [ ] mm/dd/yyyy |
| | Cash/MMF Balance as of Setup Date | [ ] $ |
| | Margin Payable as of Setup Date | [ ] $ |
| | Interest Earned Year-to-Date as of Setup Date | [ ] $ |
| | Interest Exepnse Year-to-Date as of Setup Date | [ ] $ |
| | Tax Rates Setup - Not Required | 5-16 |
| Step 2 | (rates from your tax preparer)  State  Federal | |
| | Ordinary Income Tax Rates  0.00%  0.00% | |
| | Long-Term Capital Tax Rates  0.00%  0.00% | |
| | | Submit 5-18 |

Figure 5b

| Add Tax-Deferred Portfolio Administration | | | |
|---|---|---|---|
| | Financial/Brokerage Statement Tracking Setup | | 5-20 |
| Step 1 | Setup Date - Required | | mm/dd/yyyy |
| | Cash/MMF Balance as of Setup Date | | $ |
| | Contributions Through Setup Date | | $ |
| | Distributions Through Setup Date | | $ |
| | Tax Rates Setup - Not Required | | 5-22 |
| Step 2 | (rates from your tax preparer) | State | Federal |
| | Ordinary Income Tax Rates | 0.00% | 0.00% |
| | Penalties % Setup - Not Required | | 5-24 |
| | (perecentages from your tax preparer) | State | Federal |
| Step 3 | Contribution Limit Penalty % | 0.00% | 0.00% |
| | Non-Qualified Contribution Limit % | 0.00% | 0.00% |
| | Required Minimum Distribution Penalty % | 0.00% | 0.00% |
| | | | Submit |

Figure 5c 5-26

| Tax Rate and Penalty Percentages Table | | | | |
|---|---|---|---|---|
| | Ordinary Tax Rate | Contribution Limit Penalty % | Non-Qualified Distribution Penalty % | Required Min. Distribution Penalty % |
| IRA-Tradtional | X | X | X | X |
| IRA-Spousal | X | X | X | X |
| IRA-Nondeductible | X | X | X | X |
| PP-IRA | X | X | X | X |
| PP-SEP-Self | X | X | X | X |
| PP-SEP-Employee | X | X | X | X |
| PP-Simple | X | X | X | X |
| PP-Keogh-DB | X | X | X | X |
| PP-Keogh-DC-MP | X | X | X | X |
| PP-Keogh-DC-PS | X | X | X | X |
| PP-Keogh-DC-C | X | X | X | X |
| PP-401k | X | X | X | X |
| IRA-Roth | | X | X | X |
| IRA-Education | | X | X | X |
| PP-TSA403b | X | | X | X |
| PP-Nonqualifed DC | X | | X | X |

Figure 5d

| | A | B | C | D | E | F | G | H | I | J | K | L | M |
|---|---|---|---|---|---|---|---|---|---|---|---|---|---|
| 1 | | | Stock - Long - Buy to Open / Transfer In | | | | | | | | | | |
| 2 | | | | | | | | | | | | | |
| 3 | | | Margin Available % | | 50 | Maintenance Requirement % | | | 25 | | Transfer In | | |
| 4 | | | | | | | | | | | | | |
| 5 | | | | | | | OPEN POSITIONS | | BUY | | AVERAGE / TOTAL | | |
| 6 | | | | | | | | | | | | | |
| 7 | | | Dates | | | | 04/01/2001 | | 05/05/2001 CAL | | | | |
| 8 | | | | | | | | | | | | | |
| 9 | | | Price per Share | | | | $ 4.000 | | $ 6.000 | | $ 5.875 | | |
| 10 | | | | | | | | | | | | | |
| 11 | | | Number of Shares | | | | 100.0 | | 1,500.0 | | 1,600.0 | | |
| 12 | | | | | | | | | | | | | |
| 13 | | | Commissions | | | | $ 100.00 | | $ 10.00 | | $ 110.00 | | |
| 14 | | | | | | | | | | | | | |
| 15 | | | Other Costs | | | | $ 20.00 | | $ 5.00 | | $ 25.00 | | |
| 16 | | | | | | | | | | | | | |
| 17 | | | Bought Settlement | | | | $ 520.00 | | $ 9,015.00 | | $ 9,535.00 | | |
| 18 | | | | | | | | | | | | | |
| 23 | | | Cash Disbursed/Invested | | | | | | $ 3,015.00 | | | | |
| 24 | | | | | | | | | | | | | |
| 25 | | | Cash Required | | | | | | $ . | | | | |
| 26 | | | | | | | | | | | | | |
| 27 | | | PORTFOLIO STATUS: | | | | BEFORE | | AFTER | | | | |
| 28 | | | | | | | | | | | | | |
| 29 | | | Current Buying Power | | | | $ 28,000 | | $ 18,970 | | | | |
| 30 | | | | | | | | | | | | | |
| 31 | | | Cash Available | | | | $ 5,000 | | $ 1,985 | | | | |
| 32 | | | | | | | | | | | | | |
| 33 | | | Equity Utilized | | | | $ 1,000 | | $ 1,000 | | | | |
| 34 | | | | | | | | | | | | | |
| 35 | | | Margin Available | | | | $ 10,000 | | $ 8,500 | | | | |
| 36 | | | | | | | | | | | | | |
| 37 | | | Margin Payable | | | | $ 2,000 | | $ 8,000 | | | | |
| 38 | | | | | | | | | | | | | |
| 39 | | | Calculate Page | | | | | Cancel | | Reset | | Submit | |
| 40 | | | | | | | | | | | | | |

| Stock - Long - Buy to Open / Transfer In |

Buy to Open

| Transaction Code | Description | Debit | Credit |
|---|---|---|---|
| | Cash-Stock Long Open | | 9,000.00 |
| | Cash-Commissions Long Open | | 10.00 |
| | Cash-Other Costs Long Open | | 5.00 |
| | Cash-Position Open Margin Borrowed | 6,000.00 | |
| | Investment | 9,000.00 | |
| | Margin Payable-Position Close Margin Borrowed | | 6,000.00 |
| | Equity | 3,015.00 | |
| | Cash Invested-Stock Long Open (net) | | 3,015.00 |
| | Commissions-Commissions Long Open | 10.00 | |
| | Other Costs-Other Costs Long Open | 5.00 | |
| | | 18,030.00 | 18,030.00 |

Transfer In

| Transaction Code | Description | Debit | Credit |
|---|---|---|---|
| | Cash-Transfer In Costs | | 5.00 |
| | Investment | 9,000.00 | |
| | Equity | | 10.00 |
| | Equity | | 9,000.00 |
| | Commissions-Transfer In Commissions-Costs | 10.00 | |
| | Other Costs-Transfer In Costs | 5.00 | |
| | | 9,015.00 | 9,015.00 |

Figure 9c

| | | | | | | | | |
|---|---|---|---|---|---|---|---|---|
| | Stock - Long - Buy to Open / Transfer In | | | | | | | |
| | Margin Available % | 60 | Maintenance Requirement % | | 25 | | Transfer In | X |
| | | | | OPEN POSITIONS | | TRANSFER IN | AVERAGE / TOTAL | |
| | Dates | | | 04/01/2001 | | 05/05/2001  CAL | | |
| | Price per Share | | $ | 4.000 | $ | 6.000 | $ | 5.875 |
| | Number of Shares | | | 100.0 | | 1,500.0 | | 1,600.0 |
| | Commissions / Transfer In Comm-Costs | | $ | 100.00 | $ | 10.00 | $ | 110.00 |
| | Other Costs / Transfer In Costs | | $ | 20.00 | $ | 5.00 | $ | 25.00 |
| | Bought Settlement / Transfer In | | $ | 520.00 | $ | 9,000.00 | $ | 9,520.00 |
| | Cash Disbursed/Invested | | | | $ | 5.00 | | |
| | Cash Required | | | | $ | . | | |
| | PORTFOLIO STATUS: | | | BEFORE | | AFTER | | |
| | Current Buying Power | | $ | 28,000 | $ | 36,990 | | |
| | Cash Available | | $ | 5,000 | $ | 4,995 | | |
| | Equity Utilized | | $ | 1,000 | $ | 1,000 | | |
| | Margin Available | | $ | 10,000 | $ | 14,500 | | |
| | Margin Payable | | $ | 2,000 | $ | 8,000 | | |
| | Calculate Page | | | | Cancel | Reset | | Submit |

Figure 9d

| | Stock - Long - Sell to Close / Transfer Out | | | | | |
|---|---|---|---|---|---|---|
| | Margin Available % | 50 | Maintenance Requirement % | 25 | Transfer Out | |
| | Term Status: | Long | BOUGHT | SELL | DIFFERENCE/TOTAL | |
| | Dates - Days Held | | 04/05/2000 | 05/05/2001 CAL | 395 | |
| | Price per Share | | $ 10.000 | 15.000 | $ 5.000 | |
| | Number of Shares | | 100.0 | 50.0 | 50.0 | |
| | Commissions | | $ 20.00 | 20.00 | $ 40.00 | |
| | Other Costs | | $ 10.00 | 10.00 | $ 20.00 | |
| | Bought Settlement | | $ 1,030.00 | $ 515.00 | $ 515.00 | |
| | Cash Deposited | | | $ 670.00 | | |
| | PORTFOLIO STATUS: | | BEFORE | AFTER | | |
| | Current Buying Power | | $ 28,000 | $ 28,840 | | |
| | Cash Available | | $ 5,000 | $ 5,670 | | |
| | Equity Utilized | | $ 1,000 | $ 1,000 | | |
| | Margin Available | | $ 10,000 | $ 9,750 | | |
| | Margin Payable | | $ 2,000 | $ 1,950 | | |
| | Calculate Page | | Cancel | Reset | Submit | |

| Stock - Long - Sell to Close / Transfer Out | | | |
|---|---|---|---|

Sell to Close

| Transaction Code | Description | Debit | Credit |
|---|---|---|---|
| | Cash-Stock Long Close | 500.00 | |
| | Cash-Stock Long Gain/Loss | 250.00 | - |
| | Cash-Commission Long Close | | 20.00 |
| | Cash-Other Cost Long Close | | 10.00 |
| | Cash-Position Close Margin Paid | | 50.00 |
| | Investment | | 750.00 |
| | Margin Payable-Position Close Margin Paid | 50.00 | |
| | Cash Invested-Stock Long Close (net) | 620.00 | |
| | Equity | | 370.00 |
| | Commissions-Commissions Long Close | 20.00 | |
| | Other Costs-Other Costs Long Close | 10.00 | |
| | Gains/Losses (Gross) | - | 250.00 |
| | | 1,450.00 | 1,450.00 |

Transfer Out

| Transaction Code | Description | Debit | Credit |
|---|---|---|---|
| | Cash-Transfer Out Costs | | 10.00 |
| | Investment | | 750.00 |
| | Equity | 750.00 | |
| | Commissions-Transfer Out Commissions-Costs | | 20.00 |
| | Other Costs-Transfer Out Costs | 10.00 | |
| | | 760.00 | 780.00 |

Figure 10c

| | Stock - Long - Sell to Close / Transfer Out | | | | | |
|---|---|---|---|---|---|---|
| | Margin Available % | 50 | Maintenance Requirement % | 25 | Transfer Out | ☒ |
| | Term Status: Long | | BOUGHT | TRANSFER OUT | DIFFERENCE/TOTAL | |
| | Dates - Days Held | | 04/05/2000 | 05/05/2001 CAL | 395 | |
| | Price per Share | $ | 10.000 | 15.000 | $ | 5.000 |
| | Number of Shares | | 100.0 | 50.0 | | 50.0 |
| | Commissions / Transfer Out Comm-Costs | $ | 20.00 | 20.00 | $ | 40.00 |
| | Other Costs / Transfer Out Costs | $ | 10.00 | 10.00 | $ | 20.00 |
| | Bought Settlement / Transfer Out | $ | 1,030.00 | $ 750.00 | $ | 280.00 |
| | Cash Disbursed | | | $ 10.00 | | |
| | PORTFOLIO STATUS: | | BEFORE | AFTER | | |
| | Current Buying Power | $ | 28,000 | $ 27,580 | | |
| | Cash Available | $ | 5,000 | $ 4,990 | | |
| | Equity Utilized | $ | 1,000 | $ 1,000 | | |
| | Margin Available | $ | 10,000 | $ 9,800 | | |
| | Margin Payable | $ | 2,000 | $ 1,950 | | |
| | Calculate Page | | Cancel | Reset | Submit | |

Figure 10d

| | | | | | | | |
|---|---|---|---|---|---|---|---|
| Stock - Short - Sell to Open / Transfer In | | | | | | | |
| Equity Utilized % | 50 | | Maintenance % | 30 | | Transfer In | |
| | | | OPEN POSITIONS | SELL | | AVERAGE / TOTAL | |
| Dates | | | 04/01/2001 | 05/06/2001 | CAL | | |
| Price per Share | | $ | 35.000 | $ 40.000 | | $ | 36.667 |
| Number of Shares | | | 200 | 100 | | | 300 |
| Commissions | | $ | 100.00 | $ 50.00 | | $ | 150.00 |
| Other Costs | | $ | 20.00 | $ 10.00 | | $ | 30.00 |
| Gross Sold Receipts | | $ | 7,000.00 | $ 4,000.00 | | $ | 11,000.00 |
| Cash Disbursed - Cash Restricted (Comm / Costs) | | $ | 120.00 | $ 60.00 | | $ | 180.00 |
| Net Sold Receipts / Cash Restricted | | $ | 6,880.00 | $ 3,940.00 | | $ | 10,820.00 |
| Equity Utilized | | | | $ 2,000.00 | | | |
| PORTFOLIO STATUS: | | | BEFORE | AFTER | | | |
| Current Buying Power (assumes 50% initial requirement) | | $ | 28,000 | $ 23,880 | | | |
| Cash Available | | $ | 5,000 | $ 4,940 | | | |
| Equity Utilized | | $ | 1,000 | $ 3,000 | | | |
| Margin Available | | $ | 10,000 | $ 10,000 | | | |
| Margin Payable | | $ | 2,000 | $ 2,000 | | | |
| Calculate Page | | | Cancel | Reset | | Submit | |

Figure 11a

| | A | B | C | D | E | F | G | H | I | J | K | L | M |
|---|---|---|---|---|---|---|---|---|---|---|---|---|---|
| 1 | | Stock - Short - Sell to Open | | | | | | | | | | | |
| 2 | | Equity Utilized % | | 50 | | Maintenance % | | 30 | | Transfer In | | | |
| 3 | | | | | | | | | | | | | |
| 4 | | | | | | | OPEN POSITIONS | | =IF(L3="X","TRANSFER IN","SELL") | | AVERAGE / TOTAL | | |
| 5 | | | | | | | | | | | | | |
| 6 | | | | | | | | | | | | | |
| 7 | | Dates | | | | | 36982 | | 37016 | | | | |
| 8 | | | | X | | | | | | CAL | | | |
| 9 | | Price per Share | | X | | | 4 | | 6 | | =((G9*G11)+(I9*I11))/K11 | | |
| 10 | | | | | | | | | | | | | |
| 11 | | Number of Shares | | X | | | 200 | | 100 | | =I11+G11 | | |
| 12 | | =IF(L3="X","Commissions","Transfer In Comm-Costs","Commissions") | | X | | | 100 | | 50 | | | | |
| 13 | | | | | | | | | | | | | |
| 14 | | =IF(L3="X","Other Costs","Transfer In Costs","Other Costs") | | X | | | 20 | | 10 | | =I13+G13 | | |
| 15 | | | | | | | | | | | | | |
| 16 | | =IF(L3="X","Gross Sold Receipts","Transfer In","Gross Sold Receipts") | | | | | =G9*G11 | | =I9*I11 | | =I15+G15 | | |
| 17 | | | | | | | | | | | | | |
| 18 | | =IF(L3="X","Cash Disbursed (Other Costs)","Cash Restricted Disbursed (Comm / Costs)") | | | | | =G13+G15 | | =IF(L3="X",I15,I13+I15) | | =I17+G17 | | |
| 19 | | | | | | | | | | | | | |
| 20 | | Net Sold Receipts / Cash Restricted | | | | | =G17-G19 | | =IF(L3="X",0,I17,I19) | | =I19+G19 | | |
| 21 | | | | | | | | | | | | | |
| 22 | | Equity Utilized | | | | | | | =I9*I11*(D3/100) | | =I21+G21 | | |
| 23 | | | | | | | | | | | | | |
| 24 | | PORTFOLIO STATUS: | | | | | BEFORE | | AFTER | | | | |
| 25 | | | | | | | | | | | | | |
| 26 | | Current Buying Power (assumes 50% initial requirement) | | | | | =IF(G29-G31+G33<0,0,(G29-G31+G33)/0.5) | | =IF(I29-I31+I33<0,0,(I29-I31+I33)/0.5) | | | | |
| 27 | | | | | | | | | | | | | |
| 28 | | Cash Available | | X | | | 5000 | | =IF(L3="X",G29-I15,G29-I19) | | | | |
| 29 | | | | | | | | | | | | | |
| 30 | | Equity Utilized | | X | | | 1000 | | =G31+I23 | | | | |
| 31 | | | | | | | | | | | | | |
| 32 | | Margin Available | | X | | | 10000 | | =G33 | | | | |
| 33 | | | | | | | | | | | | | |
| 34 | | Margin Payable | | X | | | 2000 | | =G35 | | | | |
| 35 | | | | | | | | | | | | | |
| 36 | | Calculate Page | | | | | Cancel | | Reset | | Submit | | |
| 37 | | | | | | | | | | | | | |
| 38 | | | | | | X - Data supplied from database server | | | | | | | |
| 39 | | | | | | | | | | | | | |

Figure 11b

| Stock - Short - Sell to Open / Transfer In |
|---|

Sell to Open

| Transaction Code | Description | Debit | Credit |
|---|---|---|---|
| | Cash-Restricted | 4,000.00 | |
| | Cash-Restricted-Commission Short Open | | 50.00 |
| | Cash-Restricted-Other Costs Short Open | | 10.00 |
| | Investment | | 4,000.00 |
| | Equity | | |
| | Commissions-Commission Short Open | 50.00 | |
| | Other Costs-Other Costs Short Open | 10.00 | |
| | | 4,060.00 | 4,060.00 |

Transfer In

| Transaction Code | Description | Debit | Credit |
|---|---|---|---|
| | Cash-Restricted | | 4,000.00 |
| | Cash-Transfer In Costs | | 10.00 |
| | Investment | 4,000.00 | |
| | Equity | 50.00 | |
| | Commissions-Transfer In Comm-Costs | | 50.00 |
| | Other Costs-Transfer Out Costs | 10.00 | |
| | | 4,060.00 | 4,060.00 |

Figure 11c

| | | | | | |
|---|---|---|---|---|---|
| Stock - Short - Sell to Open / Transfer In | | | | | |
| Equity Utilized % | 50 | Maintenance % | 30 | Transfer In | ☒ |
| | | OPEN POSITIONS | TRANSFER IN | AVERAGE / TOTAL | |
| Dates | | 04/01/2001 | 05/05/2001 CAL | | |
| Price per Share | | $ 35.000 | $ 40.000 | $ 36.667 | |
| Number of Shares | | 200 | 100 | 300 | |
| Commissions / Transfer In Comm-Costs | | $ 100.00 | $ 50.00 | $ 150.00 | |
| Other Costs / Transfer In Costs | | $ 20.00 | $ 10.00 | $ 30.00 | |
| Gross Sold Receipts / Transfer In | | $ 7,000.00 | $ 4,000.00 | $ 11,000.00 | |
| Cash Disbursed (Other Costs) | | $ 120.00 | $ 10.00 | $ 130.00 | |
| Net Sold Receipts / Cash Restricted | | $ 6,880.00 | $ - | $ 6,880.00 | |
| Equity Utilized | | | $ 2,000.00 | | |
| PORTFOLIO STATUS: | | BEFORE | AFTER | | |
| Current Buying Power (assumes 50% initial requirement) | | $ 28,000 | $ 23,980 | | |
| Cash Available | | $ 5,000 | $ 4,990 | | |
| Equity Utilized | | $ 1,000 | $ 3,000 | | |
| Margin Available | | $ 10,000 | $ 10,000 | | |
| Margin Payable | | $ 2,000 | $ 2,000 | | |
| Calculate Page | | Cancel | Reset | Submit | |

Figure 11d

| | | | | | | | |
|---|---|---|---|---|---|---|---|
| Stock - Short - Buy to Close / Transfer Out | | | | | | | |
| Equity Utilized % | 50 | Maintenance % | | 30 | | Transfer Out | |
| Term Status: | Short | | SOLD | | BUY | DIFFERENCE/TOTAL | |
| Dates - Days Held | | | 04/01/2001 | | 05/05/2001 CAL | 34 | |
| Price per Share | | $ | 40.000 | | 35.000 | $ | 5.000 |
| Number of Shares | | | 100.0 | | 100.0 | | · |
| Commissions | | $ | 50.00 | | 30.00 | $ | 80.00 |
| Other Costs | | $ | 10.00 | | 20.00 | $ | 30.00 |
| Net Sold Receipts / Allocated Basis | | $ | 3,940.00 | $ | 3,940.00 | $ | · |
| Cash Deposited | | | | $ | 290.00 | | |
| PORTFOLIO STATUS: | | | BEFORE | | AFTER | | |
| Current Buying Power (assumes 50% initial requirement) | | $ | 20,000 | $ | 24,780 | | |
| Cash Available | | $ | 5,000 | $ | 5,290 | | |
| Equity Utilized | | $ | 5,000 | $ | 3,000 | | |
| Margin Available | | $ | 10,000 | $ | 10,100 | | |
| Margin Payable | | $ | 2,000 | $ | 1,900 | | |
| Calculate Page | | | Cancel | | Reset | Submit | |

| Stock - Short - Buy to Close / Transfer Out | | | |

Buy to Close

| Transaction Code | Description | Debit | Credit |
|---|---|---|---|
| | Cash-Restricted | | 3,940.00 |
| | Cash-Stock Short Close Restricted Cash | 3,940.00 | |
| | Cash-Stock Short Close | | 4,000.00 |
| | Cash-Stock Gain/Loss | 60.00 | . |
| | Cash-Commission Short Close | | 30.00 |
| | Cash-Other Cost Short Close | | 20.00 |
| | Cash-Position Close Margin Borrowed/Paid | 100.00 | . |
| | Investment | 3,500.00 | |
| | Margin Payable-Position Close Margin Borrowed/Paid | . | 100.00 |
| | Equity | 60.00 | . |
| | Commissions-Commissions Short Close | 30.00 | |
| | Other Costs-Other Costs Short Close | 20.00 | |
| | Gains/Losses (Gross) | . | 60.00 |
| | | 7,710.00 | 8,150.00 |

Transfer Out

| Transaction Code | Description | Debit | Credit |
|---|---|---|---|
| | Cash-Restricted | | 3,940.00 |
| | Cash-Stock Short Close Restricted Cash | 3,940.00 | |
| | Cash-Transfer Out Costs | | 20.00 |
| | Investment | 4,000.00 | |
| | Equity | | 3,970.00 |
| | Commissions-Transfer Out Comm-Costs | | 30.00 |
| | Other Costs-Transfer Out Costs | 20.00 | |
| | | 7,960.00 | 7,960.00 |

Figure 12c

| Stock - Short - Buy to Close / Transfer Out | | | | |
|---|---|---|---|---|
| Equity Utilized % | 50 | Maintenance % | 30 | Transfer Out |
| | | SOLD | TRANSFER OUT | DIFFERENCE/TOTAL |
| Term Status: | Short | | | |
| Dates - Days Held | | 04/01/2001 | 05/05/2001  CAL | 34 |
| Price per Share | | $ 40.000 | 35.000 | $ 5.000 |
| Number of Shares | | 100.0 | 100.0 | - |
| Commissions / Transfer Out Comm-Costs | | $ 50.00 | 30.00 | $ 80.00 |
| Other Costs / Transfer Out Costs | | $ 10.00 | 20.00 | $ 30.00 |
| Net Sold Receipts / Transfer Out | | $ 3,940.00 | $ 3,500.00 | $ 440.00 |
| Cash Disbursed | | | $ 20.00 | |
| PORTFOLIO STATUS: | | BEFORE | AFTER | |
| Current Buying Power (assumes 50% initial requirement) | | $ 20,000 | $ 24,160 | |
| Cash Available | | $ 5,000 | $ 4,980 | |
| Equity Utilized | | $ 5,000 | $ 3,000 | |
| Margin Available | | $ 10,000 | $ 10,100 | |
| Margin Payable | | $ 2,000 | $ 1,900 | |
| Calculate Page | | Cancel | Reset | Submit |

Figure 12d

| | | | | | | | | | | | |
|---|---|---|---|---|---|---|---|---|---|---|---|
| A | B | C | D | E | F | G | H | I | J | K | L |
| | Put - Long - Buy to Open / Transfer In | | | | | | | | | | |
| | | | | | | | | Transfer In | | | |
| | | Strike Price | $ | | 65 | Month Expires | | May | Days Until Expiration | | (85) |
| | | | | | | OPEN POSITIONS | | BUY | | AVERAGE / TOTAL | |
| | | Date | | | | 04/01/2001 | | 05/05/2001 CAL | | | |
| | | Price per Contract | | | | $ 4.000 | | $ 4.500 | | $ 4.167 | |
| | | Number of Contracts | | | | 10.0 | | 5.0 | | 15.0 | |
| | | Commissions | | | | $ 100.00 | | $ 50.00 | | $ 150.00 | |
| | | Other Costs | | | | $ 20.00 | | $ 10.00 | | $ 30.00 | |
| | | Bought Settlement | | | | $ 4,120.00 | | $ 2,310.00 | | $ 6,430.00 | |
| | | Cash Disbursed/Invested | | | | | | $ 2,310.00 | | | |
| | | Cash Required | | | | | | $ 310.00 | | | |
| | | PORTFOLIO STATUS: | | | | BEFORE | | AFTER | | | |
| | | Current Buying Power (assumes 50% initial requirement) | | | | $ 22,000 | | $ 17,380 | | | |
| | | Cash Available | | | | $ 2,000 | | $ (310) | | | |
| | | Equity Utilized | | | | $ 1,000 | | $ 1,000 | | | |
| | | Margin Available | | | | $ 10,000 | | $ 10,000 | | | |
| | | Margin Payable | | | | $ 2,000 | | $ 2,000 | | | |
| | | Calculate Page | | | | Cancel | | Reset | | Submit | |

| Put - Long - Buy to Open / Transfer In | | | |
|---|---|---|---|

Buy to Open

| Transaction Code | Description | Debit | Credit |
|---|---|---|---|
| | Cash-Put Long Open | | 2,250.00 |
| | Cash-Commissions Long Open | | 50.00 |
| | Cash-Other Costs Long Open | | 10.00 |
| | Cash-Position Open Margin Borrowed | | |
| | Investment | 2,250.00 | |
| | Margin Payable-Position Close Margin Borrowed | | |
| | Cash Invested-Call Long Open (net) | | 2,310.00 |
| | Equity | 2,310.00 | |
| | Commissions-Commissions Long Open | 50.00 | |
| | Other Costs-Other Costs Long Open | 10.00 | |
| | | 4,620.00 | 4,620.00 |

Transfer In

| Transaction Code | Description | Debit | Credit |
|---|---|---|---|
| | Cash-Transfer In Costs | | 10.00 |
| | Investment | 2,250.00 | |
| | Equity | | 2,250.00 |
| | Equity | | 50.00 |
| | Commissions-Transfer In Commissions-Costs | 50.00 | |
| | Other Costs-Transfer In Costs | 10.00 | |
| | | 2,310.00 | 2,310.00 |

Figure 13c

| | Put - Long - Buy to Open / Transfer In | | | | | | | | |
|---|---|---|---|---|---|---|---|---|---|
| | | | | | | | Transfer In | | X |
| | Strike Price | $ | 65 | Month Expires | May | | Days Until Expiration | | (85) |
| | | | | OPEN POSITIONS | | TRANSFER IN | | AVERAGE / TOTAL | |
| | Date | | | 04/01/2001 | | 05/05/2001 CAL | | | |
| | Price per Contract | | $ | 4.000 | | 4.500 | $ | 4.167 | |
| | Number of Contracts | | | 10.0 | | 5.0 | | 15.0 | |
| | Commissions / Transfer In Comm-Costs | | $ | 100.00 | | 50.00 | $ | 150.00 | |
| | Other Costs / Transfer In Costs | | $ | 20.00 | | 10.00 | $ | 30.00 | |
| | Bought Settlement / Transfer In | | $ | 4,120.00 | $ | 2,300.00 | $ | 6,420.00 | |
| | Cash Disbursed/Invested | | | | $ | 10.00 | | | |
| | Cash Required | | | | $ | - | | | |
| | PORTFOLIO STATUS: | | | BEFORE | | AFTER | | | |
| | Current Buying Power (assumes 50% initial requirement) | | $ | 22,000 | $ | 21,980 | | | |
| | Cash Available | | $ | 2,000 | $ | 1,990 | | | |
| | Equity Utilized | | $ | 1,000 | $ | 1,000 | | | |
| | Margin Available | | $ | 10,000 | $ | 10,000 | | | |
| | Margin Payable | | $ | 2,000 | $ | 2,000 | | | |
| | Calculate Page | | | | Cancel | | Reset | | Submit |

Figure 13d

| | A | B | C | D | E | F | G | H | I | J | K | L | M | N |
|---|---|---|---|---|---|---|---|---|---|---|---|---|---|---|
| 1 | | | | Put - Long - Sell to Close / Transfer Out | | | | | | | | | | |
| 2 | | | | | | | | | | | | | | |
| 3 | | | | | | | | | | | | Transfer Out | | ☐ |
| 4 | | | | | | | | | | | | | | |
| 5 | | | | Strike Price $ | 65 | Month Expires | | May | | Days Until Expiration | | (85) | | |
| 6 | | | | | | | | | | | | | | |
| 7 | | | | | | | | BOUGHT | | SELL | | DIFFERENCE/TOTAL | | |
| 8 | | | | | | | | | | | | | | |
| 9 | | | | Date | | | | 04/01/2001 | | 05/05/2001 CAL | | 34 | | |
| 10 | | | | | | | | | | | | | | |
| 11 | | | | Price per Contract | | | $ | 15.060 | | 12.010 | $ | (3.050) | | |
| 12 | | | | | | | | | | | | | | |
| 13 | | | | Number of Contracts: | | | | 1.0 | | 1.0 | | - | | |
| 14 | | | | | | | | | | | | | | |
| 15 | | | | Commissions | | | $ | 20.00 | | 12.00 | $ | 32.00 | | |
| 16 | | | | | | | | | | | | | | |
| 17 | | | | Other Costs | | | $ | 10.00 | | 5.00 | $ | 15.00 | | |
| 18 | | | | | | | | | | | | | | |
| 19 | | | | Bought Settlement | | | $ | 1,536.00 | $ | 1,536.00 | $ | - | | |
| 20 | | | | | | | | | | | | | | |
| 33 | | | | Cash Deposited | | | | | $ | 1,184.00 | | | | |
| 34 | | | | | | | | | | | | | | |
| 35 | | | | PORTFOLIO STATUS: | | | | BEFORE | | AFTER | | | | |
| 36 | | | | | | | | | | | | | | |
| 37 | | | | Current Buying Power (assumes 50% initial requirement) | | | $ | 28,000 | $ | 30,368 | | | | |
| 38 | | | | | | | | | | | | | | |
| 39 | | | | Cash Available | | | $ | 5,000 | $ | 6,184 | | | | |
| 40 | | | | | | | | | | | | | | |
| 41 | | | | Equity Utilized | | | $ | 1,000 | $ | 1,000 | | | | |
| 42 | | | | | | | | | | | | | | |
| 43 | | | | Margin Available | | | $ | 10,000 | $ | 10,000 | | | | |
| 44 | | | | | | | | | | | | | | |
| 45 | | | | Margin Payable | | | $ | 2,000 | $ | 2,000 | | | | |
| 46 | | | | | | | | | | | | | | |
| 47 | | | | Calculate Page | | | | Cancel | | Reset | | Submit | | |

| Put - Long - Sell to Close / Transfer Out | | | |
|---|---|---|---|
| | Sell to Close | | |
| Transaction Code | Description | Debit | Credit |
| | Cash-Put Long Close | 1,201.00 | |
| | Cash-Put Long Gain/Loss | 30.00 | |
| | Cash-Commission Long Close | | 12.00 |
| | Cash-Other Cost Long Close | | 5.00 |
| | Cash-Position Close Margin Paid | | - |
| | Investment | | 1,201.00 |
| | Margin Payable-Position Close Margin Paid | - | |
| | Cash Invested-Put Long Close (net) | 5.00 | |
| | Equity | | 5.00 |
| | Commissions-Commissions Long Close | 12.00 | |
| | Other Costs-Other Costs Long Close | 5.00 | |
| | Gains/Losses (Gross) | - | 30.00 |
| | | 1,253.00 | 1,253.00 |
| | Transfer Out | | |
| Transaction Code | Description | Debit | Credit |
| | Cash-Transfer Out Costs | | 5.00 |
| | Investment | | 1,201.00 |
| | Equity | 1,201.00 | |
| | Commissions-Transfer Out Commissions-Costs | | 12.00 |
| | Other Costs-Transfer Out Costs | 5.00 | |
| | | 1,206.00 | 1,218.00 |

Figure 14c

| | | | | | | |
|---|---|---|---|---|---|---|
| Put - Long - Sell to Close / Transfer Out | | | | | | |
| | | | | Transfer Out | | [x] |
| Strike Price $ | 65 | Month Expires | May | Days Until Expiration | | (85) |
| | | | BOUGHT | TRANSFER OUT | DIFFERENCE/TOTAL | |
| Date | | | 04/01/2001 | 05/05/2001 CAL | 34 | |
| Price per Contract | | $ | 15.060 | 12.010 | $ | (3.050) |
| Number of Contracts: | | | 1.0 | 1.0 | - | |
| Commissions / Transfer Out Comm-Costs | | $ | 20.00 | 12.00 | $ | 32.00 |
| Other Costs / Transfer In Costs | | $ | 10.00 | 5.00 | $ | 15.00 |
| Brought Settlement / Transfer Out | | $ | 1,536.00 | $ 1,201.00 | $ | 335.00 |
| Cash Disbursed | | | | $ 5.00 | | |
| PORTFOLIO STATUS: | | | BEFORE | AFTER | | |
| Current Buying Power (assumes 50% initial requirement) | | $ | 28,000 | $ 27,966 | | |
| Cash Available | | $ | 5,000 | $ 4,983 | | |
| Equity Utilized | | $ | 1,000 | $ 1,000 | | |
| Margin Available | | $ | 10,000 | $ 10,000 | | |
| Margin Payable | | $ | 2,000 | $ 2,000 | | |
| Calculate Page | | | Cancel | Reset | Submit | |

Figure 14d

| | | | | | | | |
|---|---|---|---|---|---|---|---|
| | Put - Long - Expired | | | | | | |
| | Strike Price $ | 65 Month Expires | | May | Days Until Expiration | | (85) |
| | | | | BOUGHT | EXPIRED | | DIFFERENCE/TOTAL |
| | Date | | | 01/15/2001 | 05/05/2001 | CAL | 110 |
| | Price per Contract | | $ | 3.000 | | $ | (3.000) |
| | Number of Contracts: | | | 2.0 | 2.0 | | - |
| | Commissions | | $ | 20.00 | | $ | 20.00 |
| | Other Costs | | $ | 10.00 | | $ | 10.00 |
| | Bought Settlement | | $ | 630.00 | n/a | $ | 630.00 |
| | | | | | BEFORE TAXES | | AFTER TAXES |
| | Net (Loss) | | | | $ (630.00) | $ | (441.00) |
| | Net (Loss) Percentage | | | | -100.00% | | -100.00% |
| | Net Annualized Return (CAGR) | | | | -100.00% | | -100.00% |
| | PORTFOLIO STATUS: | | | BEFORE | AFTER | | |
| | Current Buying Power (assumes 50% initial requirement) | | $ | 28,000 | $ 28,000 | | |
| | Cash Available | | $ | 5,000 | $ 5,000 | | |
| | Equity Utilized | | $ | 1,000 | $ 1,000 | | |
| | Margin Available | | $ | 10,000 | $ 10,000 | | |
| | Margin Payable | | $ | 2,000 | $ 2,000 | | |
| | Calculate Page | | | Cancel | Reset | | Submit |

Figure 15a

| | A | B | C | D | E | F | G | H | I | J | K | L | M |
|---|---|---|---|---|---|---|---|---|---|---|---|---|---|
| 1 | | | | | | | | | | | | | |
| 2 | | | Put - Long - Expired | | | | | | | | | | |
| 3 | | | Strike Price $ | X | 65 | Month Exp | X | May | | Days Until Expiration | | =H41-NOW() | |
| 4 | | | | | | | | | | | | | |
| 5 | | | | | | | BOUGHT | | EXPIRED | | DIFFERENCE/TOTAL | | |
| 6 | | | | | | | | | | | CAL | | |
| 7 | | | Date | | | | X | 36982 | 37016 | | | =J7-H7 | |
| 8 | | | | | | | | | | | | | |
| 9 | | | Price per Contract | | | | X | 3.25 | | | | =J9-H9 | |
| 10 | | | | | | | | | | | | | |
| 11 | | | Number of Contracts: | | | | X | 2 | =H11 | | | =H11-J11 | |
| 12 | | | | | | | | | | | | | |
| 13 | | | Commissions | | | | X | 50 | | | | =J13+H13 | |
| 14 | | | | | | | | | | | | | |
| 15 | | | Other Costs | | | | X | 10 | | | | =J15+H15 | |
| 16 | | | | | | | | | | | | | |
| 17 | | | Bought Settlement | | | | | =-((H8*H11*100)+H13+H15) | | | | =H17 | |
| 18 | | | | | | | | | | | | | |
| 19 | | | | | | | | | n/a | | AFTER TAXES | | |
| 20 | | | | | | | | | BEFORE TAXES | | | | |
| 21 | | | Net (Loss) | | | | | | =-H17 | | =-J21-J21*IF(L7>365,L43,L42)) | | |
| 22 | | | | | | | | | | | | | |
| 23 | | | Net (Loss) Percentage | | | | | | -1 | | -1 | | |
| 24 | | | | | | | | | | | | | |
| 25 | | | Net Annualized Return (CAGR) | | | | | | =-((J23+1)^(365.25/(J7-H7))-1 | | =-((J23+1)^(365.25/(J7-H7))-1 | | |
| 26 | | | | | | | | | | | | | |
| 27 | | | PORTFOLIO STATUS: | | | | BEFORE | | AFTER | | | | |
| 28 | | | | | | | | | | | | | |
| 29 | | | Current Buying Power (assumes 50% initial requirement) | | | | =-IF(H31-H33+H35<0,0,(H31-H33+H35)/0.5) | | =-IF(J31-J33+J35<0,0,(J31-J33+J35)/0.5) | | | | |
| 30 | | | | | | | | | | | | | |
| 31 | | | Cash Available | | | | X | 5000 | =H31 | | | | |
| 32 | | | | | | | | | | | | | |
| 33 | | | Equity Utilized | | | | X | 1000 | =H33 | | | | |
| 34 | | | | | | | | | | | | | |
| 35 | | | Margin Available | | | | X | 10000 | =H35 | | | | |
| 36 | | | | | | | | | | | | | |
| 37 | | | Margin Payable | | | | X | 2000 | =H37 | | | | |
| 38 | | | | | | | | | | | | | |
| 39 | | | Calculate Page | | | | | Cancel | Reset | | Submit | | |
| 40 | | | | | | Exp Date | X | 37289 | Taxes: | | | | |
| 41 | | | | | | | | X - Data supplied from database server | Ordinary Income Effective Rate | | X | 0.3 | |
| 42 | | | | | | | | | Long-Term Effective Rate | | X | 0.15 | |
| 43 | | | | | | | | | | | | | |

Figure 15b

| Put - Long - Expired | | | |
|---|---|---|---|
| | Expired | | |
| Transaction Code | Description | Debit | Credit |
| | Cash-Commission Long Expired | | · |
| | Cash-Other Costs Long Expired | | · |
| | Investment | | · |
| | Cash Invested-Put Long Expired | 630.00 | |
| | Equity | | 1,230.00 |
| | Gains/Losses (Gross) | 600.00 | |
| | Commissions-Commissions Long Expired | · | |
| | Other Costs-Orther Costs Lng Expired | · | |
| | | 1,230.00 | 1,230.00 |

Figure 15c

| | Put - Long - Exercise | | | | | |
|---|---|---|---|---|---|---|
| | Margin Available % | 50 | | | | |
| | Strike Price $ | 55 Month Expires | May | Days Until Expiration | | (85) |
| | | | BOUGHT SHARES | EXERCISE-SELL | DIFFERENCE/TOTAL | |
| | Date | | 11/15/2000 | 05/05/2001 CAL | | 171 |
| | Price per Share / Exercise price per Share | | $ 15.060 | 55.0000 | $ | 39.940 |
| | Number of Open Contracts / Exercised | | 1 | 1 | | - |
| | Number of Shares | | 100.0 | 100.0 | | - |
| | Commissions | | $ 20.00 | 12.00 | $ | 32.00 |
| | Other Costs | | $ 10.00 | 5.00 | $ | 15.00 |
| | Bought Settlement | | $ 1,536.00 | $ 1,536.00 | $ | - |
| | Net Gain / (Loss) - Put Option | | | $ (250.00) | | |
| | Net Gain / (Loss) - Stock | | | $ 3,947.00 | | |
| | | | | BEFORE TAXES | AFTER TAXES | |
| | Net Gain / (Loss) - Stock & Option | | | $ 3,697.00 | $ | 2,587.90 |
| | Net Gain / (Loss) Percentage | | | 240.69% | | 168.48% |
| | Net Annualized Return (CAGR) | | | 1271.20% | | 724.43% |
| | Cash Disbursed | | | $ 5,483.00 | | |
| | Margin Paid | | | | | |
| | Cash Deposited | | | $ 5,483.00 | | |
| | PORTFOLIO STATUS: | | BEFORE | AFTER | | |
| | Current Buying Power (assumes 50% initial requirement) | | $ 38,000 | $ 43,766 | | |
| | Cash Available | | $ 10,000 | $ 15,483 | | |
| | Equity Utilized | | $ 1,000 | $ 1,000 | | |
| | Margin Available | | $ 10,000 | $ 7,400 | | |
| | Margin Payable | | $ 2,000 | $ 2,000 | | |
| | Calculate Page | | | Cancel | Reset | Submit |

| Put - Long - Exercise | | | | |
|---|---|---|---|---|
| | | Exercise | | |
| Transaction Code | Description | | Debit | Credit |
| | Cash-Stock Long Close | SS | 1,536.00 | |
| | Cash-Stock Long Gain/Loss | SS | 3,994.00 | |
| | Cash-Commission Long Close | SS | | 12.00 |
| | Cash-Other Cost Long Close | SS | | 5.00 |
| | Cash-Position Close Margin Paid | SS | | |
| | Investment | SS | | 1,536.00 |
| | Margin Payable-Position Close Margin Paid | SS | | |
| | Cash Invested-Stock Long Close (net) | SS | 5,483.00 | |
| | Equity | SS | | 5,483.00 |
| | Commissions-Commissions Long Close | SS | 12.00 | |
| | Other Costs-Other Costs Long Close | SS | 5.00 | |
| | Gains/Losses (Gross) | SS | | 3,994.00 |
| | Investment | P | | 100.00 |
| | Cash Invested-Put Long Expired | P | 250.00 | |
| | Equity | P | | 350.00 |
| | Gains/Losses (Gross) | P | 200.00 | |
| | | | 11,480.00 | 11,480.00 |

Figure 16c

| | | | | | | | | | | |
|---|---|---|---|---|---|---|---|---|---|---|
| A B | C | D | E | F | G | H | I | J | K | L |
| 1 | Call - Long - Buy to Open / Transfer In | | | | | | | | | |
| 2 | | | | | | | | | | |
| 3 | | | | | | | Transfer In | | | |
| 4 | | | | | | | | | | |
| 5 | Strike Price | $ | | 65 | Month Expires | | May | Days Until Expiration | | (85) |
| 6 | | | | | | | | | | |
| 7 | | | | | OPEN POSITIONS | | BUY | | AVERAGE / TOTAL | |
| 8 | | | | | | | | | | |
| 9 | Date | | | | 04/01/2001 | | 05/05/2001 CAL | | | |
| 10 | | | | | | | | | | |
| 11 | Price per Contract | | | $ | 4.000 | $ | 4.500 | $ | 4.167 | |
| 12 | | | | | | | | | | |
| 13 | Number of Contracts | | | | 10.0 | | 5.0 | | 15.0 | |
| 14 | | | | | | | | | | |
| 15 | Commissions | | | $ | 100.00 | $ | 50.00 | $ | 150.00 | |
| 16 | | | | | | | | | | |
| 17 | Other Costs | | | $ | 20.00 | $ | 10.00 | $ | 30.00 | |
| 18 | | | | | | | | | | |
| 19 | Bought Settlement | | | $ | 4,120.00 | $ | 2,310.00 | $ | 6,430.00 | |
| 20 | | | | | | | | | | |
| 25 | Cash Disbursed/Invested | | | | | $ | 1,310.00 | | | |
| 26 | | | | | | | | | | |
| 27 | Cash Required | | | | | $ | - | | | |
| 28 | | | | | | | | | | |
| 29 | PORTFOLIO STATUS: | | | | BEFORE | | AFTER | | | |
| 30 | | | | | | | | | | |
| 31 | Current Buying Power (assumes 50% initial requirement) | | | $ | 22,000 | $ | 17,380 | | | |
| 32 | | | | | | | | | | |
| 33 | Cash Available | | | $ | 2,000 | $ | 690 | | | |
| 34 | | | | | | | | | | |
| 35 | Equity Utilized | | | $ | 1,000 | $ | 1,000 | | | |
| 36 | | | | | | | | | | |
| 37 | Margin Available | | | $ | 10,000 | $ | 9,000 | | | |
| 38 | | | | | | | | | | |
| 39 | Margin Payable | | | $ | 2,000 | $ | 3,000 | | | |
| 40 | | | | | | | | | | |
| 41 | Calculate Page | | | | | Cancel | | Reset | | Submit |
| 42 | | | | | | | | | | |

| Call - Long - Buy to Open / Transfer In | | | |
|---|---|---|---|
| | Buy to Open | | |
| Transaction Code | Description | Debit | Credit |
| | Cash-Call Long Open | | 2,250.00 |
| | Cash-Commissions Long Open | | 50.00 |
| | Cash-Other Costs Long Open | | 10.00 |
| | Cash-Position Open Margin Borrowed | 1,000.00 | |
| | Investment | 2,250.00 | |
| | Margin Payable-Position Close Margin Borrowed | | 1,000.00 |
| | Cash Invested-Call Long Open (net) | | 1,310.00 |
| | Equity | 1,310.00 | |
| | Commissions-Commissions Long Open | 50.00 | |
| | Other Costs-Other Costs Long Open | 10.00 | |
| | | 4,620.00 | 4,620.00 |
| | Transfer In | | |
| Transaction Code | Description | Debit | Credit |
| | Cash-Transfer In Costs | | 1,310.00 |
| | Investment | 2,250.00 | |
| | Equity | | 2,250.00 |
| | Equity | | 50.00 |
| | Commissions-Transfer In Commissions-Costs | 50.00 | |
| | Other Costs-Transfer In Costs | 10.00 | |
| | | 2,310.00 | 3,610.00 |

Figure 17c

| | | | | | | | | | | |
|---|---|---|---|---|---|---|---|---|---|---|
| | A | B | C | D | E | F | G | H | I | J | K | L |
| 1 | Call - Long - Buy to Open / Transfer In | | | | | | | | | | |
| 2 | | | | | | | | | | | |
| 3 | | | | | | | | | Transfer In | | [ x ] |
| 4 | | | | | | | | | | | |
| 5 | Strike Price | $ | [ 85 ] | Month Expires | | | [ May ] | | Days Until Expiration | (85) |
| 6 | | | | | | | | | | | |
| 7 | | | | | | | OPEN POSITIONS | | TRANSFER IN | AVERAGE / TOTAL | |
| 8 | | | | | | | | | | | |
| 9 | Date | | | | | | 04/01/2001 | | 05/05/2001 CAL | | |
| 10 | | | | | | | | | | | |
| 11 | Price per Contract | | | | | $ | 4.000 | $ | 4.500 | $ | 4.167 |
| 12 | | | | | | | | | | | |
| 13 | Number of Contracts | | | | | | 10.0 | | 5.0 | | 15.0 |
| 14 | | | | | | | | | | | |
| 15 | Commissions / Transfer In Comm-Costs | | | | | $ | 100.00 | $ | 50.00 | $ | 150.00 |
| 16 | | | | | | | | | | | |
| 17 | Other Costs / Transfer In Costs | | | | | $ | 20.00 | $ | 10.00 | $ | 30.00 |
| 18 | | | | | | | | | | | |
| 19 | Bought Settlement / Transfer In | | | | | $ | 4,120.00 | $ | 2,300.00 | $ | 6,420.00 |
| 20 | | | | | | | | | | | |
| 25 | Cash Disbursed/Invested | | | | | | | $ | 10.00 | | |
| 26 | | | | | | | | | | | |
| 27 | Cash Required | | | | | | | $ | . | | |
| 28 | | | | | | | | | | | |
| 29 | PORTFOLIO STATUS: | | | | | | BEFORE | | AFTER | | |
| 30 | | | | | | | | | | | |
| 31 | Current Buying Power (assumes 50% initial requirement) | | | | | $ | 22,000 | $ | 19,980 | | |
| 32 | | | | | | | | | | | |
| 33 | Cash Available | | | | | $ | 2,000 | $ | 1,990 | | |
| 34 | | | | | | | | | | | |
| 35 | Equity Utilized | | | | | $ | 1,000 | $ | 1,000 | | |
| 36 | | | | | | | | | | | |
| 37 | Margin Available | | | | | $ | 10,000 | $ | 9,000 | | |
| 38 | | | | | | | | | | | |
| 39 | Margin Payable | | | | | $ | 2,000 | $ | 3,000 | | |
| 40 | | | | | | | | | | | |
| 41 | Calculate Page | | | | | | Cancel | | Reset | | Submit |
| 42 | | | | | | | | | | | |

Figure 17d

| | | | | | | | | |
|---|---|---|---|---|---|---|---|---|
| Call - Long - Sell to Close / Transfer Out | | | | | | | | |
| | | | | | | Transfer Out | | ☐ |
| Strike Price | $ | 65 | Month Expires | May | Days Until Expiration | | (85) | |
| | | | | BOUGHT | SELL | DIFFERENCE/TOTAL | | |
| Date | | | | 04/01/2001 | 05/05/2001 CAL | 34 | | |
| Price per Contract | | | $ | 15.060 | 12.010 | $ | (3.050) | |
| Number of Contracts: | | | | 1 | 1 | - | | |
| Commissions | | | $ | 20.00 | 12.00 | $ | 32.00 | |
| Other Costs | | | $ | 10.00 | 5.00 | $ | 15.00 | |
| Bought Settlement / Allocated Basis | | | $ | 1,536.00 | $ 1,536.00 | $ | - | |
| Cash Deposited | | | | | $ 1,184.00 | | | |
| PORTFOLIO STATUS: | | | | BEFORE | AFTER | | | |
| Current Buying Power (assumes 50% initial requirement) | | | $ | 28,000 | $ 30,368 | | | |
| Cash Available | | | $ | 5,000 | $ 6,184 | | | |
| Equity Utilized | | | $ | 1,000 | $ 1,000 | | | |
| Margin Available | | | $ | 10,000 | $ 10,000 | | | |
| Margin Payable | | | $ | 2,000 | $ 2,000 | | | |
| Calculate Page | | | | Cancel | Reset | Submit | | |

| Call - Long - Sell to Close / Transfer Out | | | |
|---|---|---|---|

Sell to Close

| Transaction Code | Description | Debit | Credit |
|---|---|---|---|
| | Cash-Call Long Close | 1,536.00 | |
| | Cash-Call Long Gain/Loss | . | 305.00 |
| | Cash-Commission Long Close | | 12.00 |
| | Cash-Other Cost Long Close | | 5.00 |
| | Cash-Position Close Margin Paid | | . |
| | Investment | | 1,536.00 |
| | Margin Payable-Position Close Margin Paid | . | |
| | Cash Invested-Call Long Close (net) | 1,184.00 | |
| | Equity | | 1,184.00 |
| | Commissions-Commissions Long Close | 12.00 | |
| | Other Costs-Other Costs Long Close | 5.00 | |
| | Gains/Losses (Gross) | 305.00 | . |
| | | 3,042.00 | 3,042.00 |

Transfer Out

| Transaction Code | Description | Debit | Credit |
|---|---|---|---|
| | Cash-Transfer Out Costs | | 5.00 |
| | Investment | | 1,201.00 |
| | Equity | 1,201.00 | |
| | Commissions-Transfer Out Commissions-Costs | | 12.00 |
| | Other Costs-Transfer Out Costs | 5.00 | |
| | | 1,206.00 | 1,218.00 |

Figure 18c

| | | | | | | | |
|---|---|---|---|---|---|---|---|
| Call - Long - Sell to Close / Transfer Out | | | | | | | |
| | | | | | Transfer Out | | [x] |
| Strike Price | $ | 65 | Month Expires | May | Days Until Expiration | | (85) |
| | | | | BOUGHT | TRANSFER OUT | | DIFFERENCE/TOTAL |
| Date | | | | 04/01/2001 | 05/05/2001 CAL | | 34 |
| Price per Contract | | | $ | 15.060 | 12.010 | $ | (3.050) |
| Number of Contracts: | | | | 1 | 1 | | · |
| Commissions / Transfer Out Comm-Costs | | | $ | 20.00 | 12.00 | $ | 32.00 |
| Other Costs / Transfer Out Costs | | | $ | 10.00 | 5.00 | $ | 15.00 |
| Brought Settlement / Transfer Out | | | $ | 1,536.00 | $ 1,201.00 | $ | 335.00 |
| Cash Disbursed | | | | | $ 5.00 | | |
| PORTFOLIO STATUS: | | | | BEFORE | AFTER | | |
| Current Buying Power (assumes 50% initial requirement) | | | $ | 28,000 | $ 27,990 | | |
| Cash Available | | | $ | 5,000 | $ 4,995 | | |
| Equity Utilized | | | $ | 1,000 | $ 1,000 | | |
| Margin Available | | | $ | 10,000 | $ 10,000 | | |
| Margin Payable | | | $ | 2,000 | $ 2,000 | | |
| Calculate Page | | | | Cancel | Reset | | Submit |

Figure 18d

| | Call - Long - Exercise | | | | | |
|---|---|---|---|---|---|---|
| | Margin Available % | 50 | | | | |
| | Strike Price $ | 50 Month Expires | May | Days Until Expiration | | (85) |
| | | | OPEN POSITIONS | BUY-EXERCISE | | DIFFERENCE/TOTAL |
| | Date | | 11/15/2000 | 05/05/2001 CAL | | |
| | Price per Share / Exercise Price per Share | $ | 60.000 | 50.0000 | $ | 55.000 |
| | Contracts | | 4 | 2 | | 6 |
| | Number of Shares | | 200.0 | 200.0 | | 400.0 |
| | Commissions | $ | 100.00 | 10.00 | | 110.00 |
| | Other Costs | $ | 20.00 | 5.00 | | 25.00 |
| | Bought Settlement | $ | 12,120.00 | $ 10,015.00 | $ | 22,135.00 |
| | Adjusted Basis Price per Share | | | $ 54.00 | | |
| | Margin Borrowed | | | $ 6,000.00 | | |
| | Margin Borrowed % | | | 59.91% | | |
| | Cash Disbursed/Invested | | | $ 4,015.00 | | |
| | Cash Required | | | $ - | | |
| | PORTFOLIO STATUS: | | BEFORE | AFTER | | |
| | Current Buying Power | $ | 38,000 | $ 31,970 | | |
| | Cash Available | $ | 10,000 | $ 5,985 | | |
| | Equity Utilized | $ | 1,000 | $ 1,000 | | |
| | Margin Available | $ | 10,000 | $ 11,000 | | |
| | Margin Payable | $ | 2,000 | $ 8,000 | | |
| | Calculate Page | | Cancel | Reset | | Submit |

| Call - Long - Exercise | | | |
|---|---|---|---|
| | Buy to Open | | |
| Transaction Code | Description | Debit | Credit |
| | Cash-Stock Long Open | SB | 10,000.00 |
| | Cash-Commissions Long Open | SB | 10.00 |
| | Cash-Other Costs Long Open | SB | 5.00 |
| | Cash-Position Open Margin Borrowed | SB 6,000.00 | |
| | Investment | SB 10,000.00 | |
| | Margin Payable-Position Close Margin Borrowed | SB | 6,000.00 |
| | Cash Invested-Stock Long Open (net) | SB | 4,015.00 |
| | Equity | SB 4,015.00 | |
| | Commissions-Commissions Long Open | SB 10.00 | |
| | Other Costs-Other Costs Long Open | SB 5.00 | |
| | Investment | C | 600.00 |
| | Equity | C 600.00 | |
| | | 20,630.00 | 20,630.00 |

Figure 19c

| | Call - Long -Expired | | | | | |
|---|---|---|---|---|---|---|
| | Strike Price $ | 65 Month Expires | May | Days Until Expiration | | (85) |
| | | | BOUGHT | EXPIRED | | DIFFERENCE/TOTAL |
| | Date | | 04/01/2001 | 05/05/2001 | CAL | 34 |
| | Price per Contract | $ | 3.250 | | $ | (3.250) |
| | Number of Contracts: | | 2.0 | 2.0 | | - |
| | Commissions | $ | 50.00 | | $ | 50.00 |
| | Other Costs | $ | 10.00 | | $ | 10.00 |
| | Bought Settlement | $ | 710.00 | n/a | $ | 710.00 |
| | | | | BEFORE TAXES | | AFTER TAXES |
| | Net (Loss) | | | $ (710.00) | $ | (497.00) |
| | Net (Loss) Percentage | | | -100.00% | | -100.00% |
| | Net Annualized Return (CAGR) | | | -100.00% | | -100.00% |
| | PORTFOLIO STATUS: | | BEFORE | AFTER | | |
| | Current Buying Power (assumes 50% initial requirement) | $ | 28,000 | $ 28,000 | | |
| | Cash Available | $ | 5,000 | $ 5,000 | | |
| | Equity Utilized | $ | 1,000 | $ 1,000 | | |
| | Margin Available | $ | 10,000 | $ 10,000 | | |
| | Margin Payable | $ | 2,000 | $ 2,000 | | |
| | Calculate Page | | | Cancel | Reset | Submit |

| Call - Long -Expired | | | |
|---|---|---|---|
| | Expired | | |
| Transaction Code | Description | Debit | Credit |
| | Cash-Commission Long Expired | | - |
| | Cash-Other Costs Long Expired | | - |
| | Investment | | - |
| | Cash Invested-Call Long Expired | 710.00 | |
| | Equity | | 1,360.00 |
| | Gains/Losses (Gross) | 650.00 | |
| | Commissions-Commissions Long Expired | - | |
| | Other Costs-Other Costs Long Expired | - | |
| | | 1,360.00 | 1,360.00 |

Figure 20c

| | | | | | | |
|---|---|---|---|---|---|---|
| Put - Short - Covered - Sell to Open / Transfer In | | | | | | |
| Strike Price $ 25 Month Expires | | May | Transfer In | | | |
| Days Until Expiration (85) | OPEN POSITIONS | | SELL | | AVERAGE / TOTAL | |
| Date | | 04/01/2001 | 05/05/2001 CAL | | | |
| Price per Contract | $ | 4.000 | $ 4.000 | $ | 4.000 | |
| Number of Contracts | | 2 | 1 | | 3 | |
| Short Shares Available | | 600 | 400 | | 300 | |
| Short Shares Utilized | | 200 | 100 a | | 300 | |
| Commissions | $ | 100.00 | $ 50.00 | $ | 150.00 | |
| Other Costs | $ | 20.00 | $ 10.00 | $ | 30.00 | |
| Gross Sold Receipts | $ | 800.00 | $ 400.00 | $ | 1,200.00 | |
| Cash Disbursed (comm-costs) | $ | 120.00 | $ 60.00 | $ | 180.00 | |
| Net Sold Receipts | $ | 680.00 | $ 340.00 | $ | 1,020.00 | |
| PORTFOLIO STATUS: | | BEFORE | AFTER | | | |
| Current Buying Power (assumes 50% initial requirement) | $ | 28,000 | $ 28,680 | | | |
| Cash Available | $ | 5,000 | $ 5,340 | | | |
| Equity Utilized | $ | 1,000 | $ 1,000 | | | |
| Margin Available | $ | 10,000 | $ 10,000 | | | |
| Margin Payable | $ | 2,000 | $ 2,000 | | | |
| Calculate Page | | Cancel | Reset | | Submit | |

| Put - Short - Covered - Sell to Open / Transfer In |
|---|

Sell to Open

| Transaction Code | Description | Debit | Credit |
|---|---|---|---|
| | Cash-Put Short Open | 400.00 | |
| | Cash-Commission Short Open | | 50.00 |
| | Cash-Other Costs Short Open | | 10.00 |
| | Investment | | 400.00 |
| | Commissions-Commission Short Open | 50.00 | |
| | Other Costs-Other Costs Short Open | 10.00 | |
| | | 460.00 | 460.00 |

Transfer In

| Transaction Code | Description | Debit | Credit |
|---|---|---|---|
| | Cash-Transfer In Costs | | 10.00 |
| | Investment | | 400.00 |
| | Equity | 450.00 | |
| | Commissions-Transfer In Comm-Costs | | 50.00 |
| | Other Costs-Transfer Out Costs | 10.00 | |
| | | 460.00 | 460.00 |

Figure 21c

| | | | | | |
|---|---|---|---|---|---|
| Put - Short - Covered - Sell to Open / Transfer In | | | | | |
| Strike Price $ 25 Month Expires | | May | Transfer In | | |
| Days Until Expiration | (85) | OPEN POSITIONS | TRANSFER IN | AVERAGE / TOTAL | |
| Date | | 04/01/2001 | 05/05/2001 CAL | | |
| Price per Contract | $ | 4.000 | $ 4.000 | $ | 4.000 |
| Number of Contracts | | 2 | 1 | | 3 |
| Short Shares Available | | 600 | 400 | | 300 |
| Short Shares Utilized | | 200 | 100 a | | 300 |
| Commissions / Transfer In Comm-Costs | $ | 100.00 | $ 50.00 | $ | 150.00 |
| Other Costs / Transfer In Costs | $ | 20.00 | $ 10.00 | $ | 30.00 |
| Gross Sold Receipts / Transfer In | $ | 800.00 | $ 400.00 | $ | 1,200.00 |
| Cash Disbursed (comm-costs) / Transfer In Costs | $ | 120.00 | $ 10.00 | $ | 130.00 |
| Net Sold Receipts | $ | 680.00 | n/a | $ | 680.00 |
| PORTFOLIO STATUS: | | BEFORE | AFTER | | |
| Current Buying Power (assumes 50% initial requirement) | $ | 28,000 | $ 27,980 | | |
| Cash Available | $ | 5,000 | $ 4,990 | | |
| Equity Utilized | $ | 1,000 | $ 1,000 | | |
| Margin Available | $ | 10,000 | $ 10,000 | | |
| Margin Payable | $ | 2,000 | $ 2,000 | | |
| Calculate Page | | Cancel | Reset | Submit | |

Figure 21d

| | | | | | | |
|---|---|---|---|---|---|---|
| Put - Short - Covered - Buy to Close / Transfer Out | | | | | | |
| Strike Price $ | 25 Month Expires | | May | Transfer Out | | |
| Days Until Expiration | | (85) | SOLD | BUY | | DIFFERENCE/TOTAL |
| Date | | | 04/01/2001 | 05/05/2001 | CAL | 34 |
| Price per Contract | | $ | 4.000 | 4.000 | $ | |
| Number of Contracts: | | | 2 | | | 1 |
| Short Shares Utilized / Released | | | 200.0 | 100.0 | | 100.00 |
| Commissions | | $ | 10.00 | 12.00 | $ | 22.00 |
| Other Costs | | $ | 5.00 | 5.00 | $ | 10.00 |
| Net Sold Receipts / Allocated Basis | | $ | 785.00 | $ 392.50 | $ | 392.50 |
| Net Cash Disbursed | | | | $ 217.00 | | |
| PORTFOLIO STATUS: | | | BEFORE | AFTER | | |
| Current Buying Power (assumes 50% initial requirement) | | $ | 20,000 | $ 19,166 | | |
| Cash Available | | $ | 5,000 | $ 4,783 | | |
| Equity Utilized | | $ | 5,000 | $ 5,000 | | |
| Margin Available | | $ | 10,000 | $ 9,800 | | |
| Margin Payable | | $ | 2,000 | $ 2,200 | | |
| Calculate Page | | | Cancel | Reset | | Submit |

| Put - Short - Covered - Buy to Close / Transfer Out | | | |

Buy to Close

| Transaction Code | Description | Debit | Credit |
|---|---|---|---|
| | Cash-Put Short Close | | 400.00 |
| | Cash-Put Short Gain/Loss | 7.50 | . |
| | Cash-Commission Short Close | | 12.00 |
| | Cash-Other Cost Short Close | | 5.00 |
| | Cash-Position Close Margin Borrowed | 200.00 | |
| | Investment | 400.00 | |
| | Margin Payable-Position Close Margin Borrowed | | 200.00 |
| | Commissions-Commissions Short Close | 12.00 | |
| | Other Costs-Other Costs Short Close | 5.00 | |
| | Gains/Losses (Gross) | . | 7.50 |
| | | 624.50 | 624.50 |

Transfer Out

| Transaction Code | Description | Debit | Credit |
|---|---|---|---|
| | Cash-Other Cost Short Close | | 5.00 |
| | Investment | 400.00 | |
| | Equity | | 388.00 |
| | Commissions-Transfer Out Comm-Costs | | 12.00 |
| | Other Costs-Transfer Out Costs | 5.00 | |
| | | 405.00 | 405.00 |

Figure 22c

| | A | B | C | D | E | F | G | H | I | J | K | L | M |
|---|---|---|---|---|---|---|---|---|---|---|---|---|---|
| 1 | | | | Put - Short - Covered - Buy to Close / Transfer Out | | | | | | | | | |
| 2 | | | | | | | | | | | | | |
| 3 | | | | Strike Price $ | | 25 Month Expires | | May | | Transfer Out | X | | |
| 4 | | | | | | | | | | | | | |
| 5 | | | | Days Until Expiration | | | (85) | SOLD | | TRANSFER OUT | | DIFFERENCE/TOTAL | |
| 6 | | | | | | | | | | | | | |
| 7 | | | | Date | | | | 04/01/2001 | | 05/05/2001 CAL | | 34 | |
| 8 | | | | | | | | | | | | | |
| 9 | | | | Price per Contract | | | | $ 4.000 | | 4.000 | | $ | |
| 10 | | | | | | | | | | | | | |
| 11 | | | | Number of Contracts: | | | | 2 | | 1 | | 1 | |
| 12 | | | | | | | | | | | | | |
| 13 | | | | Short Shares Utilized / Released | | | | 200.0 | | 100.0 | | 100.00 | |
| 14 | | | | | | | | | | | | | |
| 15 | | | | Commissions / Transfer Out Comm-Costs | | | | $ 10.00 | | 12.00 | | $ 22.00 | |
| 16 | | | | | | | | | | | | | |
| 17 | | | | Other Costs / Transfer Out Costs | | | | $ 5.00 | | 5.00 | | $ 10.00 | |
| 18 | | | | | | | | | | | | | |
| 19 | | | | Net Sold Receipts / Transfer Out Value | | | | $ 785.00 | $ | 400.00 | | $ 385.00 | |
| 20 | | | | | | | | | | | | | |
| 33 | | | | Net Cash Disbursed | | | | | $ | 5.00 | | | |
| 34 | | | | | | | | | | | | | |
| 35 | | | | PORTFOLIO STATUS: | | | | BEFORE | | AFTER | | | |
| 36 | | | | | | | | | | | | | |
| 37 | | | | Current Buying Power (assumes 50% initial requirement) | | | | $ 20,000 | $ | 19,590 | | | |
| 38 | | | | | | | | | | | | | |
| 39 | | | | Cash Available | | | | $ 5,000 | $ | 4,995 | | | |
| 40 | | | | | | | | | | | | | |
| 41 | | | | Equity Utilized | | | | $ 5,000 | $ | 5,000 | | | |
| 42 | | | | | | | | | | | | | |
| 43 | | | | Margin Available | | | | $ 10,000 | $ | 9,800 | | | |
| 44 | | | | | | | | | | | | | |
| 45 | | | | Margin Payable | | | | $ 2,000 | $ | 2,200 | | | |
| 46 | | | | | | | | | | | | | |
| 47 | | | | Calculate Page | | | | Cancel | | Reset | | Submit | |
| 48 | | | | | | | | | | | | | |

Figure 22d

| | | | | | | |
|---|---|---|---|---|---|---|
| | | | | | | |

Put - Short - Covered - Exercise

| | | | | |
|---|---|---|---|---|
| Strike Price $ | 25 | Month Expires | May | Stock Margin Available % | 50 |
| Days Until Expiration | | (86) | SOLD SHARES-COV | EXERCISED-BUY | DIFFERENCE/TOTAL |
| Date | | | 11/15/2000 | 05/05/2001 CAL | 171 |
| Sold/Exercise Price per Share | | | $ 30.000 | 25.0000 | $ (5.000) |
| Number of Contracts | | | 2.0 | 1.0 | 1.0 |
| Number of Shares | | | 200.0 | 100.0 | 100.0 |
| Commissions | | | $ 100.00 | 50.00 | 150.00 |
| Other Costs | | | $ 20.00 | 10.00 | 30.00 |
| Net Sold Receipts / Allocated Basis | | | $ 5,880.00 | $ 2,940.00 | $ 2,940.00 |
| Net Gain / (Loss) - Put Option | | | | $ 370.00 | |
| Net Gain / (Loss) - Stock | | | | $ 500.00 | |
| | | | | BEFORE TAXES | AFTER TAXES |
| Net Gain / (Loss) - Stock & Option | | | | $ 870.00 | $ 609.00 |
| Net Gain / (Loss) Percentage | | | | 33.85% | 23.70% |
| Net Annualized Return (CAGR) | | | | 86.41% | 57.50% |
| Bought Settlement | | | | $ 2,440.00 | |
| Margin Borrowed | | | | $ -1,000.00 | |
| Net Cash Disbursed | | | | $ 1,440.00 | |
| PORTFOLIO STATUS: | | | BEFORE | AFTER | |
| Current Buying Power (assumes 50% initial requirement) | | | $ 20,000 | $ 16,520 | |
| Cash Available | | | $ 5,000 | $ 3,560 | |
| Equity Utilized | | | $ 5,000 | $ 4,300 | |
| Margin Available | | | $ 10,000 | $ 9,000 | |
| Margin Payable | | | $ 2,000 | $ 3,000 | |
| Calculate Page | | | Cancel | Reset | Submit |

| Put - Short - Covered - Exercise | | | |
|---|---|---|---|
| | Exercise | | |
| Transaction Code | Description | Debit | Credit |
| | Cash-Stock Long Open | SB | 2,500.00 |
| | Cash-Commissions Long Open | SB | 50.00 |
| | Cash-Other Costs Long Open | SB | 10.00 |
| | Cash-Position Open Margin Borrowed | SB 1,000.00 | |
| | Investment | SB 2,500.00 | |
| | Margin Payable-Position Close Margin Borrowed | SB | 1,000.00 |
| | Equity | SB 2,190.00 | |
| | Cash Invested-Stock Long Open (net) | SB | 2,190.00 |
| | Commissions-Commissions Long Open | SB 50.00 | |
| | Other Costs-Other Costs Long Open | SB 10.00 | |
| | Investment | P | 300.00 |
| | Equity | P | 100.00 |
| | Gains/Losses (Gross) | P 400.00 | |
| | | 5,750.00 | 5,750.00 |

Figure 23c

| | | | | | |
|---|---|---|---|---|---|
| Put - Short - Covered - Expired | | | | | |
| Strike Price $ | 25 Month Expires | May | Days Until Expiration | | (85) |
| | | SOLD | EXPIRED | | DIFFERENCE/TOTAL |
| Date | | 04/01/2001 | 05/05/2001 | CAL | 34 |
| Price per Contract | $ | 4.000 | | $ | 4.000 |
| Number of Contracts: | | 6.0 | 6.0 | | - |
| Short Shares Utilized / Released | | 600.0 | 600.0 | | - |
| Commissions | $ | 50.00 | $ - | $ | 50.00 |
| Other Costs | $ | 10.00 | $ - | $ | 10.00 |
| Net Sold Receipts | $ | 2,340.00 | n/a | $ | 2,340.00 |
| | | | BEFORE TAXES | | AFTER TAXES |
| Net Gain | | | $ 2,340.00 | $ | 1,638.00 |
| Net Gain Percentage | | | -100.00% | | 70.00% |
| Net Annualized Return (CAGR) | | | -100.00% | | 29797.26% |
| PORTFOLIO STATUS: | | BEFORE | AFTER | | |
| Current Buying Power (assumes 50% initial requirement) | $ | 20,000 | $ 20,000 | | |
| Cash Available | $ | 5,000 | $ 5,000 | | |
| Equity Utilized | $ | 5,000 | $ 5,000 | | |
| Margin Available | $ | 10,000 | $ 10,000 | | |
| Margin Payable | $ | 2,000 | $ 2,000 | | |
| Calculate Page | | Cancel | Reset | | Submit |

| Put - Short - Covered - Expired | | | |
|---|---|---|---|
| Transaction Code | Description | Debit | Credit |
| | Expired | | |
| | Cash-Commission Short Expired | | - |
| | Cash-Other Costs Short Expired | | - |
| | Investment | | 2,700.00 |
| | Equity | 300.00 | - |
| | Gains/Losses (Gross) | 2,400.00 | |
| | Commissions-Commissions Short Expired | - | |
| | Other Costs-Orther Costs Short Expired | - | |
| | | 2,700.00 | 2,700.00 |

Figure 24c

| | | | | | |
|---|---|---|---|---|---|
| Put - Short - Uncovered - Sell to Open / Transfer In | | | | | |
| Strike Price $ | 50 | Month Expires | May | Transfer In | |
| Cash Min Req $ | 500 | In Money Maint % | 15 | Out Money Maint % | 25 |
| Days Until Expiration | (85) | OPEN POSITIONS | | SELL | AVERAGE / TOTAL |
| Date | | 04/01/2001 | | 05/05/2001 CAL | |
| Price per Contract | | $ 3.000 | | $ 3.000 | $ 3.000 |
| Number of Contracts | | 2 | | 1 | 3 |
| Commissions | | $ 100.00 | | $ 50.00 | $ 150.00 |
| Other Costs | | $ 20.00 | | $ 10.00 | $ 30.00 |
| Gross Sold Receipts | | $ 600.00 | | $ 300.00 | $ 900.00 |
| Cash Disbursed (comm-costs) | | $ 120.00 | | $ 60.00 | $ 180.00 |
| Net Sold Receipts | | $ 480.00 | | 240.00 | $ 720.00 |
| Equity Utilized | | | | 1,300.00 | |
| Cash / Margin Required | | | | $ - | |
| PORTFOLIO STATUS: | | BEFORE | | AFTER | |
| Current Buying Power (assumes 50% initial requirement) | | $ 28,000 | | $ 25,880 | |
| Cash Available | | $ 5,000 | | $ 5,240 | |
| Equity Utilized | | $ 1,000 | | $ 2,300 | |
| Margin Available | | $ 10,000 | | $ 10,000 | |
| Margin Payable | | $ 2,000 | | $ 2,000 | |
| Calculate Page | | | Cancel | Reset | Submit |

Put - Short - Uncovered - Sell to Open / Transfer In

Sell to Open

| Transaction Code | Description | Debit | Credit |
|---|---|---|---|
| | Cash-Call Short Open | 300.00 | |
| | Cash-Commission Short Open | | 50.00 |
| | Cash-Other Costs Short Open | | 10.00 |
| | Investment | | 300.00 |
| | Commissions-Commission Short Open | 50.00 | |
| | Other Costs-Other Costs Short Open | 10.00 | |
| | | 360.00 | 360.00 |

Transfer In

| Transaction Code | Description | Debit | Credit |
|---|---|---|---|
| | Cash-Transfer In Costs | | 10.00 |
| | Investment | | 350.00 |
| | Equity | 400.00 | |
| | Commissions-Transfer In Comm-Costs | | 50.00 |
| | Other Costs-Transfer Out Costs | 10.00 | |
| | | 410.00 | 410.00 |

Figure 25c

| | | | | | | |
|---|---|---|---|---|---|---|
| Put - Short - Uncovered - Sell to Open / Transfer In | | | | | | |
| Strike Price $ | 50 | Month Expires | May | Transfer In | x | |
| Cash Min Req $ | 500 | In Money Maint % | 15 | Out Money Maint % | 25 | |
| Days Until Expiration | | (85) | OPEN POSITIONS | TRANSFER IN | AVERAGE / TOTAL | |
| Date | | | 04/01/2001 | 05/05/2001 CAL | | |
| Price per Contract | | $ | 3.000 | $ 3.000 | $ | 3.000 |
| Number of Contracts | | | 2 | 1 | | 3 |
| Commissions / Transfer In Comm-Costs | | $ | 100.00 | $ 50.00 | $ | 150.00 |
| Other Costs / Transfer In Costs | | $ | 20.00 | $ 10.00 | $ | 30.00 |
| Gross Sold Receipts / Transfer In | | $ | 600.00 | $ 300.00 | $ | 900.00 |
| Cash Disbursed (comm-costs) / Transfer In Costs | | $ | 120.00 | $ 10.00 | $ | 130.00 |
| Net Sold Receipts | | $ | 480.00 | n/a | $ | 480.00 |
| Equity Utilized | | | | 1,300.00 | | |
| Cash / Margin Required | | | | $ - | | |
| PORTFOLIO STATUS: | | | BEFORE | AFTER | | |
| Current Buying Power (assumes 50% initial requirement) | | $ | 28,000 | $ 25,380 | | |
| Cash Available | | $ | 5,000 | $ 4,990 | | |
| Equity Utilized | | $ | 1,000 | $ 2,300 | | |
| Margin Available | | $ | 10,000 | $ 10,000 | | |
| Margin Payable | | $ | 2,000 | $ 2,000 | | |
| Calculate Page | | | Cancel | Reset | Submit | |

Figure 25d

| | | | | | | |
|---|---|---|---|---|---|---|
| Put - Short - Uncovered - Buy to Close / Transfer Out | | | | | | |
| Strike Price $ | 50 | Month Expires | May | Transfer Out | | |
| Cash Min Req $ | 500 | In Money Maint % | 15 | Out Money Main % | | 25 |
| Days Until Expiration | | (85) | SOLD | BUY | | DIFFERENCE/TOTAL |
| Date | | | 04/01/2001 | 05/05/2001 | CAL | 34 |
| Price per Contract | | | $ 3.000 | 3.000 | $ | - |
| Number of Contracts: | | | 1 | 1 | | - |
| Commissions | | | $ 50.00 | 50.00 | $ | 100.00 |
| Other Costs | | | $ 10.00 | 10.00 | $ | 20.00 |
| Net Sold Receipts / Allocated Basis | | | $ 240.00 | $ 240.00 | $ | - |
| Net Cash Disbursed | | | | $ 160.00 | | |
| PORTFOLIO STATUS: | | | BEFORE | AFTER | | |
| Current Buying Power (assumes 50% initial requirement) | | | $ 12,000 | $ 13,380 | | |
| Cash Available | | | $ 5,000 | $ 4,840 | | |
| Equity Utilized | | | $ 9,000 | $ 7,950 | | |
| Margin Available | | | $ 10,000 | $ 9,800 | | |
| Margin Payable | | | $ 2,000 | $ 2,200 | | |
| Calculate Page | | | Cancel | Reset | | Submit |

| Put - Short - Uncovered - Buy to Close / Transfer Out | | | |
|---|---|---|---|

Buy to Close

| Transaction Code | Description | Debit | Credit |
|---|---|---|---|
| | Cash-Put Short Close | | 300.00 |
| | Cash-Put Short Gain/Loss | 60.00 | - |
| | Cash-Commission Short Close | | 50.00 |
| | Cash-Other Cost Short Close | | 10.00 |
| | Cash-Position Close Margin Borrowed | 200.00 | |
| | Investment | 300.00 | |
| | Margin Payable-Position Close Margin Borrowed | | 200.00 |
| | Commissions-Commissions Short Close | 50.00 | |
| | Other Costs-Other Costs Short Close | 10.00 | |
| | Gains/Losses (Gross) | - | 60.00 |
| | | 620.00 | 620.00 |

Transfer Out

| Transaction Code | Description | Debit | Credit |
|---|---|---|---|
| | Cash-Other Cost Short Close | | 10.00 |
| | Investment | 300.00 | |
| | Equity | | 250.00 |
| | Commissions-Transfer Out Comm-Costs | | 50.00 |
| | Other Costs-Transfer Out Costs | 10.00 | |
| | | 310.00 | 310.00 |

Figure 26c

| | | | | | | | |
|---|---|---|---|---|---|---|---|
| Put - Short - Uncovered - Buy to Close / Transfer Out | | | | | | | |
| Strike Price $ | 50 | Month Expires | May | Transfer Out | | | |
| Cash Min Req $ | 500 | In Money Maint % | 15 | Out Money Main % | | | 25 |
| Days Until Expiration | | (85) | SOLD | TRANSFER OUT | | DIFFERENCE/TOTAL | |
| Date | | | 04/01/2001 | 05/05/2001 | CAL | | 34 |
| Price per Contract | | | $ 3.000 | 3.000 | $ | | - |
| Number of Contracts: | | | 1 | 1 | | | - |
| Commissions / Transfer Out Comm-Costs | | | $ 50.00 | 50.00 | $ | | 100.00 |
| Other Costs / Transfer Out Costs | | | $ 10.00 | 10.00 | $ | | 20.00 |
| Net Sold Receipts / Transfer Out Value | | | $ 240.00 | $ 300.00 | $ | | (60.00) |
| Net Cash Disbursed | | | | $ 10.00 | | | |
| PORTFOLIO STATUS: | | | BEFORE | AFTER | | | |
| Current Buying Power (assumes 50% initial requirement) | | | $ 12,000 | $ 13,680 | | | |
| Cash Available | | | $ 5,000 | $ 4,990 | | | |
| Equity Utilized | | | $ 9,000 | $ 7,950 | | | |
| Margin Available | | | $ 10,000 | $ 9,800 | | | |
| Margin Payable | | | $ 2,000 | $ 2,200 | | | |
| Calculate Page | | | Cancel | Reset | | | Submit |

Figure 26d

| | A | B | C | D | E | F | G | H | I | J | K | L | M |
|---|---|---|---|---|---|---|---|---|---|---|---|---|---|
| 1 | | | | Put - Short - Uncovered - Exercise | | | | | | | | | |
| 2 | | | | | | | | | | | | | |
| 3 | | | | Strike Price $ | | 50 Month Expires | | May | | Stock Equity Utilized % | | 50 | |
| 4 | | | | | | | | | | | | | |
| 5 | | | | Cash Min Req $ | | 500 In Money Maint % | | 15 | | Out Money Main % | | 25 | |
| 6 | | | | | | | | | | | | | |
| 7 | | | | Days Until Expiration | | | (85) | OPEN SHARES | | EXERCISED-BUY | | AVERAGE/TOTAL | |
| 8 | | | | | | | | | | | | | |
| 9 | | | | Date | | | | 03/12/2001 | | 03/12/2001 CAL | | | |
| 10 | | | | | | | | | | | | | |
| 11 | | | | Price per Share / Exercise Price per Share | | | | $ 70.000 | | $ 50.000 | | $ 62.333 | |
| 12 | | | | | | | | | | | | | |
| 13 | | | | Number of Contracts | | | | 4 | | 1 | | 3 | |
| 14 | | | | | | | | | | | | | |
| 15 | | | | Number of Shares | | | | 200.0 | | 100.0 | | 300.0 | |
| 16 | | | | | | | | | | | | | |
| 17 | | | | Commissions | | | | $ 50.00 | | 50.00 | | $ 100.000 | |
| 18 | | | | | | | | | | | | | |
| 19 | | | | Other Costs | | | | $ 10.00 | | 10.00 | | $ 20.000 | |
| 20 | | | | | | | | | | | | | |
| 21 | | | | Bought Settlement | | | | $ 14,060.00 | | $ 5,060.00 | | $ 19,120.000 | |
| 22 | | | | | | | | | | | | | |
| 23 | | | | Margin Borrowed | | | | | | $ 2,000.00 | | | |
| 24 | | | | | | | | | | | | | |
| 25 | | | | Net Cash Dispursed | | | | | | $ 3,060.00 | | | |
| 26 | | | | | | | | | | | | | |
| 27 | | | | PORTFOLIO STATUS: | | | | BEFORE | | AFTER | | | |
| 28 | | | | | | | | | | | | | |
| 29 | | | | Current Buying Power (assumes 50% initial requirement) | | | | $ 20,000 | | $ 17,980 | | | |
| 30 | | | | | | | | | | | | | |
| 31 | | | | Cash Available | | | | $ 5,000 | | $ 1,940 | | | |
| 32 | | | | | | | | | | | | | |
| 33 | | | | Equity Utilized | | | | $ 5,000 | | $ 3,950 | | | |
| 34 | | | | | | | | | | | | | |
| 35 | | | | Margin Available | | | | $ 10,000 | | $ 11,000 | | | |
| 36 | | | | | | | | | | | | | |
| 37 | | | | Margin Payable | | | | $ 2,000 | | $ 4,000 | | | |
| 38 | | | | | | | | | | | | | |
| 39 | | | | Calculate Page | | | | Cancel | | Reset | | Submit | |

| Put - Short - Uncovered - Exercise | | | |
|---|---|---|---|

| | Exercise | | |
|---|---|---|---|
| Transaction Code | Description | Debit | Credit |
| | Cash-Stock Long Open | SB | 5,000.00 |
| | Cash-Commissions Long Open | SB | 50.00 |
| | Cash-Other Costs Long Open | SB | 10.00 |
| | Cash-Position Open Margin Borrowed | SB 2,000.00 | |
| | Investment | SB 5,000.00 | |
| | Margin Payable-Position Close Margin Borrowed | SB | 2,000.00 |
| | Equity | SB 5,060.00 | |
| | Cash Invested-Stock Long Open (net) | SB | 5,060.00 |
| | Commissions-Commissions Long Open | SB 50.00 | |
| | Other Costs-Other Costs Long Open | SB 10.00 | |
| | Investment | P 400.00 | |
| | Equity | P | |
| | | 12,120.00 | 12,120.00 |

Figure 27c

| | A | B | C | D | E | F | G | H | I | J | K | L | M |
|---|---|---|---|---|---|---|---|---|---|---|---|---|---|
| 1 | | Put - Short - Uncovered - Expired | | | | | | | | | | | |
| 2 | | | | | | | | | | | | | |
| 3 | | | | Strike Price $ | | 50 Month Expires | | May | | | | | |
| 4 | | | | | | | | | | | | | |
| 5 | | | | Cash Min Req $ | | 500 In Money Maint % | | 15 | | Out Money Maint % | | 25 | |
| 6 | | | | | | | | | | | | | |
| 7 | | | | Days Until Expiration | | | (85) | SOLD | | EXPIRED | | DIFFERENCE/TOTAL | |
| 8 | | | | | | | | | | | | | |
| 9 | | | | Date | | | | 04/01/2001 | | 05/05/2001 | | 34 | |
| 10 | | | | | | | | | | | | | |
| 11 | | | | Price per Contract | | | | $ 3.000 | | | | $ 3.000 | |
| 12 | | | | | | | | | | | | | |
| 13 | | | | Number of Contracts | | | | 1 | | 1 | | - | |
| 14 | | | | | | | | | | | | | |
| 15 | | | | Commissions | | | | $ 50.00 | | - | | $ 50.00 | |
| 16 | | | | | | | | | | | | | |
| 17 | | | | Other Costs | | | | $ 10.00 | | - | | $ 10.00 | |
| 18 | | | | | | | | | | | | | |
| 19 | | | | Net Sold Receipts | | | | $ 240.00 | | n/a | | $ 240.00 | |
| 20 | | | | | | | | | | | | | |
| 21 | | | | | | | | | | BEFORE TAXES | | AFTER TAXES | |
| 22 | | | | | | | | | | | | | |
| 23 | | | | Net Gain / (Loss) | | | | | | $ 240.00 | | $ 204.00 | |
| 24 | | | | | | | | | | | | | |
| 25 | | | | Net Gain / (Loss) Percentage | | | | | | 100.00% | | 85.00% | |
| 26 | | | | | | | | | | | | | |
| 27 | | | | Net Annualized Return (CAGR) | | | | | | 171240.09% | | 74053.49% | |
| 28 | | | | | | | | | | | | | |
| 29 | | | | PORTFOLIO STATUS: | | | | BEFORE | | AFTER | | | |
| 30 | | | | | | | | | | | | | |
| 31 | | | | Current Buying Power (assumes 50% initial requirement) | | | | $ 20,000 | | $ 22,100 | | | |
| 32 | | | | | | | | | | | | | |
| 33 | | | | Cash Available | | | | $ 5,000 | | $ 5,000 | | | |
| 34 | | | | | | | | | | | | | |
| 35 | | | | Equity Utilized | | | | $ 5,000 | | $ 3,950 | | | |
| 36 | | | | | | | | | | | | | |
| 37 | | | | Margin Available | | | | $ 10,000 | | $ 10,000 | | | |
| 38 | | | | | | | | | | | | | |
| 39 | | | | Margin Payable | | | | $ 2,000 | | $ 2,000 | | | |
| 40 | | | | | | | | | | | | | |
| 41 | | | | Calculate Page | | | | Cancel | | Reset | | Submit | |
| 42 | | | | | | | | | | | | | |

Put - Short - Uncovered - Expired

| Transaction Code | Description | Expired Debit | Credit |
|---|---|---|---|
| | Cash-Commission Short Expired | | · |
| | Cash-Other Costs Short Expired | | · |
| | Investment | | 450.00 |
| | Equity | 150.00 | · |
| | Gains/Losses (Gross) | 300.00 | |
| | Commissions-Commissions Short Expired | · | |
| | Other Costs-Orther Costs Short Expired | · | |
| | | 450.00 | 450.00 |

Figure 28c

| | | | | | | | | | |
|---|---|---|---|---|---|---|---|---|---|
| Call - Short - Covered - Sell to Open / Tranfer In | | | | | | | | | |
| Strike Price | $ | 65 | Month Expires | | May | | Transfer In | | |
| Days Until Expiration | | | (85) | OPEN POSITIONS | | SELL | | AVERAGE / TOTAL | |
| Date | | | | 04/01/2001 | | 05/05/2001 CAL | | | |
| Price per Contract | | | | $ 4.000 | | $ 4.000 | | $ 4.000 | |
| Number of Contracts | | | | 2 | | 1 | | 3 | |
| Long Shares Available | | | | 600 | | 600 | | 600 | |
| Long Shares Utilized | | | | 200 | | 100 a | | 300 | |
| Commissions | | | | $ 100.00 | | $ 50.00 | | $ 150.00 | |
| Other Costs | | | | $ 20.00 | | $ 10.00 | | $ 30.00 | |
| Gross Sold Receipts | | | | $ 800.00 | | $ 400.00 | | $ 1,200.00 | |
| Cash Disbursed (comm-costs) | | | | $ 120.00 | | $ 60.00 | | $ 180.00 | |
| Net Sold Receipts | | | | $ 680.00 | | $ 340.00 | | $ 1,020.00 | |
| Cash / Margin Required | | | | | | $ - | | | |
| PORTFOLIO STATUS: | | | | BEFORE | | AFTER | | | |
| Current Buying Power (assumes 50% initial requirement) | | | | $ 28,000 | | $ 28,680 | | | |
| Cash Available | | | | $ 5,000 | | $ 5,340 | | | |
| Equity Utilized | | | | $ 1,000 | | $ 1,000 | | | |
| Margin Available | | | | $ 10,000 | | $ 10,000 | | | |
| Margin Payable | | | | $ 2,000 | | $ 2,000 | | | |
| Calculate Page | | | | | Cancel | | Reset | Submit | |

Call - Short - Covered - Sell to Open / Tranfer In

Sell to Open

| Transaction Code | Description | Debit | Credit |
|---|---|---|---|
| | Cash-Call Short Open | 400.00 | |
| | Cash-Commission Short Open | | 50.00 |
| | Cash-Other Costs Short Open | | 10.00 |
| | Investment | | 400.00 |
| | Commissions-Commission Short Open | 50.00 | |
| | Other Costs-Other Costs Short Open | 10.00 | |
| | | 460.00 | 460.00 |

Transfer In

| Transaction Code | Description | Debit | Credit |
|---|---|---|---|
| | Cash-Transfer In Costs | | 10.00 |
| | Investment | | 400.00 |
| | Equity | 450.00 | |
| | Commissions-Transfer In Comm-Costs | | 50.00 |
| | Other Costs-Transfer Out Costs | 10.00 | |
| | | 460.00 | 460.00 |

Figure 29c

| | Call - Short - Covered - Sell to Open / Tranfer In | | | | | |
|---|---|---|---|---|---|---|
| | Strike Price $ 65 Month Expires | | | May | Transfer In | X |
| | Days Until Expiration | (85) | OPEN POSITIONS | | TRANSFER IN | AVERAGE / TOTAL |
| | Date | | 04/01/2001 | | 05/05/2001 CAL | |
| | Price per Contract | | $ 4.000 | | $ 4.000 | $ 4.000 |
| | Number of Contracts | | 2 | | 1 | 3 |
| | Long Shares Available | | 600 | | 600 | 600 |
| | Long Shares Utilized | | 200 | | 100 a | 300 |
| | Commissions / Transfer In Comm-Costs | | $ 100.00 | | $ 50.00 | $ 150.00 |
| | Other Costs / Transfer In Costs | | $ 20.00 | | $ 10.00 | $ 30.00 |
| | Gross Sold Receipts / Transfer In | | $ 800.00 | | $ 400.00 | $ 1,200.00 |
| | Cash Disbursed (comm-costs) / Transfer In Costs | | $ 120.00 | | $ 10.00 | $ 130.00 |
| | Net Sold Receipts | | $ 680.00 | | n/a | $ 680.00 |
| | Cash / Margin Required | | | | $ - | |
| | PORTFOLIO STATUS: | | BEFORE | | AFTER | |
| | Current Buying Power (assumes 50% initial requirement) | | $ 28,000 | | $ 27,980 | |
| | Cash Available | | $ 5,000 | | $ 4,990 | |
| | Equity Utilized | | $ 1,000 | | $ 1,000 | |
| | Margin Available | | $ 10,000 | | $ 10,000 | |
| | Margin Payable | | $ 2,000 | | $ 2,000 | |
| | Calculate Page | | | Cancel | Reset | Submit |

Figure 29d

| | | A | B | C | D | E | F | G | H | I | J | K | L | M |
|---|---|---|---|---|---|---|---|---|---|---|---|---|---|---|
| 1 | Call - Short - Covered - Buy to Close / Transfer Out | | | | | | | | | | | | | |
| 2 | | | | | | | | | | | | | | |
| 3 | Strike Price  $  65  Month Expires | | | | | | | | May | | Transfer Out | | | | |
| 4 | | | | | | | | | | | | | | |
| 5 | Days Until Expiration | | | | | | | (85) | SOLD | | BUY | | | DIFFERENCE/TOTAL | |
| 7 | Date | | | | | | | | 04/01/2001 | | 05/05/2001 | CAL | | 34 | |
| 9 | Price per Contract | | | | | | | | $   4.000 | | $   4.000 | | $   - | | |
| 11 | Number of Contracts: | | | | | | | | 6.0 | | 3.0 | | | 3.0 | |
| 13 | Long Shares Utilized / Released | | | | | | | | 600.0 | | 300.0 | | | 300.00 | |
| 15 | Commissions | | | | | | | | $   50.00 | | $   50.00 | | $   100.00 | | |
| 17 | Other Costs | | | | | | | | $   10.00 | | $   10.00 | | $   20.00 | | |
| 19 | Net Sold Receipts / Allocated Basis | | | | | | | | $   2,340.00 | | $   1,170.00 | | $   1,170.00 | | |
| 33 | Net Cash Disbursed | | | | | | | | | | $   760.00 | | | | |
| 35 | PORTFOLIO STATUS: | | | | | | | | BEFORE | | AFTER | | | | |
| 37 | Current Buying Power (assumes 50% initial requirement) | | | | | | | | $   20,000 | | $   17,480 | | | | |
| 39 | Cash Available | | | | | | | | $   5,000 | | $   4,240 | | | | |
| 41 | Equity Utilized | | | | | | | | $   5,000 | | $   5,000 | | | | |
| 43 | Margin Available | | | | | | | | $   10,000 | | $   9,500 | | | | |
| 45 | Margin Payable | | | | | | | | $   2,000 | | $   2,500 | | | | |
| 47 | Calculate Page | | | | | | | | Cancel | | Reset | | | Submit | |

| Call - Short - Covered - Buy to Close / Transfer Out | | | |
|---|---|---|---|

Buy to Close

| Transaction Code | Description | Debit | Credit |
|---|---|---|---|
| | Cash-Call Short Close | | 1,200.00 |
| | Cash-Call Short Gain/Loss | . | . |
| | Cash-Commission Short Close | | 50.00 |
| | Cash-Other Cost Short Close | | 10.00 |
| | Cash-Position Close Margin Borrowed | 500.00 | |
| | Investment | 1,200.00 | |
| | Margin Payable-Position Close Margin Borrowed | | 500.00 |
| | Commissions-Commissions Short Close | 50.00 | |
| | Other Costs-Other Costs Short Close | 10.00 | |
| | Gains/Losses (Gross) | . | . |
| | | 1,760.00 | 1,760.00 |

Transfer Out

| Transaction Code | Description | Debit | Credit |
|---|---|---|---|
| | Cash-Other Cost Short Close | | 10.00 |
| | Investment | 1,200.00 | |
| | Equity | | 1,150.00 |
| | Commissions-Transfer Out Comm-Costs | | 50.00 |
| | Other Costs-Transfer Out Costs | 10.00 | |
| | | 1,210.00 | 1,210.00 |

Figure 30c

| | | | | | | | |
|---|---|---|---|---|---|---|---|
| Call - Short - Covered - Buy to Close / Transfer Out | | | | | | | |
| Strike Price | $ | 65 | Month Expires | | May | Transfer Out | X |
| Days Until Expiration | | | | (85) | SOLD | TRANSFER OUT | DIFFERENCE/TOTAL |
| Date | | | | | 04/01/2001 | 05/05/2001 CAL | 34 |
| Price per Contract | | | | | $ 4.000 | $ 4.000 | $ - |
| Number of Contracts: | | | | | 6.0 | 3.0 | 3.0 |
| Long Shares Utilized / Released | | | | | 600.0 | 300.0 | 300.00 |
| Commissions / Transfer Out Comm-Costs | | | | | $ 50.00 | $ 50.00 | $ 100.00 |
| Other Costs / Transfer Out Costs | | | | | $ 10.00 | $ 10.00 | $ 20.00 |
| Net Sold Receipts / Transfer Out Value | | | | | $ 2,340.00 | $ 1,200.00 | $ 1,140.00 |
| Net Cash Disbursed | | | | | | $ 10.00 | |
| PORTFOLIO STATUS: | | | | | BEFORE | AFTER | |
| Current Buying Power (assumes 50% initial requirement) | | | | | $ 20,000 | $ 18,980 | |
| Cash Available | | | | | $ 5,000 | $ 4,990 | |
| Equity Utilized | | | | | $ 5,000 | $ 5,000 | |
| Margin Available | | | | | $ 10,000 | $ 9,500 | |
| Margin Payable | | | | | $ 2,000 | $ 2,500 | |
| Calculate Page | | | | | Cancel | Reset | Submit |

Figure 30d

| | | | | | | |
|---|---|---|---|---|---|---|
| Call - Short - Covered - Exercise | | | | | | |
| Strike Price $ | 65 | Month Expires | May | Margin Available % | 50 | |
| Days Until Expiration | (85) | BOUGHT SHARES | SELL-EXERCISED | DIFFERENCE/TOTAL | | |
| Date | | 11/15/2000 | 05/05/2001 CAL | 171 | | |
| Bought/Exercise Price per Share | | $ 20.000 | 10.000 | $ (10.000) | | |
| Number of Contracts | | 2 | 1 | 1 | | |
| Number of Shares | | 200.0 | 100.0 | 100.0 | | |
| Commissions | | $ 100.00 | 50.00 | 150.00 | | |
| Other Costs | | $ 20.00 | 10.00 | 30.00 | | |
| Bought Settlement | | $ 4,120.00 | $ 2,060.00 | $ 2,060.00 | | |
| Net Gain / (Loss) - Call Option | | | $ 370.00 | | | |
| Net Gain / (Loss) - Stock | | | $ (1,120.00) | | | |
| | | | BEFORE TAXES | AFTER TAXES | | |
| Net Gain / (Loss) - Stock & Option | | | $ (750.00) | $ (525.00) | | |
| Net Gain / (Loss) Percentage | | | -36.41% | -25.49% | | |
| Net Annualized Return (CAGR) | | | -61.97% | -46.65% | | |
| Net Sold Receipts | | | $ 940.00 | | | |
| Margin Paid | | | 500.00 | | | |
| Cash Deposited | | | $ 440.00 | | | |
| PORTFOLIO STATUS: | | BEFORE | AFTER | | | |
| Current Buying Power | | $ 20,000 | $ 14,880 | | | |
| Cash Available | | $ 5,000 | $ 5,440 | | | |
| Equity Utilized | | $ 5,000 | $ 5,000 | | | |
| Margin Available | | $ 10,000 | $ 7,000 | | | |
| Margin Payable | | $ 2,000 | $ 1,500 | | | |
| Calculate Page | | | Cancel | Reset | Submit | |

| Call - Short - Covered - Exercise | | | | |
|---|---|---|---|---|
| | | Exercise | | |
| Transaction Code | Description | | Debit | Credit |
| | Cash-Stock Long Close | SS | 2,000.00 | |
| | Cash-Stock Long Gain/Loss | SS | . | 1,000.00 |
| | Cash-Commissions Long Open | SS | | 50.00 |
| | Cash-Other Costs Long Open | SS | | 10.00 |
| | Cash-Position Open Margin Paid | SS | | 500.00 |
| | Investment | SS | | 1,000.00 |
| | Margin Payable-Position Close Margin Paid | SS | 500.00 | |
| | Equity | SS | | 1,690.00 |
| | Cash Invested-Stock Long Open (net) | SS | 690.00 | |
| | Commissions-Commissions Long Open | SS | 50.00 | |
| | Other Costs-Other Costs Long Open | SS | 10.00 | |
| | Gains/Losses (Gross) | SS | 1,000.00 | . |
| | Investment | P | | 500.00 |
| | Equity | P | | 100.00 |
| | Gains/Losses (Gross) | P | 400.00 | |
| | | | 4,250.00 | 4,250.00 |

Figure 31c

| | | | | | | |
|---|---|---|---|---|---|---|
| Call - Short - Covered - Expired | | | | | | |
| Strike Price | $ | 65 | Month Expires | May | Days Until Expiration | (85) |
| | | | | SOLD | EXPIRED | DIFFERENCE/TOTAL |
| Date | | | | 04/01/2001 | 05/05/2001 CAL | 34 |
| Price per Contract | | | $ | 4.000 | | $ 4.000 |
| Number of Contracts: | | | | 6.0 | 6.0 | - |
| Long Shares Utilized / Released | | | | 600.0 | 600.0 | - |
| Commissions | | | $ | 50.00 | $ - | $ 50.00 |
| Other Costs | | | $ | 10.00 | $ - | $ 10.00 |
| Sold Net Receipts | | | $ | 2,340.00 | n/a | $ 2,340.00 |
| | | | | | BEFORE TAXES | AFTER TAXES |
| Net Gain | | | | | $ 2,340.00 | $ 1,638.00 |
| Net Gain Percentage | | | | | 100.00% | 70.00% |
| Net Annualized Return (CAGR) | | | | | 171240.09% | 29797.26% |
| PORTFOLIO STATUS: | | | | BEFORE | AFTER | |
| Current Buying Power (assumes 50% initial requirement) | | | $ | 20,000 | $ 20,000 | |
| Cash Available | | | $ | 5,000 | $ 5,000 | |
| Equity Utilized | | | $ | 5,000 | $ 5,000 | |
| Margin Available | | | $ | 10,000 | $ 10,000 | |
| Margin Payable | | | $ | 2,000 | $ 2,000 | |
| Calculate Page | | | | Cancel | Reset | Submit |

Figure 32a

| | A | B | C | D | E | F | G | H | I | J | K | L | M |
|---|---|---|---|---|---|---|---|---|---|---|---|---|---|
| 1 | | | | | | | | | | | | | |
| 2 | | | Call - Short - Covered - Expired | | | | | | | | | | |
| 3 | | | Strike Price | $ | 65 | Month Exp | | May | | Days Until Expiration | | =L43-NOW() | |
| 4 | | | | | | | | SOLD | | EXPIRED | | DIFFERENCE/TOTAL | |
| 5 | | | | | | | | | | | | | |
| 6 | | | | | | | | | | | CAL | | |
| 7 | | | Date | | | | x | 38982 | | 37016 | | =J7-H7 | |
| 8 | | | | | | | | | | | | | |
| 9 | | | Price per Contract | | | | x | 4 | | | | =H9-J9 | |
| 10 | | | | | | | | | | | | | |
| 11 | | | Number of Contracts | | | | x | 8 | | =H11 | | =H11-J11 | |
| 12 | | | | | | | | | | | | | |
| 13 | | | Long Shares Utilized / Released | | | | | =H11*100 | | =H13 | | =H13-J13 | |
| 14 | | | | | | | | | | | | | |
| 15 | | | Commissions | | | | x | 50 | | 0 | | =H15 | |
| 16 | | | | | | | | | | | | | |
| 17 | | | Other Costs | | | | x | 10 | | 0 | | =H17 | |
| 18 | | | | | | | | | | | | | |
| 19 | | | Sold Net Receipts | | | | | =(H9*H11*100)-H15-H17 | | n/a | | =H19 | |
| 20 | | | | | | | | | | | | | |
| 21 | | | | | | | | | | BEFORE TAXES | | AFTER TAXES | |
| 22 | | | | | | | | | | | | | |
| 23 | | | Net Gain b/f Taxes | | | | | | | =H19 | | =J23-J23*(H(L7>365,L46,L45)) | |
| 24 | | | | | | | | | | | | | |
| 25 | | | Net Gain Percentage | | | | | | | 1 | | =L23/J23 | |
| 26 | | | | | | | | | | | | | |
| 27 | | | Net Annualized Return (CAGR) | | | | | | | =(J25+1)^(365.25/(J7-H7))-1 | | =(L25+1)^(365.25/(J7-H7))-1 | |
| 28 | | | PORTFOLIO STATUS: | | | | | BEFORE | | AFTER | | | |
| 29 | | | | | | | | | | | | | |
| 30 | | | | | | | | | | | | | |
| 31 | | | Current Buying Power (assumes 50% initial requirement) | | | | | =IF(H33-J35+J37<0,0,(H33-H35+H37)/0.5) | | =IF(J33-J35+J37<0,0,(J33-J35+J37)/0.5) | | | |
| 32 | | | | | | | | | | | | | |
| 33 | | | Cash Available | | | | x | 5000 | | =H33 | | | |
| 34 | | | | | | | | | | | | | |
| 35 | | | Equity Utilized | | | | x | 5000 | | =H35 | | | |
| 36 | | | | | | | | | | | | | |
| 37 | | | Margin Available | | | | x | 10000 | | =H37 | | | |
| 38 | | | | | | | | | | | | | |
| 39 | | | Margin Payable | | | | x | 2000 | | =H39 | | | |
| 40 | | | | | | | | | | | | | |
| 41 | | | Calculate Page | | | | | Cancel | | Reset | | Submit | |
| 42 | | | | | | | | | | | | | |
| 43 | | | | | | | x | Populated from database | | Expiration Date | x | 37289 | |
| 44 | | | | | | | | | | Taxes: | | | |
| 45 | | | | | | | | | | Ordinary Income Effective Rate | x | 0.3 | |
| 46 | | | | | | | | | | Long Term Effective Rate | x | 0.15 | |

Figure 32b

| Call - Short - Covered - Expired | | | |
|---|---|---|---|
| | Expired | | |
| Transaction Code | Description | Debit | Credit |
| | Cash-Commission Short Expired | | - |
| | Cash-Other Costs Short Expired | | - |
| | Investment | | 1,800.00 |
| | Equity | - | 600.00 |
| | Gains/Losses (Gross) | 2,400.00 | |
| | Commissions-Commissions Short Expired | - | |
| | Other Costs-Orther Costs Short Expired | - | |
| | | 2,400.00 | 2,400.00 |

Figure 32c

| | | | | | | |
|---|---|---|---|---|---|---|
| Call - Short - Uncovered - Sell to Open / Transfer In | | | | | | |
| Strike Price | $ | 65 | Month Expires | May | Transfer In | |
| Cash Min Req | $ | 500 | In Money Maint % | 15 | Out Money Main % | 25 |
| Days Until Expiration | | (85) | OPEN POSITIONS | SELL | AVERAGE / TOTAL | |
| Date | | | 04/01/2001 | 05/05/2001 CAL | | |
| Price per Contract | | | $ 4.000 | $ 4.000 | $ 4.000 | |
| Number of Contracts | | | 2 | 1 | 3 | |
| Commissions | | | $ 100.00 | $ 50.00 | $ 150.00 | |
| Other Costs | | | $ 20.00 | $ 10.00 | $ 30.00 | |
| Gross Sold Receipts | | | $ 800.00 | $ 400.00 | $ 1,200.00 | |
| Cash Disbursed (comm-costs) | | | $ 120.00 | $ 60.00 | $ 180.00 | |
| Net Sold Receipts | | | $ 680.00 | $ 340.00 | $ 1,020.00 | |
| Equity Utilized | | | | $ 2,150.00 | | |
| Cash Required | | | | $ . | | |
| PORTFOLIO STATUS: | | | BEFORE | AFTER | | |
| Current Buying Power (assumes 50% initial requirement) | | | $ 28,000 | $ 24,380 | | |
| Cash Available | | | $ 5,000 | 5,340 | | |
| Equity Utilized | | | $ 1,000 | 3,150 | | |
| Margin Available | | | $ 10,000 | $ 10,000 | | |
| Margin Payable | | | $ 2,000 | $ 2,000 | | |
| Calculate Page | | | Cancel | Reset | Submit | |

| Call - Short - Uncovered - Sell to Open / Transfer In | | | |
|---|---|---|---|
| | Sell to Open | | |
| Transaction Code | Description | Debit | Credit |
| | Cash-Call Short Open | 400.00 | |
| | Cash-Commission Short Open | | 50.00 |
| | Cash-Other Costs Short Open | | 10.00 |
| | Investment | | 400.00 |
| | Commissions-Commission Short Open | 50.00 | |
| | Other Costs-Other Costs Short Open | 10.00 | |
| | | 460.00 | 460.00 |
| | Transfer In | | |
| Transaction Code | Description | Debit | Credit |
| | Cash-Transfer In Costs | | 10.00 |
| | Investment | | 400.00 |
| | Equity | 450.00 | |
| | Commissions-Transfer In Comm-Costs | | 50.00 |
| | Other Costs-Transfer Out Costs | 10.00 | |
| | | 460.00 | 460.00 |

Figure 33c

| | | | | | | | |
|---|---|---|---|---|---|---|---|
| Call - Short - Uncovered - Sell to Open / Transfer In | | | | | | | |
| Strike Price | $ | 65 | Month Expires | | May | Transfer In | x |
| Cash Min Req | $ | 500 | In Money Maint % | | 15 | Out Money Main % | 25 |
| Days Until Expiration | | | (85) | OPEN POSITIONS | TRANSFER IN | | AVERAGE / TOTAL |
| Date | | | | 04/01/2001 | 05/05/2001 CAL | | |
| Price per Contract | | | | $ 4.000 | $ 4.000 | $ | 4.000 |
| Number of Contracts | | | | 2 | 1 | | 3 |
| Commissions / Transfer In Comm-Costs | | | | $ 100.00 | $ 50.00 | $ | 150.00 |
| Other Costs / Transfer In Costs | | | | $ 20.00 | $ 10.00 | $ | 30.00 |
| Gross Sold Receipts / Transfer In | | | | $ 800.00 | $ 400.00 | $ | 1,200.00 |
| Cash Disbursed (comm-costs) / Transfer In Costs | | | | $ 120.00 | $ 10.00 | $ | 130.00 |
| Net Sold Receipts | | | | $ 680.00 | n/a | $ | 680.00 |
| Equity Utilized | | | | | $ 2,150.00 | | |
| Cash Required | | | | | $ . | | |
| PORTFOLIO STATUS: | | | | BEFORE | AFTER | | |
| Current Buying Power (assumes 50% initial requirement) | | | | $ 28,000 | $ 23,680 | | |
| Cash Available | | | | $ 5,000 | 4,990 | | |
| Equity Utilized | | | | $ 1,000 | 3,150 | | |
| Margin Available | | | | $ 10,000 | $ 10,000 | | |
| Margin Payable | | | | $ 2,000 | $ 2,000 | | |
| Calculate Page | | | | Cancel | Reset | | Submit |

Figure 33d

| | | | | | |
|---|---|---|---|---|---|
| Call - Short - Uncovered - Buy to Close / Transfer Out | | | | | |
| Strike Price $ | 65 | Month Expires | May | Transfer Out | |
| Cash Min Req $ | 500 | In Money Maint % | 15 | Out Money Maint % | 25 |
| Days Until Expiration | | (85) | SOLD | BUY | DIFFERENCE/TOTAL |
| Date | | | 04/01/2001 | 05/05/2001 CAL | 34 |
| Price per Contract | | | $ 3.000 | 3.000 | $ - |
| Number of Contracts: | | | 1.0 | 1.0 | - |
| Commissions | | | $ 10.00 | 10.00 | $ 20.00 |
| Other Costs | | | $ 10.00 | 20.00 | $ 30.00 |
| Net Sold Receipts / Allocated Basis | | | $ 280.00 | $ 280.00 | $ - |
| Net Cash Disbursed | | | | $ 130.00 | |
| PORTFOLIO STATUS: | | | BEFORE | AFTER | |
| Current Buying Power (assumes 50% initial requirement) | | | $ 20,000 | $ 22,940 | |
| Cash Available | | | $ 5,000 | $ 4,870 | |
| Equity Utilized | | | $ 5,000 | $ 3,200 | |
| Margin Available | | | $ 10,000 | $ 9,800 | |
| Margin Payable | | | $ 2,000 | $ 2,200 | |
| Calculate Page | | | Cancel | Reset | Submit |

| Call - Short - Uncovered - Buy to Close / Transfer Out | | | |
|---|---|---|---|

Buy to Close

| Transaction Code | Description | Debit | Credit |
|---|---|---|---|
| | Cash-Call Short Close | | 300.00 |
| | Cash-Call Short Gain/Loss | 20.00 | - |
| | Cash-Commission Short Close | | 10.00 |
| | Cash-Other Cost Short Close | | 20.00 |
| | Cash-Position Close Margin Borrowed | 200.00 | |
| | Investment | 300.00 | |
| | Margin Payable-Position Close Margin Borrowed | | 200.00 |
| | Commissions-Commissions Short Close | 10.00 | |
| | Other Costs-Other Costs Short Close | 20.00 | |
| | Gains/Losses (Gross) | - | 20.00 |
| | | 550.00 | 550.00 |

Transfer Out

| Transaction Code | Description | Debit | Credit |
|---|---|---|---|
| | Cash-Other Cost Short Close | | 20.00 |
| | Investment | 300.00 | |
| | Equity | | 290.00 |
| | Commissions-Transfer Out Comm-Costs | | 10.00 |
| | Other Costs-Transfer Out Costs | 20.00 | |
| | | 320.00 | 320.00 |

Figure 34c

| | | | | | |
|---|---|---|---|---|---|
| Call - Short - Uncovered - Buy to Close / Transfer Out | | | | | |
| Strike Price $ | 65 | Month Expires | May | Transfer Out | X |
| Cash Min Req $ | 500 | In Money Maint % | 15 | Out Money Maint % | 25 |
| Days Until Expiration | (85) | | SOLD | TRANSFER OUT | DIFFERENCE/TOTAL |
| Date | | | 04/01/2001 | 05/05/2001  CAL | 34 |
| Price per Contract | | $ | 3.000 | 3.000 | $  - |
| Number of Contracts: | | | 1.0 | 1.0 | - |
| Commissions / Transfer Out Comm-Costs | | $ | 10.00 | 10.00 | $ 20.00 |
| Other Costs / Transfer Out Costs | | $ | 10.00 | 20.00 | $ 30.00 |
| Net Sold Receipts / Transfer Out Value | | $ | 280.00 | $ 300.00 | $ (20.00) |
| Net Cash Disbursed | | | | $ 20.00 | |
| PORTFOLIO STATUS: | | | BEFORE | AFTER | |
| Current Buying Power (assumes 50% initial requirement) | | $ | 20,000 | $ 23,160 | |
| Cash Available | | $ | 5,000 | $ 4,980 | |
| Equity Utilized | | $ | 5,000 | $ 3,200 | |
| Margin Available | | $ | 10,000 | $ 9,800 | |
| Margin Payable | | $ | 2,000 | $ 2,200 | |
| Calculate Page | | | Cancel | Reset | Submit |

Figure 34d

| Call - Short - Uncovered - Exercise | | | | |
|---|---|---|---|---|
| Strike Price $ | 65 Month Expires | May | Stock Margin Available % | 50 |
| Cash Min Req $ | 500 In Money Maint % | 15 | Out Money Main % | 25 |
| Days Until Expiration | (85) | BUY SHARES | SELL-EXERCISE | DIFFERENCE/TOTAL |
| Date | | 05/05/2001 CAL | 05/05/2001 | - |
| Price per Share / Exercise Price per Share | | $ 70.000 | $ 75.000 | $ 5.000 |
| Number of Contracts | | 1 | 1 | |
| Number of Shares | | 100.0 | 100.0 | - |
| Commissions | | $ 50.00 | $ 50.00 | 100.00 |
| Other Costs | | $ 10.00 | $ 10.00 | 20.00 |
| Bought Settlement / Net Sell Receipts | | $ 7,060.00 | $ 7,440.00 | $ 380.00 |
| Net Gain / (Loss) - Call Option | | | $ 400.00 | |
| Net Gain / (Loss) - Stock | | $ 500.00 | $ 380.00 | |
| | | | BEFORE TAXES | AFTER TAXES |
| Net Gain / (Loss) - Stock & Option | | | $ 780.00 | $ 546.00 |
| Net Gain / (Loss) Percentage | | | 10.48% | 70.00% |
| Net Annualized Return (CAGR) | | | > 10000% | > 10000% |
| Net Buy / Sell Receipts | | | $ 380.00 | |
| Margin Paid | | | $ 100.00 | |
| Net Cash Deposited / (Cash Disbursed) | | | $ 280.00 | |
| PORTFOLIO STATUS: | | BEFORE | AFTER | |
| Current Buying Power | | $ 20,000 | $ 24,560 | |
| Cash Available | | $ 5,000 | $ 5,280 | |
| Equity Utilized | | $ 5,000 | $ 3,100 | |
| Margin Available | | $ 10,000 | $ 10,100 | |
| Margin Payable | | $ 2,000 | $ 1,900 | |
| Calculate Page | | Cancel | Reset | Submit |

Figure 35a

| Call - Short - Uncovered - Exercise | | | | |
|---|---|---|---|---|
| | | Exercise | | |
| Transaction Code | Description | | Debit | Credit |
| | Cash-Stock Long Open | SB | | 7,000.00 |
| | Cash-Commissions Long Open | SB | | 50.00 |
| | Cash-Other Costs Long Open | SB | | 10.00 |
| | Investment | SB | 7,000.00 | |
| | Equity | SB | 7,060.00 | |
| | Cash Invested-Stock Long Open (net) | SB | | 7,060.00 |
| | Commissions-Commissions Long Open | SB | 50.00 | |
| | Other Costs-Other Costs Long Open | SB | 10.00 | |
| | Cash-Stock Long Close | SS | 7,000.00 | |
| | Cash-Stock Long Gain/Loss | SS | 500.00 | |
| | Cash-Commissions Long Open | SS | | 50.00 |
| | Cash-Other Costs Long Open | SS | | 10.00 |
| | Cash-Position Open Margin Paid | SS | | 100.00 |
| | Investment | SS | | 7,500.00 |
| | Margin Payable-Position Close Margin Paid | SS | 100.00 | |
| | Equity | SS | | 6,660.00 |
| | Cash Invested-Stock Long Open (net) | SS | 7,160.00 | |
| | Commissions-Commissions Long Open | SS | 50.00 | |
| | Other Costs-Other Costs Long Open | SS | 10.00 | |
| | Gains?losses (Gross) | SS | | 500.00 |
| | Investment | P | | 450.00 |
| | Equity | P | 50.00 | . |
| | Gains/Losses (Gross) | P | 400.00 | |
| | | | 29,390.00 | 29,390.00 |

Figure 35c

| | | | | | | | |
|---|---|---|---|---|---|---|---|
| Call - Short - Uncovered - Expired | | | | | | | |
| Strike Price $ | 65 | Month Expires | | May | | | |
| Cash Min Req $ | 500 | In Money Maint % | | 15 | Out Money Main % | | 25 |
| Days Until Expiration | | | (85) | SOLD | EXPIRED | | DIFFERENCE/TOTAL |
| Date | | | | 04/01/2001 | 05/05/2001 | | 34 |
| Price per Contract | | | $ | 4.000 | | $ | 4.000 |
| Number of Contracts: | | | | 2.0 | 1.0 | | 1.0 |
| Commissions | | | $ | 50.00 | - | $ | 50.00 |
| Other Costs | | | $ | 10.00 | - | $ | 10.00 |
| Net Sold Receipts | | | $ | 740.00 | n/a | $ | 740.00 |
| | | | | | BEFORE TAXES | | AFTER TAXES |
| Net Gain / (Loss) | | | | | $ 740.00 | $ | 629.00 |
| Net Gain / (Loss) Percentage | | | | | 100.00% | | 85.00% |
| Net Annualized Return (CAGR) | | | | | 171240.09% | | 74053.49% |
| PORTFOLIO STATUS: | | | | BEFORE | AFTER | | |
| Current Buying Power (assumes 50% initial requirement) | | | $ | 20,000 | $ 23,800 | | |
| Cash Available | | | $ | 5,000 | $ 5,000 | | |
| Equity Utilized | | | $ | 5,000 | $ 3,100 | | |
| Margin Available | | | $ | 10,000 | $ 10,000 | | |
| Margin Payable | | | $ | 2,000 | $ 2,000 | | |
| Calculate Page | | | | Cancel | Reset | | Submit |

| Call - Short - Uncovered - Expired | | | |
|---|---|---|---|
| | | Expired | |
| Transaction Code | Description | Debit | Credit |
| | Cash-Commission Short Expired | | - |
| | Cash-Other Costs Short Expired | | - |
| | Investment | | 350.00 |
| | Equity | - | 450.00 |
| | Gains/Losses (Gross) | 800.00 | |
| | Commissions-Commissions Short Expired | - | |
| | Other Costs-Orther Costs Short Expired | - | |
| | | 800.00 | 800.00 |

Figure 36c

Tradescreen Features Based On System Type
Open Position Tradescreens

|  | Online | Inhouse | Paper |
|---|---|---|---|
| Margin Requirements * | X | X | X |
| Transfer In Positions |  | X | X |
| Open Position(s) Data | X | X | X |
| Calendar |  |  | X |
| Average/Total of Trade | X | X | X |
| Bought Settlement | X | X | X |
| Margin Borrowed-% * | X | X | X |
| Cash Disbursed/Invested | X | X | X |
| Portoflio Status Before/After | X | X | X |
| Order Type (button): |  |  |  |
|     Market | X | X |  |
|     Limit | X | X |  |
| Time Limits (button): |  |  |  |
|     Good for the Day | X | X |  |
|     Good til Cancel | X | X |  |

* if marginable position

Figure 37a

Tradescreen Features Based On System Type
Close Position Tradescreens

|  | Online | Inhouse | Paper |
|---|---|---|---|
| Margin Requirements * | X | X | X |
| Transfer Out Positions |  | X | X |
| Position Open Data | X | X | X |
| Calendar |  |  | X |
| Difference/Total of Trade | X | X | X |
| Bought Settlement | X | X | X |
| Before/After Taxes: |  |  |  |
|     Net Gain/(Loss) | X | X | X |
|     Net Gain/(Loss) % | X | X | X |
|     CAGR | X | X | X |
| Net Sold Recéipts | X | X | X |
| Margin Paid | X | X | X |
| Cash Deposited | X | X | X |
| Portoflio Status Before/After | X | X | X |
| Order Type (button): |  |  |  |
|     Market | X | X |  |
|     Limit | X | X |  |
|     stop | X | X |  |
|     stop-limit | X | X |  |
| Time Limits (button): |  |  |  |
|     Good for the Day | X | X |  |
|     Good til Cancel | X | X |  |

* if marginable position

Figure 37b

Tradescreen Features Based On System Type
Security Summary Screen

|  | Online | Inhouse | Paper |
|---|---|---|---|
| Holdings | X | X | X |
| Performance | X | X | X |
| Open Position Security Buttons: | | | |
|     Close | X | X | X |
|     Edit | | | X |
|     Delete | | | X |
| Open Position Option Buttons: | | | |
|     Close | X | X | X |
|     Edit | | | X |
|     Delete | | | X |
|     Expired | | | X |
|     Exercise | X | X | X |
| Dividend Buttons: | | | |
|     Edit | | | X |
|     Delete | | | X |
| Merger/Acquisition Buttons: | | | |
|     Edit | | | X |
|     Delete | | | X |
| Stock Split Buttons: | | | |
|     Edit | | | X |
|     Delete | | | X |
| Closed Position Security Buttons: | | | |
|     Undo | | | X |
| Closed Position Option Buttons: | | | |
|     Undo | | | X |

Figure 37c

SYSTEM AND METHODS FOR FINANCIAL INSTRUMENT TRADING AND TRADING SIMULATION USING DYNAMICALLY GENERATED TRADESCREENS

RELATED APPLICATIONS

This application is related to U.S. patent application Ser. No. 09/410,825, filed 1 Oct. 1999, entitled Asset/Liability Performance Tracking System and Method, the entirety of which is incorporated herein by reference.

BACKGROUND OF THE INVENTION

1. Field of the Invention

The invention relates generally to systems for trading or simulation of trading in financial instruments, such as securities and their derivatives.

2. Background Technology

The trading of financial instruments such as stocks, options, commodities futures, currency futures and the like is engaged in daily around the world on a vast scale.

The majority of this trading is done by professional money management organizations, such as brokerages and investment companies, in which professional money managers analyze and make investments for the portfolios of client persons and organizations. A smaller but growing segment of the trading population consists of on-line traders who engage in trading directly for their own portfolios.

A complex infrastructure exists to support the execution of trades on behalf of traders and related parties such as market makers and clearinghouses. However, tools for analyzing the effects of a transaction on a trader's portfolios are not as sophisticated. Currently the systems that execute transactions are not linked to systems that track portfolio status and performance, and so a trader desiring such information needs to perform a separate analysis using a spreadsheet. This requires a great deal of data entry and formula development that is time consuming and prone to errors, and is therefore not feasible to perform on a large scale or in a comprehensive manner for all available trading possibilities. Consequently, because traders must use one system to determine the effects of a hypothetical trade on the portfolio for which the trade is being made, and then use another system to actually execute the trade, they are unable to assess the effects of available trades on their portfolios in a convenient and meaningful way.

SUMMARY OF THE INVENTION

In accordance with a preferred embodiment of the invention described herein, a financial instruments trading system is provided with a front end user interface comprising dynamically generated executable tradescreens that calculate the effects that execution of a hypothetical trade or transfer will have on a corresponding portfolio and on aggregate holdings of that financial instrument in the portfolio, before the action is taken. This enables the user to try various "what if" scenarios to determine the trade or transfer producing a desired effect on the portfolio.

The tradescreens display current financial information for the portfolio and all positions held in a selected financial instrument in that portfolio. The tradescreens further include fields for entry of information characterizing a trade or transfer for opening or closing a position in the selected financial instrument, and routines for calculating revised financial information for the portfolio and the holdings in the selected financial instrument based on the entered information. The tradescreen further enables the trader to submit a request to execute the hypothetical trade or transfer from the tradescreen in accordance with the information entered into the tradescreen. The tradescreens are dynamically generated by a server based on portfolio data maintained in a portfolio database on the server, and are customized to the selected financial instrument and the type of action to be taken. The submission of a trade or a transfer causes data characterizing the trade or transfer to be communicated to the server, where the portfolio database and a general ledger are updated to reflect the trade or transfer. The server also dynamically generates reports describing various aspects of the portfolio and its holdings based on the data stored in the general ledger and the portfolio database.

Additional objects, features and advantages of the invention are set forth in the following description of a preferred embodiment and alternatives.

DESCRIPTION OF DRAWINGS

A preferred embodiment and alternatives are described herein in conjunction with the following figures.

FIG. 3 shows a symbol to action screen of the preferred embodiment.

FIGS. 4a, 4b and 4c show features of security summary reports of the preferred embodiment.

FIGS. 5a, 5b and 5c show features of add portfolio screens of the preferred embodiment.

FIGS. 9a, 9b, 9c and 9d show details of a tradescreen for opening a long position in a stock in accordance with the preferred embodiment.

FIGS. 10a, 10b, 10c and 10d show details of a tradescreen for closing a long position in a stock in accordance with the preferred embodiment.

FIGS. 11a, 11b, 11c and 11d show details of a tradescreen for opening a short position in a stock in accordance with the preferred embodiment.

FIGS. 12a, 12b, 12c and 12d show details of a tradescreen for closing a short position in a stock in accordance with the preferred embodiment.

FIGS. 13a, 13b, 13c and 13d show details of a tradescreen for opening a long position in a put in accordance with the preferred embodiment.

FIGS. 14a, 14b, 14c and 14d show details of a first tradescreen for closing a long position in a put in accordance with the preferred embodiment.

FIGS. 15a, 15b and 15c show details of a second tradescreen for closing a long position in a put in accordance with the preferred embodiment.

FIGS. 16a, 16b and 16c show details of a third tradescreen for closing a long position in a put in accordance with the preferred embodiment.

FIGS. 17a, 17b, 17c and 17d show details of a tradescreen for opening a long position in a call in accordance with the preferred embodiment.

FIGS. 18a, 18b, 18c and 18d show details of a first tradescreen for closing a long position in a call in accordance with the preferred embodiment.

FIGS. 19a, 19b and 19c show details of a second tradescreen for closing a long position in a call in accordance with the preferred embodiment.

FIGS. 20a, 20b and 20c show details of a third tradescreen for closing a long position in a call in accordance with the preferred embodiment.

FIGS. 21a, 21b, 21c and 21d show details of a tradescreen for opening a covered short position in a put in accordance with the preferred embodiment.

FIGS. 22a, 22b, 22c and 22d show details of a first tradescreen for closing a covered short position in a put in accordance with the preferred embodiment.

FIGS. 23a, 23b and 23c show details of a second tradescreen for closing a covered short position in a put in accordance with the preferred embodiment.

FIGS. 24a, 24b and 24c show details of a third tradescreen for closing a covered short position in a put in accordance with the preferred embodiment.

FIGS. 25a, 25b, 25c and 25d show details of a tradescreen for opening an uncovered short position in a put in accordance with the preferred embodiment.

FIGS. 26a, 26b, 26c and 26d show details of a first tradescreen for closing an uncovered short position in a put in accordance with the preferred embodiment.

FIGS. 27a, 27b and 27c show details of a second tradescreen for closing an uncovered short position in a put in accordance with the preferred embodiment.

FIGS. 28a, 28b and 28c show details of a third tradescreen for closing an uncovered short position in a put in accordance with the preferred embodiment.

FIGS. 29a, 29b, 29c and 29d show details of a tradescreen for opening a covered short position in a call in accordance with the preferred embodiment.

FIGS. 30a, 30b, 30c and 30d show details of a first tradescreen for closing a covered short position in a call in accordance with the preferred embodiment.

FIGS. 31a, 31b and 31c show details of a second tradescreen for closing a covered short position in a call in accordance with the preferred embodiment.

FIGS. 32a, 33b and 34c show details of a third tradescreen for closing a covered short position in a call in accordance with the preferred embodiment.

FIGS. 33a, 33b, 33c and 33d show details of a tradescreen for opening an uncovered short position in a call in accordance with the preferred embodiment.

FIGS. 34a, 34b, 34c and 34d show details of a first tradescreen for closing an uncovered short position in a call in accordance with the preferred embodiment.

FIGS. 35a, 35b and 35c show details of a second tradescreen for closing an uncovered short position in a call in accordance with the preferred embodiment.

FIGS. 36a, 36b and 36c show details of a third tradescreen for closing an uncovered short position in a call in accordance with the preferred embodiment.

FIGS. 37a, 37b and 37c show implementation options provided in various implementation environments in accordance with the preferred embodiment.

DETAILED DESCRIPTION OF PREFERRED EMBODIMENT

Definitions

The following meanings are intended for the following terms in this disclosure:

FINANCIAL INSTRUMENT: a tradable interest in a title to, or a license, contract or right relating to, a tangible or intangible asset, such as a stock or option.

POSITION: an interest in a financial instrument. Positions include long positions, covered short positions, and uncovered short positions. The creation of a position is referred to as "opening" the position, and the termination of a position is referred to as "closing" the position.

LONG POSITION: a position involving ownership of a financial instrument.

SHORT POSITION: a position involving the sale of a financial instrument owned by another in exchange for an interest payment on the value of the financial instrument and the obligation to return the same financial instrument to the other at a later date.

COVERED SHORT POSITION: a short position in which the position holder possesses another financial instrument of the same type as the one for which the short position has been assumed, such that the currently owned financial instrument may be provided to the owner of the shorted financial instrument if necessary.

UNCOVERED SHORT POSITION: a short position entered without possessing another financial instrument of the same type as the instrument being shorted.

SECURITY: a share of a company (stock), mutual fund or investment trust, index, or commodity, including any related derivative financial instrument.

OPTION: a contract giving the right to buy or sell a stock, index, or commodity, including any related derivative financial instrument at a given "strike price". An option has a contract price and an expiration date. A position in an option may be closed through an offsetting transaction, through exercise of the option, or through expiration of the option.

PUT: an option giving the right to sell a stock, index, or commodity, including any related derivative financial instrument at a given strike price.

CALL: an option giving the right to buy a stock, index, or commodity, including any related derivative financial instrument at a given strike price.

System Architecture

Figure 1A:
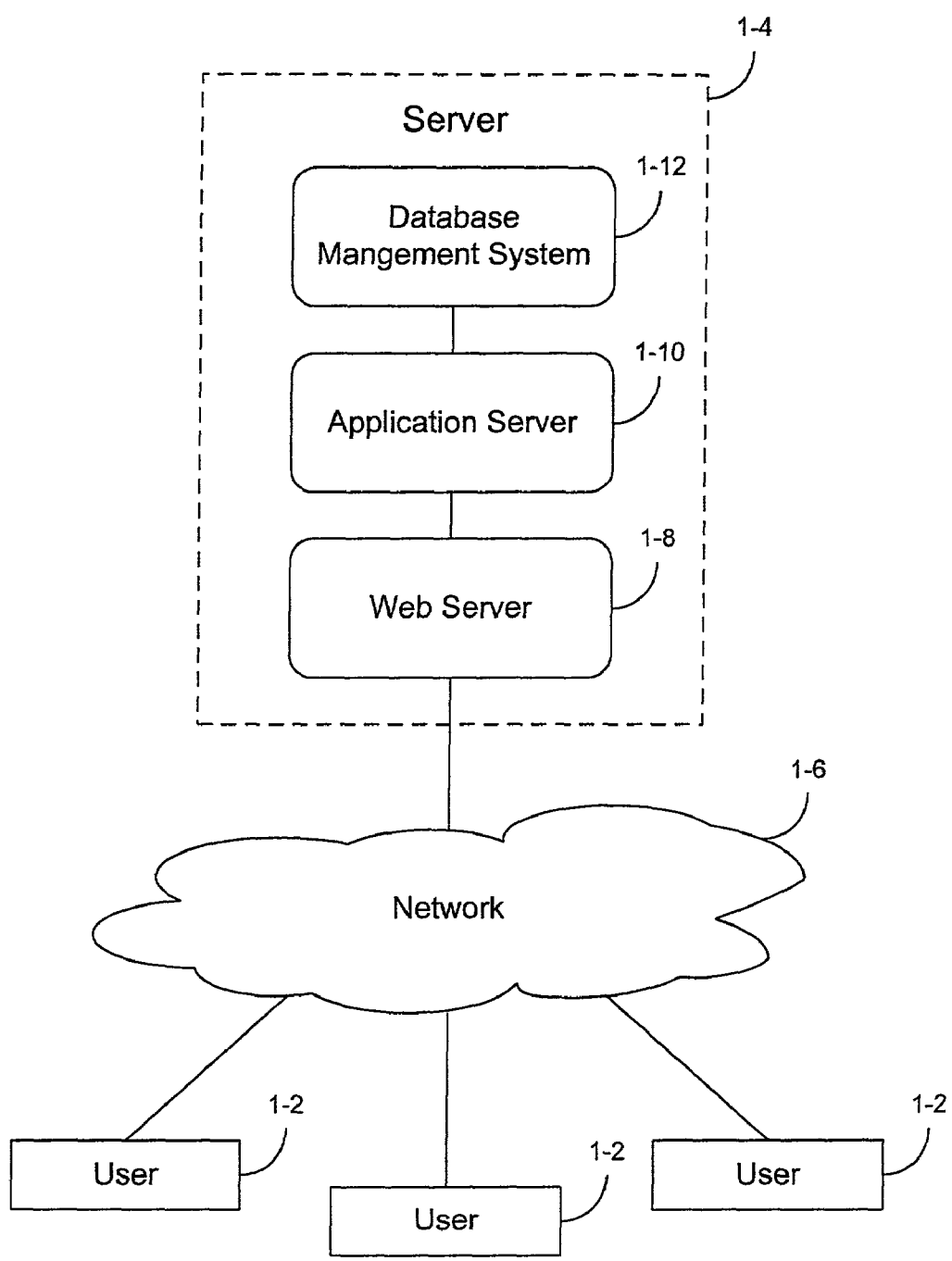
FIGS. 1a and 1b show high level hardware and software architectures of the preferred embodiment.
Figure 1B:
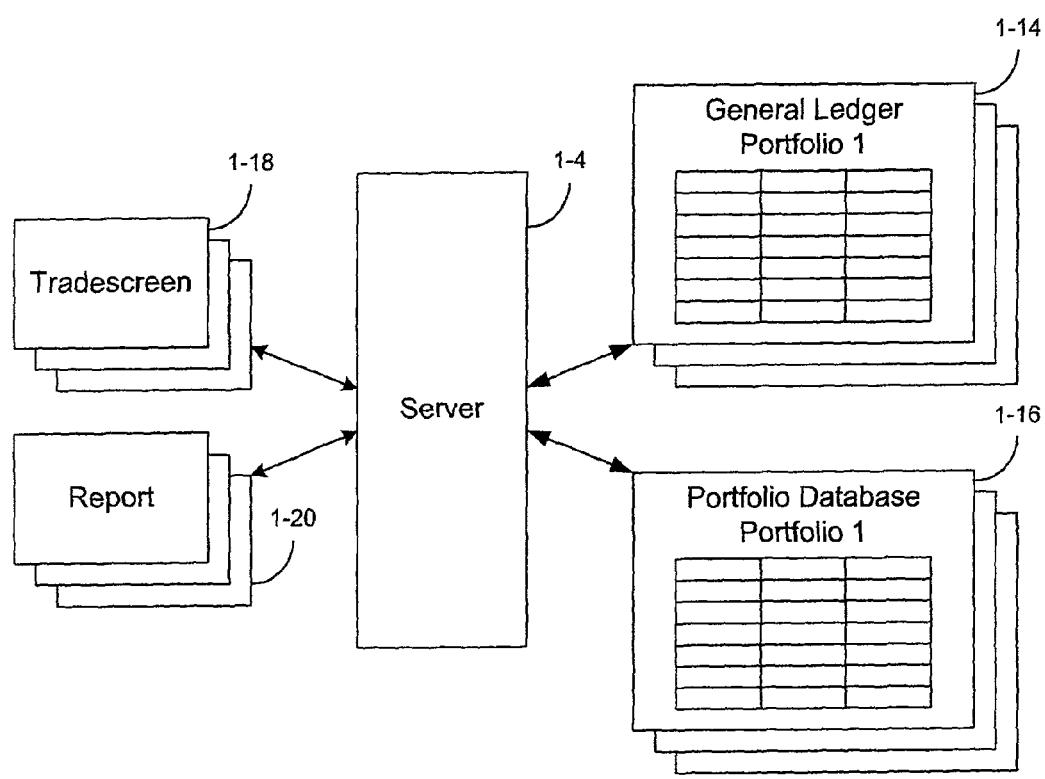

FIGS. 1a and 1b provide high level illustrations of the hardware architecture and software architecture of a system in accordance with a preferred embodiment of the invention. As shown in FIG. 1a, the system is implemented as a client-server architecture, in which users 1-2 interact with a server 1-4 through a network 1-6. The network may be any network such as an intranet, wide area network or the internet, or any wireless network, or a combination of both. The server 1-4 includes a web server 1-8 for receiving user requests and dynamically generating files such as tradescreens or reports that are then provided to the user. The server 1-4 further includes an application server 1-10 and a database management system (DBMS) 1-12.

As shown in FIG. 1b, the server 1-4 maintains a general ledger 1-14 and a portfolio database 1-16 for each portfolio served by the system. The data in the portfolio databases 1-16 is used by the server 1-4 to dynamically generate executable tradescreens 1-18. Each tradescreen displays current financial information for a selected portfolio and any positions held in that portfolio in a selected financial instrument. Each tradescreen also provides fields for entry of data characterizing a hypothetical trade or transfer involving the selected financial instrument, and includes routines that calculate revised information for the portfolio and the holdings in the selected financial instrument reflecting changes that would occur if the trade or transfer is executed. In the preferred embodiment the tradescreens are provided as dynamically generated FLASH documents that include XML calculation routines, and may be executed using a standard browser application. In alternative embodiments other implementations such as HTML documents with javascript routines may be employed. The server 1-4 also generates reports 1-20 that describe various aspects of the user's holdings based on the data stored in the portfolio databases 1-16.

Figure 1C:
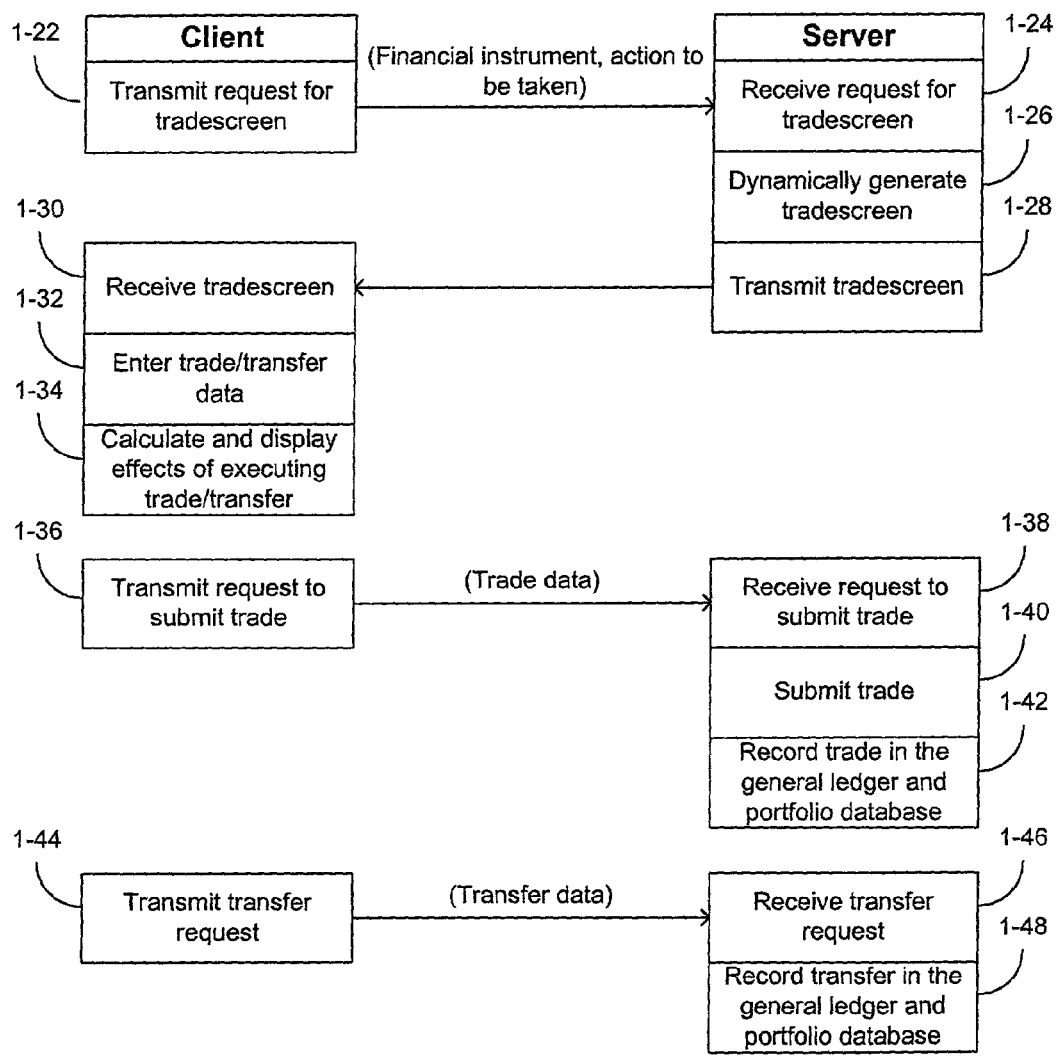
FIG. 1c shows a high level diagram of interaction between a server and a client in accordance with the preferred embodiment.

FIG. 1c shows a high level diagram of interaction between a server and a client in accordance with preferred embodiment of the invention. Typically the client initiates interaction by transmitting a request for a tradescreen (1-22). The request specifies a financial instrument and a type of action to be taken (opening or closing a long or short position). The request is received at the server (1-24), and the requested tradescreen is dynamically generated (1-26) using data for the selected portfolio stored in the corresponding portfolio database in the server. The tradescreen is then transmitted to the client (1-28). Once the tradescreen is received (1-30), a user enters data characterizing a hypothetical trade or transfer (1-32). The tradescreen calculates and displays revised financial information for the portfolio and holdings in the selected financial instrument reflecting changes that would occur if the trade or transfer is executed (1-34). The user may perform data entry and calculation as many times as desired to evaluate various "what if" scenarios in order to determine a trade or transfer that produces desired results.

If a desired trade has been determined, the user may transmit a request to the server to submit the trade for execution (1-36). The request includes trade data that was entered in the tradescreen. When the request is received (1-38), the server submits the trade (1-40), and records the trade in the general ledger and the portfolio database for the corresponding portfolio (1-42). Alternatively, the client may transmit a transfer request (1-44). The transfer request includes transfer data that was entered in the tradescreen. When the server receives the transfer request (1-46), the transfer is recorded in the general ledger and the portfolio database for the corresponding portfolio (1-48).

User Interface

Figure 2:
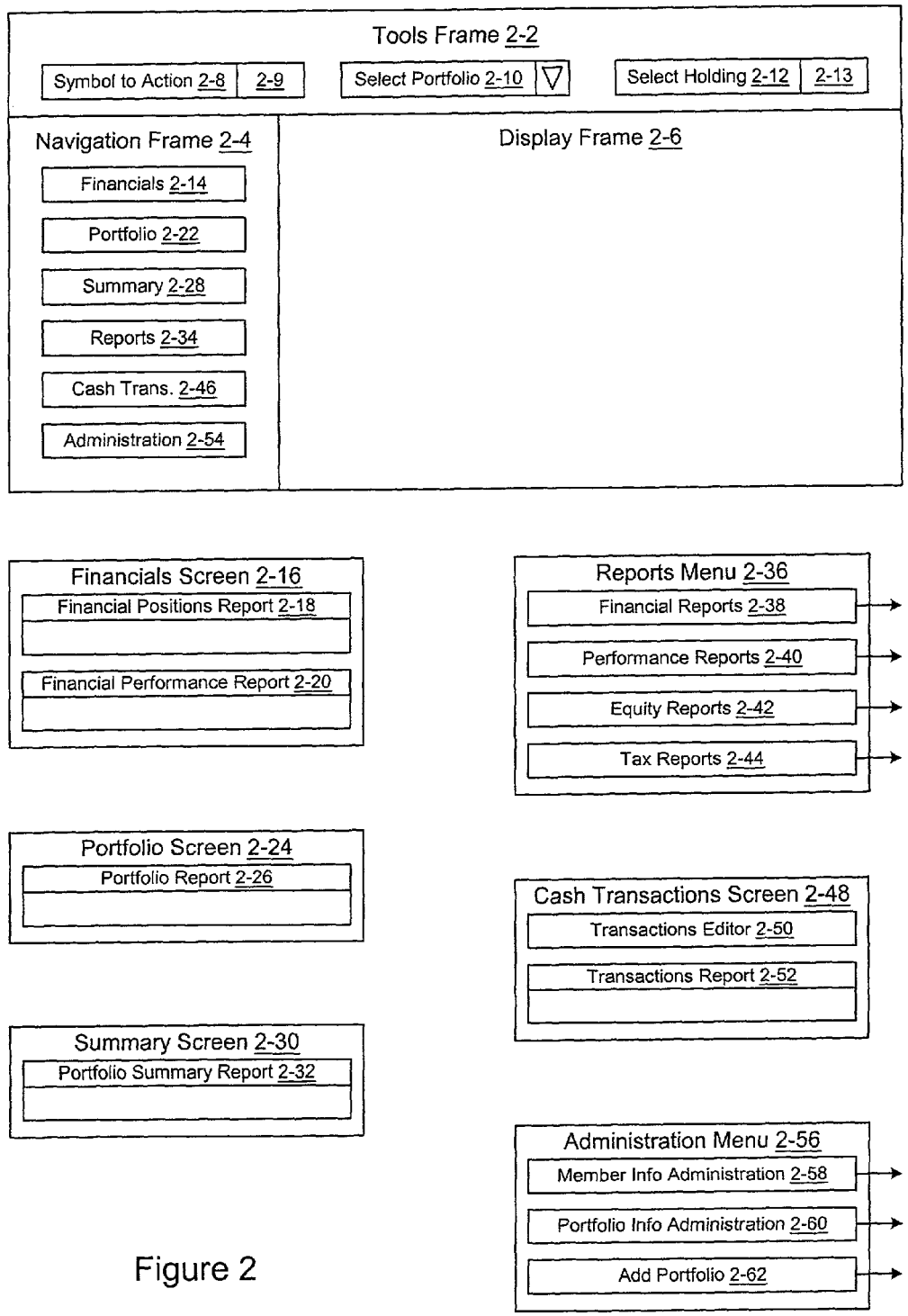
FIG. 2 shows a basic user interface layout in accordance with the preferred embodiment.

FIG. 2 provides a generic illustration of a user interface and related navigation options in accordance with the preferred embodiment. The user interface comprises a tools frame 2-2, a navigation frame 2-4, and a display frame 2-6. The tools frame 2-2 provides tools that may be operated by the user including a symbol to action tool 2-8 for displaying a symbol to action screen that in turn enables the user to request a tradescreen for a selected financial instrument, a select portfolio tool 2-10 for selecting a particular portfolio for which tradescreens or reports are to be generated, and a select individual holding tool 2-12 for selecting a financial instrument for which a summary report is to be generated.

The symbol to action tool 2-8 of the preferred embodiment includes a symbol box 2-9 in which the user may enter the stock ticker of a selected financial instrument for which a symbol to action screen is desired. FIG. 3 illustrates details of a symbol to action screen 3-2 for the stock AOL that is provided in response to operation of the symbol to action tool 2-8. The symbol to action screen includes a market data section 3-4 that provides current market data for the selected financial instrument. The symbol to action screen 3-2 further includes several tools, presented in the user interface as buttons, for requesting tradescreens for opening various types of positions in the selected financial instrument. The tools include a buy long open tool 3-6, a sell short open tool 3-8, a put tool 3-10, a call tool 3-12, and an option combination tool 3-14 for various combinations of options transactions such as straddles, spreads and strangles ("S/S/S"). The symbol to action screen 3-2 further includes reports itemizing any positions held in the selected financial instrument and its derivatives, including a stock report 3-16, a put report 3-18, and a call report 3-20. Each position itemized in each report has associated therewith a close tool 3-22 that may be used to request a tradescreen for closing the position, as described in detail below.

Returning to the user interface of FIG. 2, the select holding tool 2-12 of the tools frame 2-2 includes a symbol box 2-13 in which the user may enter the stock ticker of a financial instrument for which a summary report is desired. FIGS. 4a-4c show three sections of a summary reports that are generated in response to operation of the select holding tool 2-12. An open positions section of the summary report is shown in FIG. 4a. The open positions section includes tools presented as buttons for navigating among the sections of the summary report, including open positions tool 4-2, a closed positions tool 4-4, and a corporate actions tool 4-6. Each of the sections of the report presents these tools to facilitate navigation. The open positions section includes a holding and performance section 4-8 providing holding and performance information. A stock section 4-10 describes individual holdings in the selected stock, and provides tools 4-12, 4-14 for requesting tradescreens for opening additional positions in the stock. A puts section 4-16 describes individual holdings in puts of the selected stock, and provides tools 4-18, 4-20, 4-22 for requesting tradescreens for opening additional positions in the puts. A calls section 4-24 describes individual holdings in calls of the selected stock, and provides tools 4-26, 4-28, 4-30 for requesting tradescreens for opening additional positions in the calls. Each position in each of the sections 4-10, 4-16, 4-24 has associated therewith a close tool 4-32 for requesting a tradescreen for closing the corresponding position.

FIG. 4b shows the closed position section of the summary report. The closed position section includes navigation tools 4-2, 4-4, 4-6 and a history and performance section 4-8. The closed position section further includes a stock section 4-34 describing individual closed positions in the selected stock, a puts section 4-36 describing individual closed positions in puts of the selected stock, and a calls section 4-38 describing individual closed positions in calls of the selected stock.

FIG. 4c shows the corporate action section of the summary report. The corporate action section includes a dividends report 4-40 showing dividends declared for the selected security, a stock split report 4-42 describing stock splits for the selected security, and a mergers report 4-44 describing mergers affecting the selected security. The corporate action section also includes tools that enable the user to enter information regarding particular corporate actions, including a stock dividend editor 4-46, a cash dividend editor 4-48, a stock split editor 4-50, and a merger editor 4-52.

Returning again to the user interface of FIG. 2, the navigation frame 2-4 of the user interface provides navigation tools that control the content displayed in the display frame 2-6. A financials tool 2-14 initiates the generation of a financial reports screen 2-16. The financial reports screen 2-16 includes a financial positions report 2-18 that provides information concerning the assets, liabilities and net worth of the selected portfolio, and a financial performance report 2-20 that provides information concerning the profit/loss activity to date of the selected portfolio.

The navigation frame 2-4 also includes a portfolio tool 2-22 that initiates the display of a portfolio screen 2-24. The portfolio screen includes a portfolio report 2-26 that provides descriptive and performance information concerning each individual holding in the selected portfolio.

The navigation frame 2-4 further includes a summary tool 2-28 that initiates the display of a summary screen 2-30 providing a portfolio summary report 2-32 for the selected portfolio, showing information such as net worth, portfolio value, buying power, tax liabilities, and gains and losses.

The navigation frame 2-4 also includes a reports tool 2-34 that initiates the display of a reports menu 2-36. The reports menu 2-36 provides links to a wide variety of detailed reports for the selected portfolio. The available reports include financial reports 2-38 including a portfolio summary, financial statements, cash balance activity, investment portfolio, margin payable activity, taxes payable, cash invested activity, gains/losses, dividend/interest, commissions fees and costs, margin interest, and tax expenses. Also available are performance reports 2-40 including a portfolio summary, gains/losses, performance details, return on securities, return on cash invested, and commission analysis. The available reports further include equity reports 2-42 such as a portfolio summary, short cash restricted/margin requirements, long margin available margin requirements, and equity maintenance and buying power. The available reports also include tax reports 2-44 such as a portfolio summary taxes payable, tax expenses, wash sales warnings, wash sales status, and a Schedule D report. Examples of these reports are described further in U.S. Pat. No. 7,165,044, entitled "Investment Portfolio Tracking System and Method," the entirety of which is incorporated herein by references for its teachings regarding report generation and types of reports.

The navigation frame 2-4 further includes a cash transactions tool 2-46 that initiates the display of a cash transactions screen 2-48. The cash transactions screen 2-48 includes a transactions editor 2-50 that enables the user to enter information concerning a wide variety of portfolio related cash transactions including cash deposit, cash withdrawal, cash withdrawal for federal taxes, cash withdrawal for state taxes, cash interest earned, margin interest borrowed, margin interest paid, margin borrowed, margin paid, and management fees. The transactions screen further includes a transactions report 2-52 detailing all transactions recorded for the selected portfolio.

The navigation frame 2-4 further includes an administration tool 2-54 that initiates display of an administration menu 2-56. The administration menu 2-56 include a member information administration tool 2-58 that initiates a member information editor, a portfolio information administration tool 2-60 that initiates a portfolio information editor, and an add portfolio tool 2-62. FIGS. 5a-5c show editors generated by the add portfolio tool 2-62. A preliminary screen provided by the add portfolio tool is shown in FIG. 5a. The preliminary screen includes fields that enable the user to enter data concerning the portfolio name 5-2, portfolio type 5-4, brokerage firm 5-6, broker 5-8, and broker telephone number 5-10. The portfolio type field 5-4 is provided as a drop-down list containing the types of portfolios that may be set up, including taxable, tax shelter annuity, IRA (traditional, spousal, nondeductible, Roth, and education), pension plan (IRA, SEP-self, SEP-employee, simple, Keogh-DB, Keogh-DC-MP, Keogh-DC-PS, Keogh-DC-C, TSA403b, nonqualified DC, and 401 (k), and rollover. A submit tool 5-12 enables the user to submit the information entered in the preliminary screen.

If the type of portfolio chosen by the user is taxable, the user is presented with a taxable portfolio set up screen as shown in FIG. 5b. The taxable portfolio set up screen includes a section 5-14 for entering financial/brokerage statement tracking information, and a section 5-16 for entering tax rate information. A submit tool 5-18 enables the user to submit the entered information.

If the type of portfolio chosen by the user is tax deferred, the user is presented with a tax-deferred portfolio set up screen as shown in FIG. 5c. The tax deferred portfolio set up screen includes a section 5-20 for entering financial/brokerage statement tracking information, a section 5-22 for entering tax rate information, and a section 5-24 for entering penalty information. A submit tool 5-26 enables the user to submit the entered information. The types of tax rates and penalties applicable to the various types of portfolios that may be set up are shown in FIG. 5d.

Organization of Tradescreens for Opening and Closing Positions

The system of the preferred embodiment enables the user to request and receive tradescreens for calculating the effects of hypothetical opening transactions and for initiating hypothetical opening transactions through the symbol to action screen illustrated in FIG. 3. In particular, the symbol to action screen links the user to tradescreens for opening long or short positions in the selected security, as well as links to put and call options screens for the selected security. The put and call options screens in turn provide links to tradescreens for opening long, short, and covered short positions in puts or calls for the selected security. The security summary screen of FIG. 4a also links the user to a tradescreens for opening long and short positions in the selected security.

Figure 6A:
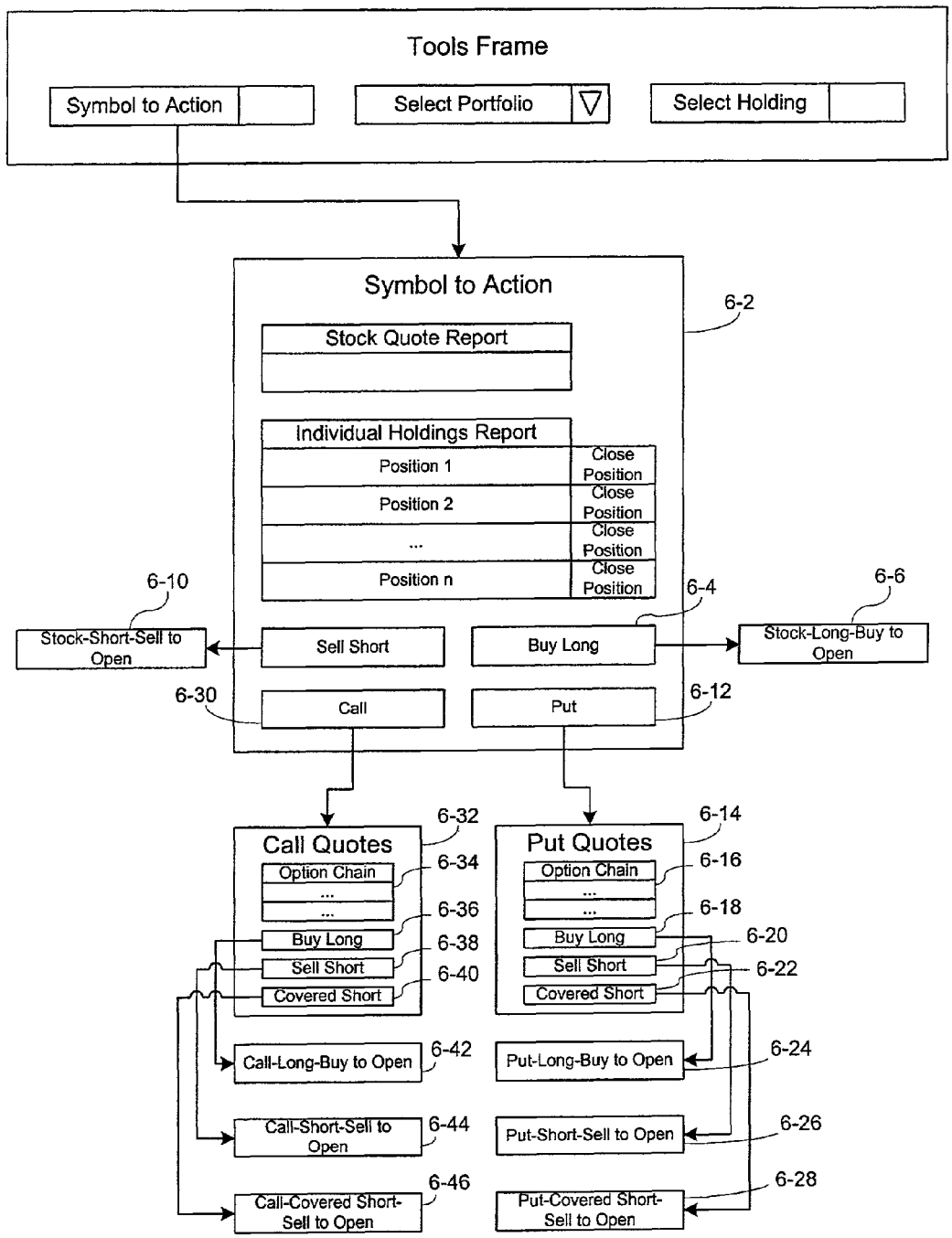
FIGS. 6a and 6b show an organization of screens and tradescreens for transactions for opening positions in accordance with the preferred embodiment.
Figure 6B:
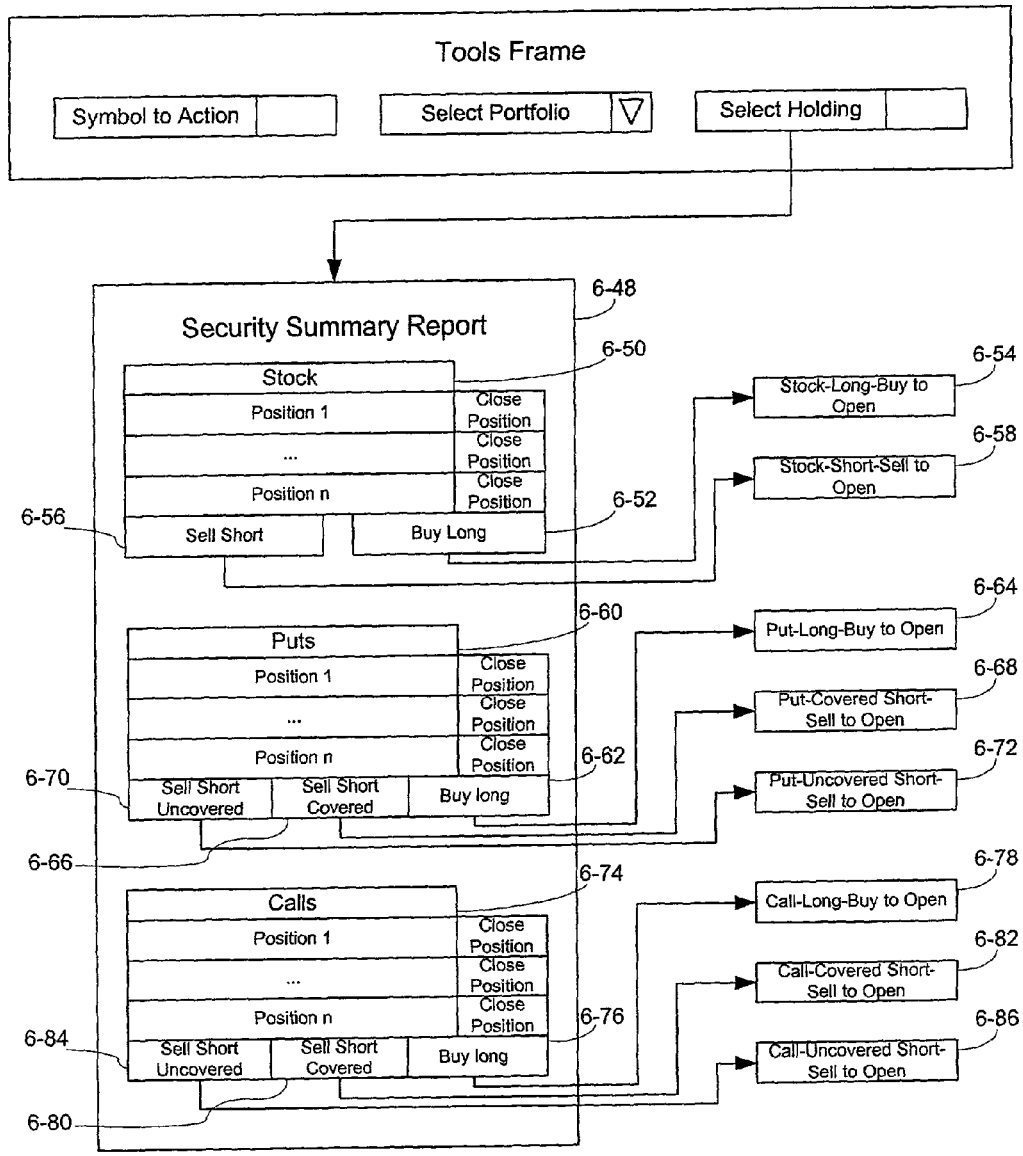

The organization of opening transaction tradescreens is illustrated in FIGS. 6a and 6b. FIG. 6a shows ways of requesting tradescreens for opening positions from the symbol to action screen. As shown in FIG. 6a, the symbol to action screen 6-2 for a given security includes a link 6-4 to a screen 6-6 including a tradescreen for a hypothetical purchase of the security to open a long position in the security. Operation of the link issues a request to the server for a dynamically configured tradescreen for opening a long position in the selected security for the selected portfolio. The symbol to action screen also includes a link 6-8 to a screen 6-10 including a tradescreen for a hypothetical short sale of the security to open a short position in the security. Operation of the link issues a request to the server for a dynamically configured tradescreen for opening a short position in the selected security for the selected portfolio.

The symbol to action screen also includes links to further screens for options in the selected security. A put link 6-12 provides a link to a put option quotes screen 6-14 that provides a put options chain report 6-16 for the security, and links 6-18, 6-20, 6-22 that issue requests for screens including tradescreens for opening long 6-24, short 6-26, and covered short 6-28 positions in a selected option from the put option chain. Similarly, a call link 6-30 provides a link to a call option quotes screen 6-32 that provides a call options chain report 6-34 for the security, and links 6-36, 6-38, 6-40 that issue requests for screens including tradescreens for opening long 6-42, short 6-44, and covered short 6-46 positions in a selected option from the call option chain.

FIG. 6b shows ways of requesting tradescreens for opening positions from the security summary report. As shown in FIG. 6b, a stock section 6-50 of the security summary report 6-48 includes a buy long tool 6-52 that issues a request for a stock long buy to open tradescreen 6-54, and a sell short tool 6-56 that issues a request for stock short sell to open tradescreen

6-58. A puts section 6-60 of the security summary report includes a buy long tool 6-62 that issues a request for a put long buy to open tradescreen 6-64, a sell short covered tool 6-66 that issues a request for put covered short sell to open tradescreen 6-68, and a sell short uncovered tool 6-70 that issues a request for put covered short sell to open tradescreen 6-72. A calls section 6-74 of the security summary report includes a buy long tool 6-76 that issues a request for a call long buy to open tradescreen 6-78, a sell short covered tool 6-80 that issues a request for call covered short sell to open tradescreen 6-82, and a sell short uncovered tool 6-84 that issues a request for call covered short sell to open tradescreen 6-86.

The system of the preferred embodiment also enables the user to request and receive tradescreens for closing transactions through several mechanisms. The open positions report in the symbol to action screen lists all positions held in the selected portfolio and provides a close link for with each position that requests a tradescreen for closing the position. Similarly, by operating the select holding tool of the user interface tools frame, the user is presented with an open positions screen that lists all individual positions held in the selected security. A close link associated with each position requests a tradescreen for closing the position. In addition, by operating the summary tool in the navigation frame of the user interface, the user is presented with a portfolio summary screen including a portfolio holdings report. A close link associated with each position listed in the holding report links to a screen including a tradescreen for an appropriate closing transaction for that position.

Figure 7A:
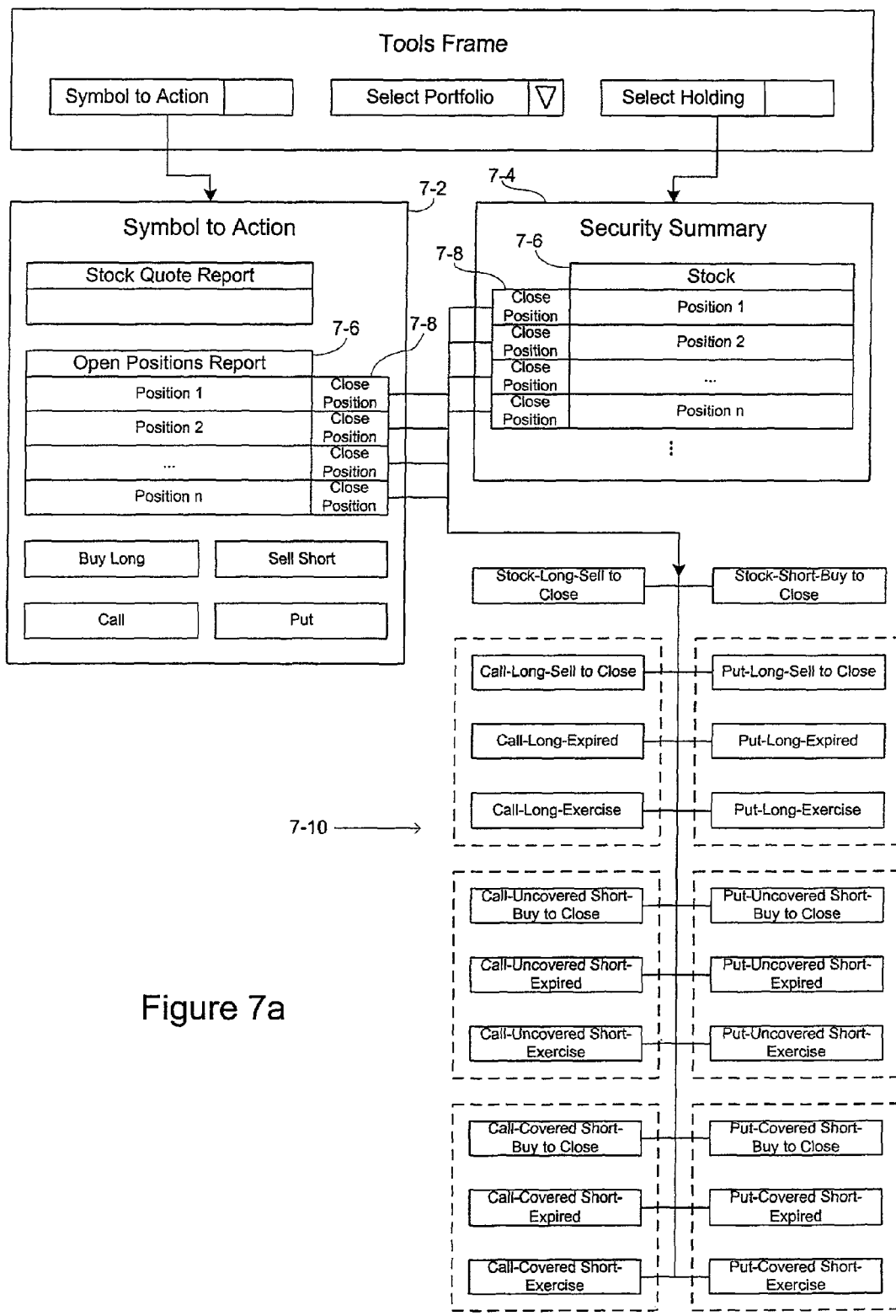
FIGS. 7a and 7b show an organization of screens and tradescreens for transactions for closing positions in accordance with the preferred embodiment.
Figure 7B:
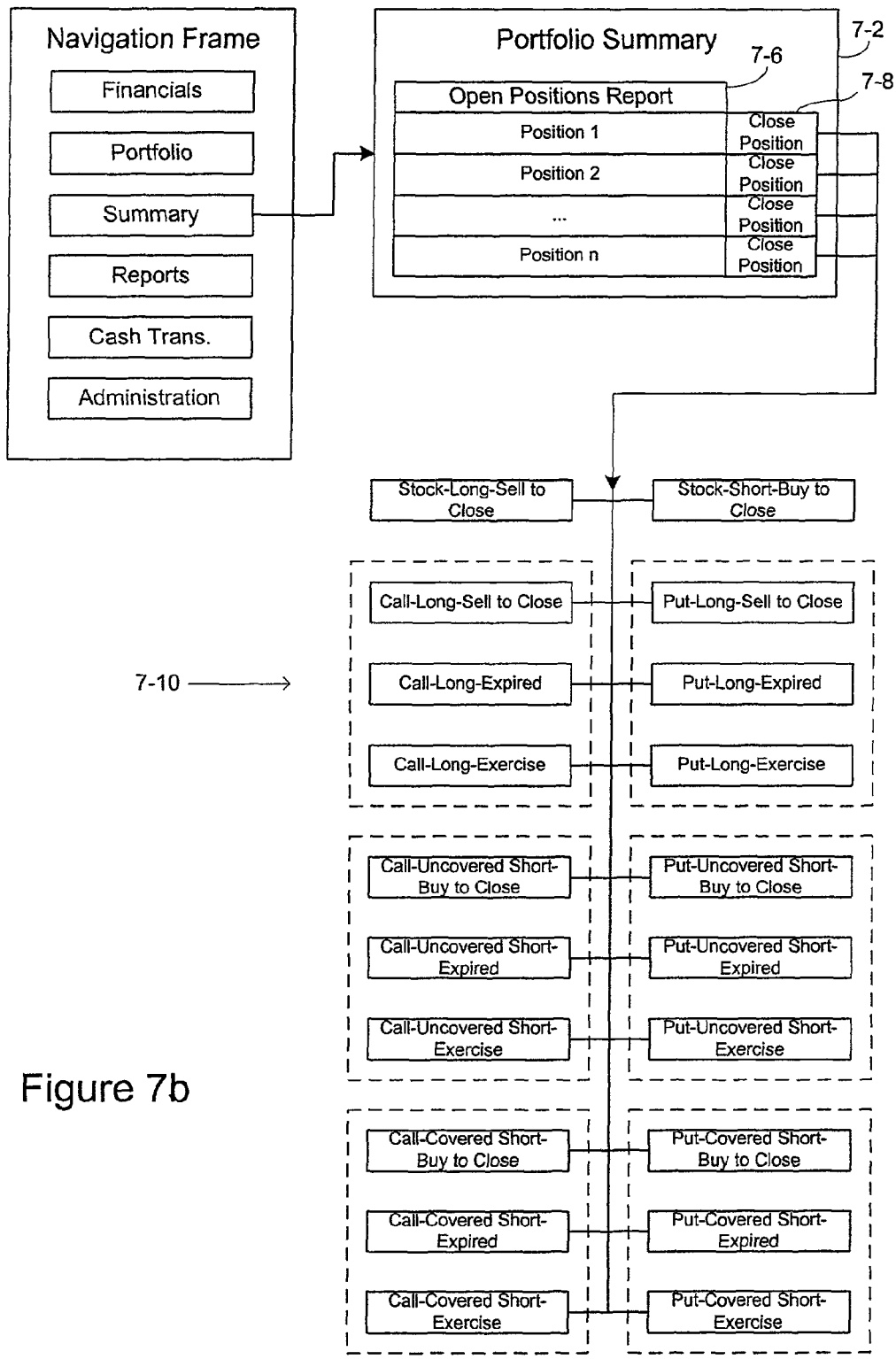

The organization of closing transaction tradescreens is illustrated in FIGS. 7*a* and 7*b*. FIG. 7*a* shows the symbol to action screen 7-2 and the security summary screen 7-4 that may be accessed by operating tools of the tools frame. Each of these screens includes one or more reports 7-6 showing open positions, and each position included each report 7-6 has associated with it a close link 7-8. The close links 7-8 issue requests for a screen 7-10 containing an appropriate tradescreen for a trade or transfer to close the position. Similarly, as shown in FIG. 7*b*, a user may access a portfolio summary screen 7-12 for a selected portfolio through operation of the summary tool in the navigation frame of the user interface. The portfolio summary screen includes a portfolio holdings report 7-14 that includes descriptions of each position held in the portfolio. Each position has associated with it a close link 7-8 that issues a request for a screen 7-10 containing an appropriate tradescreen for a closing transaction for the position.

In the case of a long or short position in a security, a single close link is associated with that position since there is only one manner of closing those types of positions. In the case of options in the selected security, three distinct close links may be provided for closing the position through an appropriate offsetting transaction (i.e. a purchase or sale), through exercising the option, and through expiration of the option.

Generic Tradescreen Model

Figure 8:
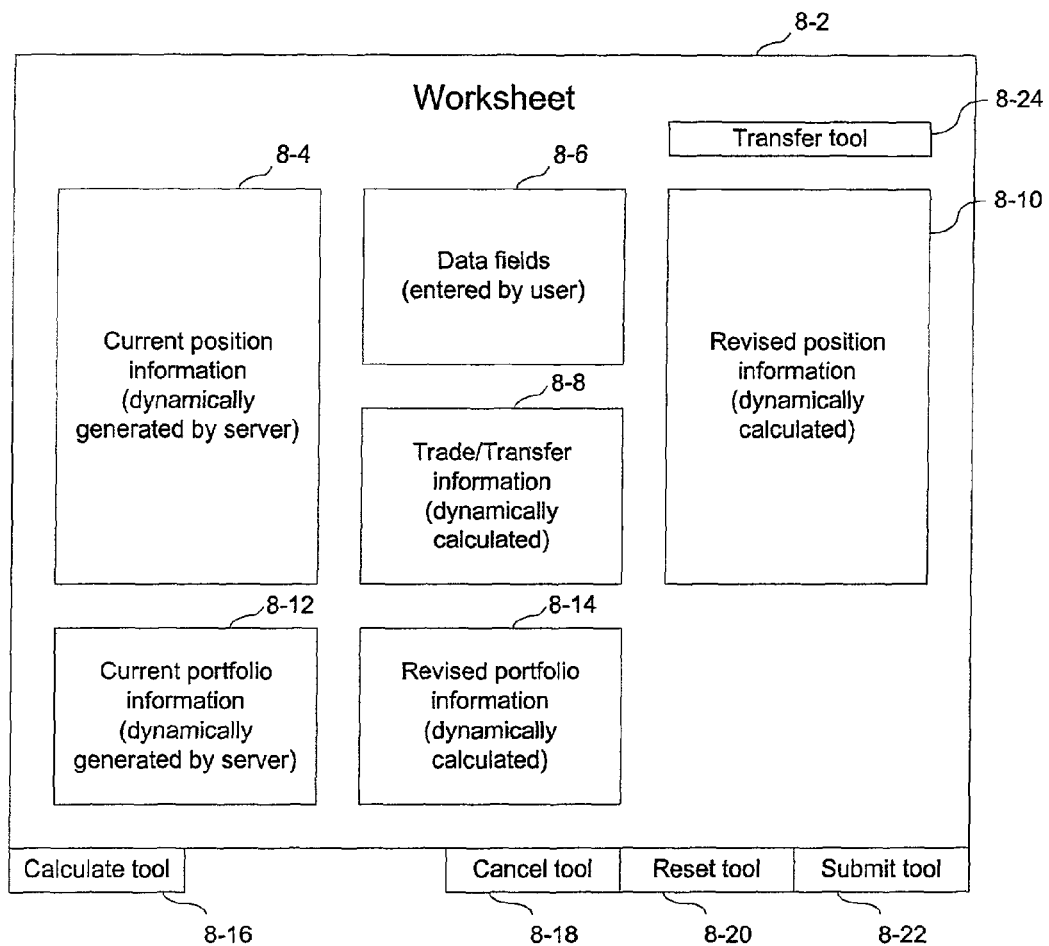
FIG. 8 shows the generic model for tradescreens in accordance with the preferred embodiment.

FIG. 8 shows a generic model for tradescreens in accordance with the preferred embodiment. The generic layout of information display and entry fields shown in FIG. 8 approximates the actual layout of specific display and entry fields in the actual tradescreens of the preferred embodiment discussed below. The information content of each tradescreen depends on the type of financial instrument and the action to be taken.

The tradescreen 8-2 includes current position information 8-4 reflecting the current positions (if any) in a selected security or option that are held in a selected portfolio. This information is dynamically generated by the server using data from the portfolio database for the selected portfolio. The tradescreen further includes fields 8-6 into which the user is enabled to enteF data characterizing the parameters of a hypothetical trade or transfer, such as a number of shares. Using the entered data, the current position information, and other information previously set up for the portfolio, routines embedded in the tradescreen calculate additional trade or transfer information 8-8, such as cash invested. The tradescreen also calculates revised position information 8-10 that shows revised values for the quantities displayed in the current position information that reflect changes that will occur if the trade or transfer is executed. The typical user will find this information very useful because it quickly provides an analysis of the effects of a trade or transfer on the overall holdings of the security or option before the trade or transfer is submitted for execution.

The tradescreen also includes current portfolio information 8-12 reflecting the overall financial position of the portfolio as a whole. This information is dynamically generated by the server using data from the general ledger for the selected portfolio. Examples of current portfolio information are current buying power and cash available. Using the current portfolio information 8-12, the data 8-6 entered by the user, and other information previously set up for the portfolio, the routines embedded in the tradescreen calculate revised portfolio information 8-14 that shows revised values for the quantities displayed in the current portfolio information reflecting changes that will occur if the hypothetical trade or transfer is executed. The typical user will find this information very useful because it quickly provides an analysis of the effects of a trade or transfer on the portfolio as a whole before the trade or transfer is executed.

The generic tradescreen 8-2 also contains several user operated tools. A calculate tool 8-16 causes all calculable quantities in the tradescreen to be recalculated based on currently entered transaction data. A cancel tool 8-18 cancels the current tradescreen. A reset tool 8-20 resets all entered values in the tradescreen. A submit tool 8-22 submits the trade or transfer for execution based on the quantities currently entered in the tradescreen.

A transfer tool 8-24 is also provided. The transfer tool 8-24 is used to indicate whether the action to be taken is a trade or a transfer into or out of the portfolio. When the transfer tool 8-24 has been used to indicate a transfer, the operation of the submit tool 8-22 causes the general ledger and portfolio database for the selected portfolio to be updated in the server, but no trade is submitted for execution.

Tradescreen for Opening Long Positions in Securities

Figure 9B:
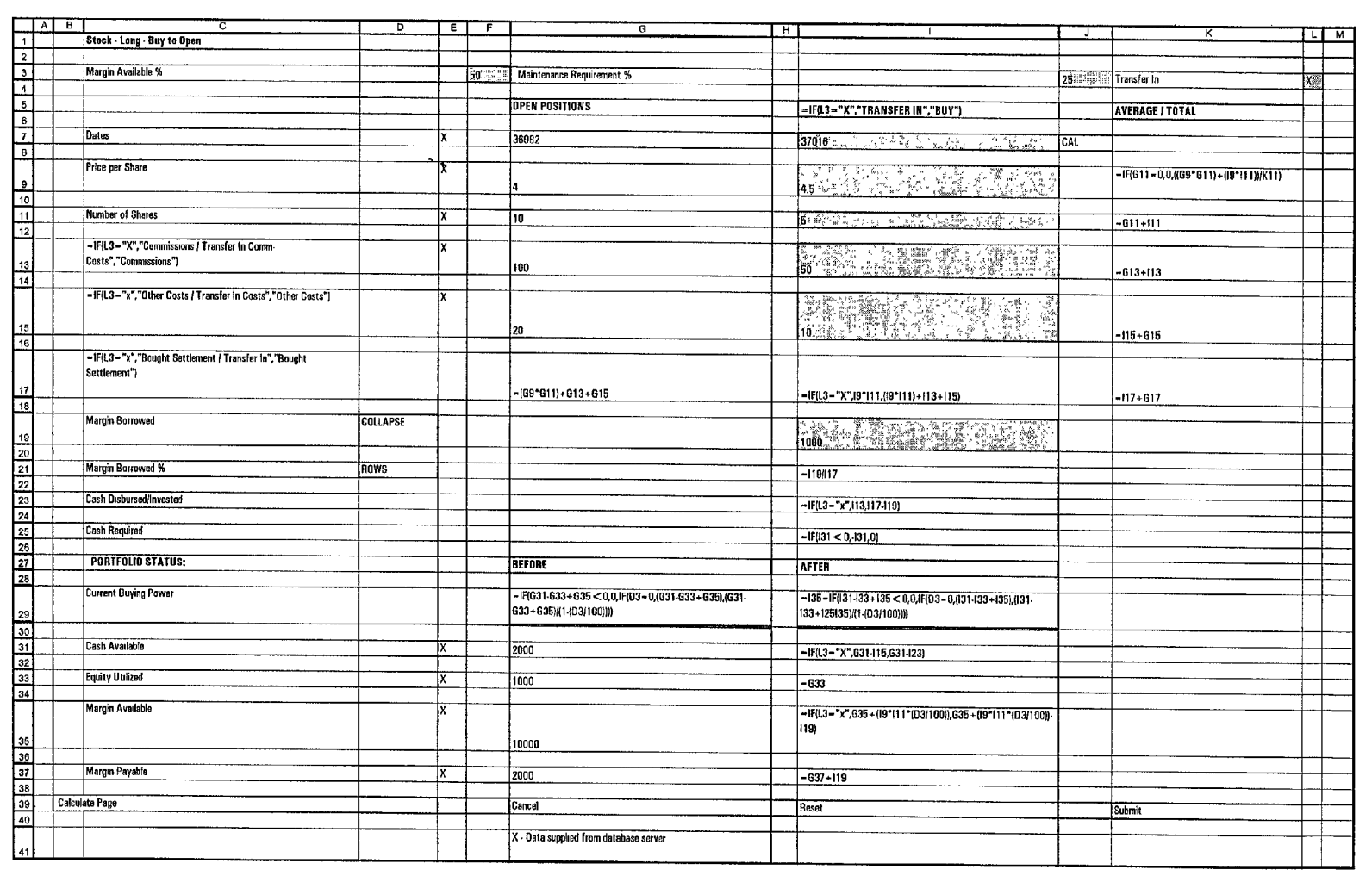

A tradescreen provided to a user for opening a long position in a security is illustrated in FIG. 9*a*. The gray boxes of FIG. 9*a* are fields in which data may be entered by the user. An Excel implementation of the routines embedded in the tradescreen of FIG. 9*a* is illustrated in FIG. 9*b*. The fields of the tradescreen of FIG. 9*a* are provided with cell references for purposes of correlation with FIG. 9*b*. General ledger debit and credit entries for the trade illustrated in FIG. 9*a* and for a transfer using the same numbers are shown in FIG. 9*c*. A version of the tradescreen for a transfer using the same numbers is illustrated in FIG. 9*d*.

The tradescreen of FIG. 9*a* presents current position information for the selected security in the column headed "Open Positions." This information is dynamically generated by the server using data stored in the portfolio database for the selected portfolio. The current position information includes the date (or date range) of the opening of existing positions in the selected security (G7), price per share (G9), number of shares (G11), commissions paid (G13), other costs (G15), bought settlement (G17), margin borrowed (G19), and margin borrowed % (G21). The tradescreen also presents current information for the portfolio as a whole under the heading "Before." This information includes current buying power (G29), cash available (G31), equity utilized (G33), margin available (G35) and margin payable (G37).

The tradescreen also includes fields for entering data characterizing a trade. The fields for entering trade data are provided under the heading "Buy." They include fields for the trade date (I7), price per share (I9), number of shares (I11), commissions paid (I13), other costs (I15), margin borrowed (I19). The tradescreen also includes a margin available % field (D3) for entering a maximum percentage eligible to be paid for on margin. In accordance with current federal regulations, this amount cannot exceed 50%. A maintenance requirement may be entered in the "Maintenance Requirement %" field (H3). Currently, regulations require this amount to be in the range of 25 to 100.

Using the information entered in the aforementioned fields, the tradescreen calculates revised portfolio information and revised holdings information reflecting changes that will occur if the hypothetical trade is executed. Information representing the final state of the trade is included under the "Buy" column, including margin borrowed % (I19), cash disbursed/invested (I23), and cash required (I25). Revised information representing the state of the portfolio after the hypothetical trade is presented under the heading "After" and includes current buying power (I29), cash available (I31), equity utilized (I33), margin available (I35) and margin payable (I37). Revised information representing the state of the user's holdings in the selected security after the hypothetical trade is presented under the heading "Average/Total" and includes average price per share (K9), number of shares (K11), total commissions paid (K13), total other costs (K15), and total bought settlement (K17). The routines for calculating these quantities are shown in corresponding fields in FIG. 9b.

In the preferred embodiment, the quantities calculated by the tradescreen are calculated automatically upon entering data into the "Buy" fields I7, I9, I11, I13 and then tabbing out of field I15. The quantities are recalculated upon entering a value into and tabbing out of the margin borrowed field I 19. In addition, a calculate tool is provided at the bottom of the tradescreen (C39) to enable the user to recalculate the tradescreen upon changing of any of the entered data. The tradescreen also includes a cancel tool (G39) for canceling the tradescreen and a reset tool (I39) for resetting all of the data fields.

The tradescreen of FIG. 9a further includes a submit tool (K39) that submits a trade request for execution in accordance with the entered data. Thus the user may vary the trade data entered into the tradescreen and view the effects on the portfolio and positions held in the security, and then submit a trade request once appropriate parameters for the trade have been determined.

The tradescreen also includes a transfer in field (L3) for indicating that the entered data reflects parameters of a transfer in rather than a trade. A version of the tradescreen that is produced for transfer in is shown in FIG. 9d. As seen in FIG. 9d, the rows 19 and 21 (margin borrowed and margin borrowed %) are eliminated from the tradescreen, the "Buy" column is captioned as "Transfer In," and operation of the submit tool (K39) causes the data entered into the tradescreen to be transmitted to the server for entry in the general ledger and the portfolio database, but does not initiate a trade.

Tradescreen for Closing Long Positions in Securities

Figure 10B:
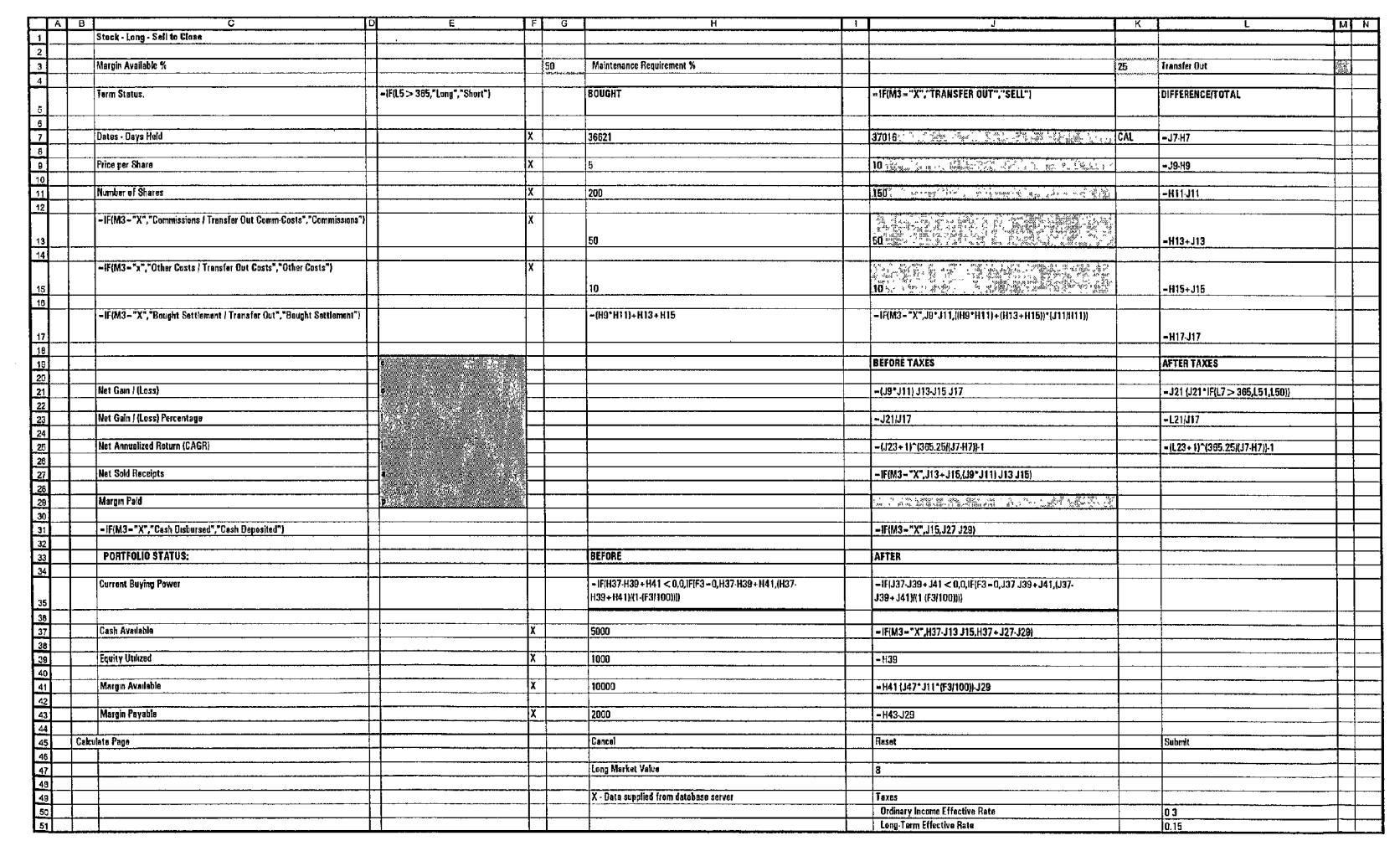

A tradescreen provided to a user for closing a long position in a security is illustrated in FIG. 10a. The gray boxes of FIG. 10a are fields in which data may be entered by the user. An Excel implementation of the routines embedded in the tradescreen of FIG. 10a is illustrated in FIG. 10b. The fields of the tradescreen of FIG. 10a are provided with cell references for purposes of correlation with FIG. 10b. General ledger debit and credit entries for the trade illustrated in FIG. 10a and for a transfer using the same numbers are shown in FIG. 10c. A version of the tradescreen for the case where the position is being transferred out is shown in FIG. 10d.

The tradescreen of FIG. 10a presents current position information for the selected security in the column headed "Bought." This information is dynamically generated by the server using data stored in the portfolio database for the selected portfolio. The current position information includes the date (or date range) of the opening of existing positions in the selected security (H7), price per share (H9), number of shares (H11), commissions paid (H13), other costs (H15), and bought settlement (H17). The tradescreen also presents current portfolio information under the heading "Before." This information includes current buying power (H35), cash available (H37), equity utilized (H39), margin available (H41) and margin payable (H43).

The tradescreen also includes fields for entering trade data characterizing a trade. The fields for entering trade data characterizing a trade are provided under the heading "Sell." They include fields for the trade date (J7), price per share (J9), number of shares (J11), commissions paid (J13), and other costs (J15).

Using the information entered in the aforementioned fields, the tradescreen calculates revised portfolio information and revised position information reflecting changes that will occur if a trade represented by the entered data is effected. This information is included under the "Before Taxes" and "After Taxes" columns, including net gain/(loss) (J21), (L21), net gain/(loss) percentage (J23), (L23), and net annualized return (CAGR) (J25), (L25). The "Before Taxes" column also presents net sold receipts (J27) and cash deposited (J31). The tradescreen also calculates bought settlement. Revised information representing the state of the portfolio after the hypothetical transaction is presented under the heading "After" and includes current buying power (J35), cash available (J37), equity utilized (J39), margin available (J41) and margin payable (J43). Revised information representing the state of the user's holdings in the selected security after the hypothetical trade is presented under the heading "Difference/Total" and includes days held (L7), difference in price per share (L9), difference in number of shares (L11), total commissions paid (L13), total other costs (L15), and difference in bought settlement (L17). The routines for calculating these quantities are shown in corresponding fields in FIG. 10b.

In the preferred embodiment, the quantities calculated by the tradescreen are calculated automatically upon entering data into the "Sell" fields J7, J9, J11, J13 and J15 and then tabbing out of field J15. The quantities are recalculated upon entering a value into and tabbing out of the margin paid field J29. In addition, a calculate tool is provided at the bottom of the tradescreen (D45) to enable the user to recalculate the tradescreen upon changing of any of the entered data. The tradescreen also includes a cancel tool (H45) for canceling the tradescreen and a reset tool (J45) for resetting all of the transaction data fields.

The tradescreen of FIG. 10a further includes a submit tool (L45) that submits the hypothetical trade for execution using the entered data. Thus the user may vary the trade data entered into the tradescreen and view the effects on the portfolio and positions held in the security, and then submit enter a trade once the appropriate parameters for the trade have been determined.

The tradescreen also includes a transfer out field (M3) for indicating that the entered information reflects a transfer out rather than a transaction. A version of the tradescreen that is produced for transfer out is shown in FIG. 10d. When this field is marked, the rows 21, 23 and 25 (net gain/(loss), net gain/(loss) %, and net annualized return) are eliminated from the tradescreen, the "Sell" column is captioned as "Transfer Out," and operation of the submit tool (L45) causes the data entered into the tradescreen to be transmitted to the server for entry in the general ledger and portfolio database to execute the transfer, but does not submit a trade for execution.

Tradescreen for Opening Short Positions in Securities

A tradescreen provided to a user for opening a short position in a security is illustrated in FIG. 11a. The gray boxes of FIG. 11a are fields in which data may be entered by the user. An Excel implementation of the routines embedded in the tradescreen of FIG. 11a is illustrated in FIG. 11b. The fields of the tradescreen of FIG. 11a are provided with cell references for purposes of correlation with FIG. 11b. General ledger debit and credit entries for the transaction illustrated in FIG. 11a and for a transfer using the same numbers are shown in FIG. 11c. A version of the tradescreen for the case where the position is being transferred in is shown in FIG. 11d.

The tradescreen of FIG. 11a presents current open position information for the selected security in the column headed "Open Positions." This information is dynamically generated by the server using data stored in the portfolio database for the selected portfolio. The open position information includes the date (or date range) of the opening of existing positions in the selected security (G7), price per share (G9), number of shares (G11), commissions paid (G13), other costs (G15), gross sold receipts (G17), cash disbursed (G19), and net sold receipts (G21). The tradescreen also presents current information for the portfolio as a whole under the heading "Before." This information includes current buying power (G27), cash available (G29), equity utilized (G31), margin available (G33) and margin payable (G35).

The tradescreen also includes fields for entering data characterizing a hypothetical trade. Based on the entered information, the tradescreen calculates the effects of the hypothetical trade on the overall holdings of the security, and on the portfolio as a whole. The fields for entering trade data are provided under the heading "Sell." They include fields for the trade date (I7), price per share (I9), number of shares (I11), commissions paid (I13), and other costs (I15). The tradescreen also includes an equity utilized % field (D3) for entering the initial equity maintenance requirement percentage. In accordance with federal regulations, this amount cannot be less than 50%. A maintenance requirement may be entered in the "Maintenance %" field (H3). Current regulations require this amount be in the range of 30 to 100.

Using the information entered in the aforementioned fields, the tradescreen calculates revised portfolio information and revised holdings information reflecting changes that will occur if the trade is executed. Information representing the final state of the trade is included under the "Sell" column, including gross sold receipts (I17), cash disbursed (I19), and net sold receipts (I21), cash restricted (I21), and equity utilized/required (I23). Revised information representing the state of the portfolio after the trade is presented under the heading "After" and includes current buying power (I27), cash available (I29), equity utilized (I31), margin available (I33) and margin payable (I35). Revised information representing the state of the user's holdings in the selected security after the trade is presented under the heading "Average/Total" and includes average price per share (K9), total number of shares (K11), total commissions paid (K13), total other costs (K15), total gross sold receipts (K17), total cash disbursed (K19), and total net sold receipts (K21). The routines for calculating these quantities are shown in corresponding fields in FIG. 11b.

In the preferred embodiment, the quantities calculated by the tradescreen are calculated automatically upon entering data into the "Sell" fields I7, I9, I11, I13 and I15 and tabbing out of field I15. In addition, a calculate tool is provided at the bottom, of the tradescreen (C37) to enable the user to recalculate the tradescreen upon changing of any of the entered data. The tradescreen also includes a cancel tool (G37) for canceling the tradescreen and a reset tool (I37) for resetting all of the fields.

The tradescreen of FIG. 11a further includes a submit tool (K37) that submits the hypothetical trade for execution in accordance with the entered data. Thus the user may vary the trade data entered into the tradescreen and view the effects on the portfolio and positions held in the security, and then submit a trade once the appropriate parameters for the trade have been determined.

The tradescreen also includes a transfer in field (L3) for indicating that the transaction data reflect parameters of a transfer in rather than a trade. A version of the tradescreen that is produced for transfer is shown in FIG. 11d. When this field is marked, the "Sell" column is captioned as "Transfer In," and operation of the submit tool (K37) causes the data entered into the tradescreen to be transmitted to the server for entry in the general ledger and the portfolio database, but does not initiate a trade.

Tradescreen for Closing Short Positions in Securities

A tradescreen provided to a user for closing a short position in a security is illustrated in FIG. 12a. The gray boxes of FIG. 12a are fields in which data may be entered by the user. An Excel implementation of the routines embedded in the tradescreen of FIG. 12a is illustrated in FIG. 12b. The fields of the tradescreen of FIG. 12a are provided with cell references for purposes of correlation with FIG. 12b. General ledger debit and credit entries for the transaction illustrated in FIG. 12a and for a transfer using the same numbers are shown in FIG. 12c. A version of the tradescreen for the case where the position is being transferred out is shown in FIG. 12d.

The tradescreen of FIG. 12a presents current sold security information for the selected security in the column headed "Sold." This information is dynamically generated by the server using data stored in the portfolio database for the selected portfolio. The sold security information includes the date (or date range) of the opening of existing positions in the selected security (H7), price per share (H9), number of shares (H11), commissions paid (H13), other costs (H15), and net sold receipts (H17). The tradescreen also presents current information for the portfolio as a whole under the heading "Before." This information includes current buying power (H39), cash available (H41), equity utilized (H43), margin available (H45) and margin payable (H47).

The tradescreen also includes fields for entering trade data characterizing a hypothetical trade. Based on the entered information, the tradescreen calculates the effects of the hypothetical trade on the overall holdings of the security and on the portfolio as a whole. The fields for entering trade data are provided under the heading "Buy." They include fields for the trade date (J7), price per share (J9), number of shares (J11), commissions paid (J13), other costs (J15), and margin borrowed (J33).

Using the information entered in the aforementioned fields, the tradescreen calculates revised portfolio information and revised holdings information reflecting changes that will occur if the hypothetical trade is executed. Information representing the final state of the trade is included under the "Before Taxes" and "After Taxes" columns, including net gain/(loss) (J21), (L21), net gain/(loss) percentage (J23), (L23), net annualized return (CAGR) (J25), (L25). The "Before Taxes" column also presents bought settlement (J27) and cash disbursed (J35). Revised information representing the state of the portfolio after the hypothetical trade is presented under the heading "After" and includes current buying power (J39), cash available (J41), equity utilized (J43), margin available (J45) and margin payable (J47). Revised information representing the state of the user's holdings in the selected security after the hypothetical trade is presented under the heading "Difference/Total" and includes days held (L7), difference in price per share (L9), difference in number of shares (L11), total commissions paid (L13), total other costs (L15), and net allocated basis (L17). The routines for calculating these quantities are shown in corresponding fields in FIG. 12b.

In the preferred embodiment, the quantities calculated by the tradescreen are calculated automatically upon entering data into the "Buy" fields J7, J9, J11, J13 and J15 and then tabbing out of field J15. The quantities are recalculated upon entering a value into and tabbing out of the margin borrowed field (J33). In addition, a calculate tool is provided at the bottom of the tradescreen (C49) to enable the user to recalculate the tradescreen upon changing of any of the entered data. The tradescreen also includes a cancel tool (H49) for canceling the tradescreen and a reset tool (J49) for resetting all of the fields.

The tradescreen of FIG. 12a further includes a submit tool (L49) that submits the hypothetical trade for execution in accordance with the entered data. Thus the user may vary the trade data entered into the tradescreen and view the effects on the portfolio and positions held in the security, and then submit the trade once the appropriate parameters for the trade have been determined.

The tradescreen also includes a transfer out field (M3) for indicating that the entered information reflects a transfer out rather than a trade. A version of the tradescreen that is produced for transfer out is shown in FIG. 12d. When this field is marked, the rows 19, 21, 23, 25, 27, 29 and 31 (before taxes/after taxes, net gain/(loss), net gain/(loss) %, net annualized return, bought settlement, cash restricted/released, cash available and margin borrowed) are eliminated from the tradescreen, the "Buy" column is captioned as "Transfer Out," and operation of the submit tool (L49) causes the data entered into the tradescreen to be transmitted to the server for entry in the general ledger and portfolio database, but does not initiate a trade.

Tradescreen for Opening Long Positions in Put Options

Figure 13B:
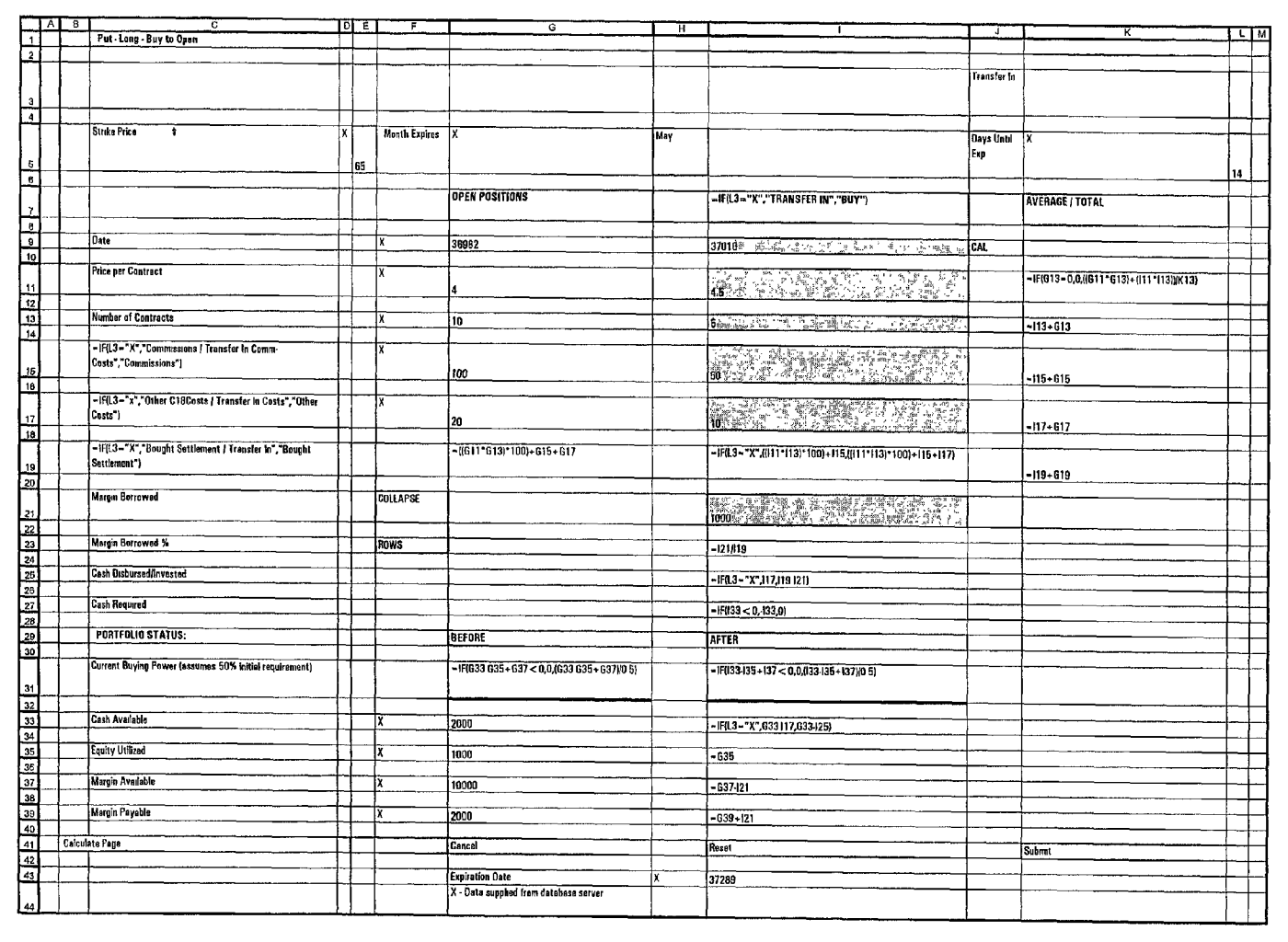

A tradescreen provided to a user for opening a long position in a put option is illustrated in FIG. 13a. The gray boxes of FIG. 13a are fields in which data may be entered by the user. An Excel implementation of the routines embedded in the tradescreen of FIG. 13a is illustrated in FIG. 13b. The fields of the tradescreen of FIG. 13a are provided with cell references for purposes of correlation with FIG. 13b. General ledger debit and credit entries for the transaction illustrated in FIG. 13a and for a transfer using the same numbers are shown in FIG. 13c. A version of the tradescreen for the case where the position is being transferred in is shown in FIG. 13d.

The tradescreen of FIG. 13a presents current open position information for the selected put option in the column headed "Open Positions." This information is dynamically generated by the server using data stored in the portfolio database for the selected portfolio. The open position information includes the date (or date range) of the opening of existing positions in the selected put (G9), price per contract (G11), number of contracts (G13), commissions paid (G15), other costs (G17), and bought settlement (G19). The tradescreen also presents current information for the portfolio as a whole under the heading "Before." This information includes current buying power (G31), cash available (G33), equity utilized (G35), margin available (G37) and margin payable (G39).

The tradescreen also includes fields for entering data characterizing a hypothetical trade. Based on the entered information, the tradescreen calculates the effects of the hypothetical trade on the overall holdings of the put, and on the portfolio as a whole. The fields for entering trade data are provided under the heading "Buy." They include fields for the trade date (I9), price per contract (I11), number of contracts (I13), commissions paid (I15), other costs (I17), and margin borrowed (I21). The tradescreen also includes a strike price field (E5) for entering the strike price of the put, and an expiration month field (H5).

Using the information entered in the aforementioned fields, the tradescreen calculates revised portfolio information and revised holdings information reflecting changes that will occur if the hypothetical trade is executed. Information representing the final state of the trade is included under the "Buy" column, including bought settlement (I19), margin borrowed % (I21), cash disbursed/invested (I25), and cash required (I27). The tradescreen also calculates days to expiration of the put (L5). Revised information representing the state of the portfolio after execution of the hypothetical trade is presented under the heading "After" and includes current buying power (I31), cash available (I33), equity utilized (I35), margin available (I37) and margin payable (I39). Revised information representing the state of the user's holdings in the selected put after execution of the hypothetical trade is presented under the heading "Average/Total" and includes average price per contract (K11), number of contracts (K13), total commissions paid (K15), total other costs (K17), and total bought settlement (K19). The routines for calculating these quantities are shown in corresponding fields in FIG. 13b.

In the preferred embodiment, the quantities calculated by the tradescreen are calculated automatically upon entering data into the "Buy" fields I9, I11, I13, I15 and I17 and then tabbing out of field I17. The quantities are recalculated upon entering a value into and tabbing out of the margin borrowed field I21. In addition, a calculate tool is provided at the bottom of the tradescreen (C41) to enable the user to recalculate the tradescreen upon changing of any of the entered data. The tradescreen also includes a cancel tool (G41) for canceling the tradescreen and a reset tool (I41) for resetting all of the data fields.

The tradescreen of FIG. 13a further includes a submit tool (K41) that submits the hypothetical trade for execution using the entered trade data. Thus the user may vary the trade data entered into the tradescreen and view the effects on the portfolio and positions held in the security, and then submit a trade once the appropriate parameters for the trade have been determined.

The tradescreen also includes a transfer in field (L3) for indicating that the entered data reflect parameters of a transfer in rather than a trade. A version of the tradescreen that is produced for transfer in is shown in FIG. 13d. When this field is marked, the rows 21 and 23 (margin borrowed and margin borrowed %) are eliminated from the tradescreen, the "Buy" column is captioned as "Transfer In," and operation of the submit tool (K41) causes the data entered into the tradescreen to be transmitted to the server for entry in the general ledger and the portfolio database, but does not initiate a trade.

Tradescreens for Closing Long Positions in Put Options

Positions in options may be closed by making an offsetting transaction, by exercising the option, or by expiration of the option. The preferred embodiment of the invention provides tradescreens for each of these alternatives.

Figure 14B:
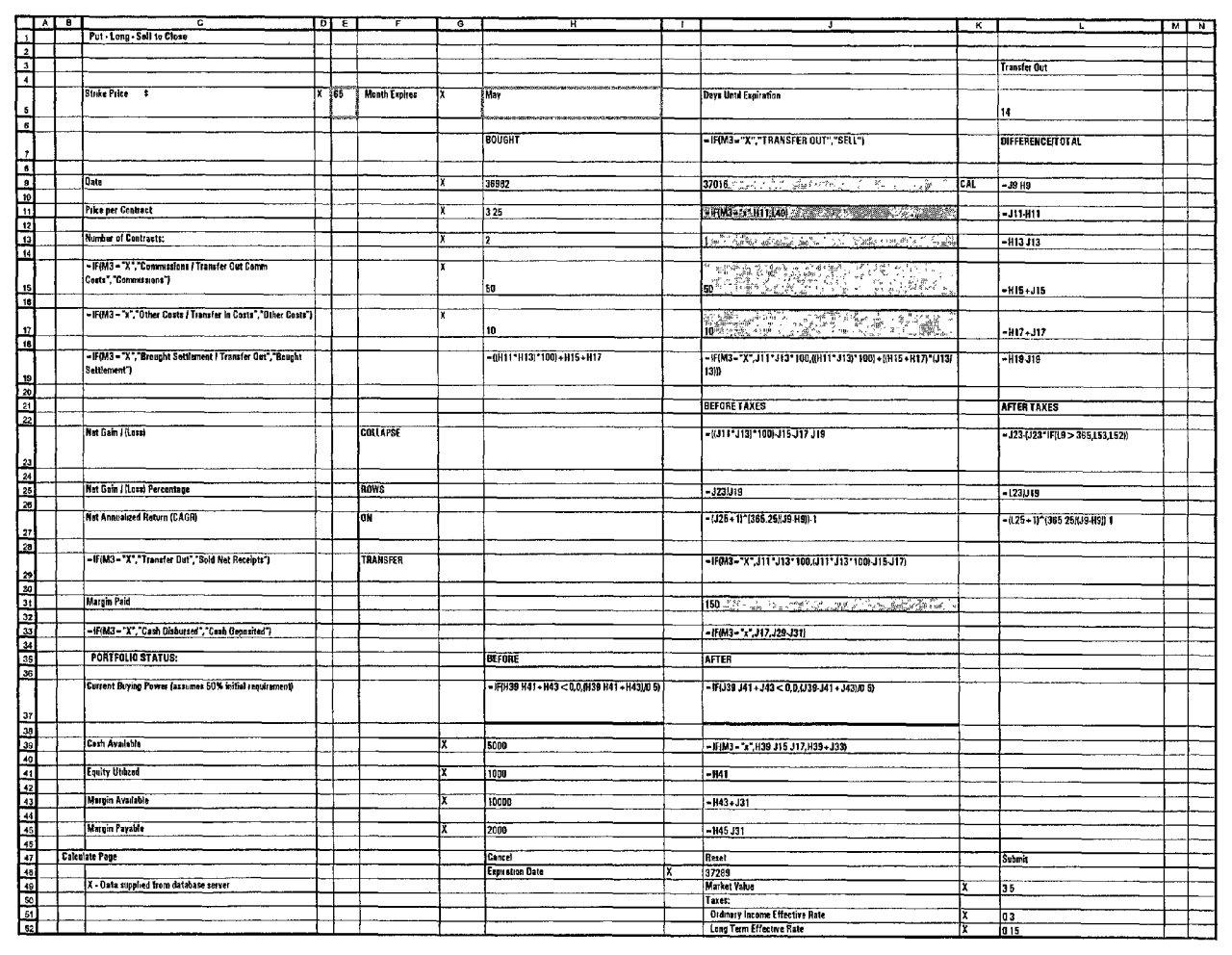

A tradescreen provided to a user for closing a long position in a put through an offsetting transaction is illustrated in FIG. 14a. The gray boxes of FIG. 14a are fields in which data may be entered by the user. An Excel implementation of the routines embedded in the tradescreen of FIG. 14a is illustrated in FIG. 14b. The fields of the tradescreen of FIG. 14a are provided with cell references for purposes of correlation with FIG. 14b. General ledger debit and credit entries for the trade illustrated in FIG. 14a and for a transfer using the same numbers are shown in FIG. 14c. A version of the tradescreen for the case where the position is being transferred out is shown in FIG. 14d.

The tradescreen of FIG. 14a presents current information for previously bought puts of the selected type in the column headed "Bought." This information is dynamically generated by the server using data stored in the portfolio database for the selected portfolio. The bought security information includes the date (or date range) of the opening of existing positions in the selected put (H9), price per contract (H11), number of contracts (H13), commissions paid (H15), other costs (H17), and bought settlement (H19). The tradescreen also presents current information for the portfolio as a whole under the heading "Before." This information includes current buying power (H37), cash available (H39); equity utilized (H41), margin available (H43) and margin payable (H45). The tradescreen also displays the strike price (E5) and expiration month (H5) of the put and calculates days until expiration (L5).

The tradescreen also includes fields for entering data characterizing a hypothetical trade. Based on the entered information, the tradescreen calculates the effects of execution of the hypothetical trade on the overall holdings of the security and on the portfolio as a whole. The fields for entering data characterizing a hypothetical trade are provided under the heading "Sell." They include fields for the trade date (J9), price per contract (J11), number of contracts (J13), commissions paid (J15), and other costs (J17).

Using the information entered in the aforementioned fields, the tradescreen calculates revised portfolio information and revised holdings information reflecting changes that will occur if the hypothetical trade is executed. Information representing the final state of the trade is included under the "Before Taxes" and "After Taxes" columns, including net gain/(loss) (J23), (L23), net gain/(loss) percentage (J25), (L25), and net annualized return (CAGR) (J27), (L27). The "Before Taxes" column also presents sold net receipts (J29), and cash deposited (J33). Revised information representing the state of the portfolio after execution of the hypothetical trade is presented under the heading "After" and includes current buying power (J37), cash available (J39), equity utilized (J41), margin available (J43) and margin payable (J45). Revised information representing the state of the user's holdings in the selected security after execution of the hypothetical trade is presented under the heading "Difference/Total" and includes days held (L9), difference in price per contract (L11), difference in number of contracts (L13), total commissions paid (L15), total other costs (L17), and difference in bought settlement (L19). The routines for calculating these quantities are shown in corresponding fields in FIG. 14b.

In the preferred embodiment, the quantities calculated by the tradescreen are calculated automatically upon entering data into the "Sell" fields J9, J11, J13, J15 and J17 and then tabbing out of field J17. The quantities are recalculated upon entering a value into and tabbing out of the margin paid field J31. In addition, a calculate tool is at the bottom of the tradescreen (D47) to enable the user to recalculate the tradescreen upon changing any of the entered data. The tradescreen also includes a cancel tool (H47) for canceling the tradescreen and a reset tool (J47) for resetting all of the data fields.

The tradescreen of FIG. 14a further includes a submit tool (L47) that submits the hypothetical trade for execution using the entered trade data. Thus the user may vary the trade data entered into the tradescreen and view the effects on the portfolio and positions held in the security, and then submit a trade once the appropriate parameters for the trade have been determined.

The tradescreen also includes a transfer out field (M3) for indicating that the entered information reflects a transfer out rather than a trade. A version of the tradescreen that is produced for transfer out is shown in FIG. 14d. When this field is marked, the rows 21, 23, 25, 27, 29, 31 and 33 (before taxes/after taxes, net gain/(loss), net gain/(loss) %, net annualized return, sold net receipts, margin paid, and cash deposited) are eliminated from the tradescreen, the "Sell" column is captioned as "Transfer Out," and operation of the submit tool (L47) causes the data entered into the tradescreen to be transmitted to the server for entry in the general ledger and portfolio database, but does not initiate a trade.

FIG. 15a shows a tradescreen for closing a long position in a put by exercising the put. FIG. 15b shows an Excel implementation of routines embedded in the tradescreen of FIG. 15a and FIG. 15c shows general ledger debit and credit entries for the exercise illustrated in FIG. 15a.

There are a number of notable differences between the exercise tradescreen of FIG. 15a and the offsetting transaction tradescreen of FIG. 14a. Rather than showing the bought and sold price for the contract, the tradescreen of FIG. 15a shows the current price per share (H11) and the strike price of the put (J11). Similarly, rather than showing contracts bought and entering contracts sold, the tradescreen shows contracts open (H13) and has a field for entering contracts to be exercised (J13). The tradescreen also shows the number of shares represented by the open contracts (H15) and calculates the number of shares represented by the contracts to be exercised (J15). The tradescreen also calculates a net gain/loss on the option (J23) and a net gain/loss on the underlying security (J25).

Figure 16B:
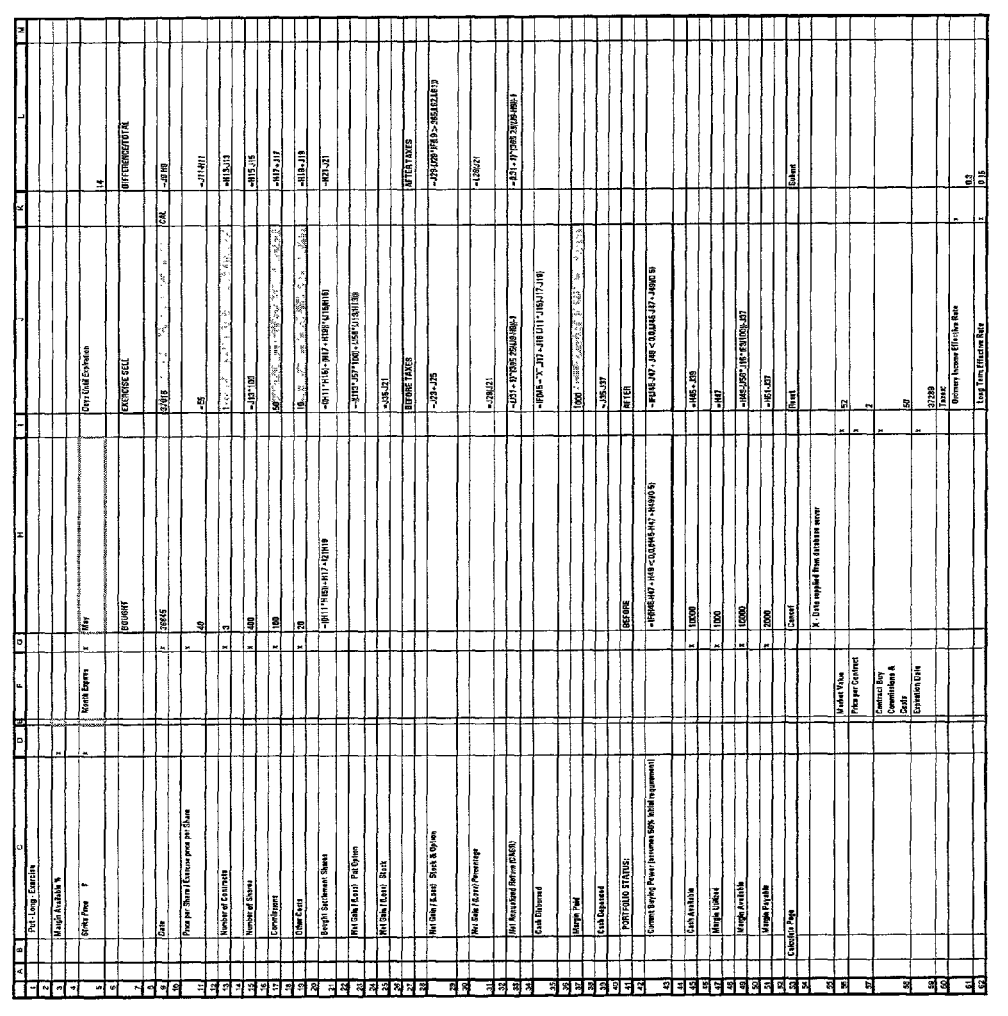

FIG. 16a shows a tradescreen for closing a long position in a put through expiration of the put. FIG. 16b shows an Excel implementation of routines embedded in the tradescreen of FIG. 16a and FIG. 16c shows general ledger debit and credit entries for the expiration illustrated in FIG. 16a.

There are a number of notable differences between the expiration tradescreen of FIG. 16a and the offsetting transaction tradescreen of FIG. 14a. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for sold net receipts, margin paid, or cash deposited.

Tradescreen for Opening Long Positions in Call Options

Figure 17B:
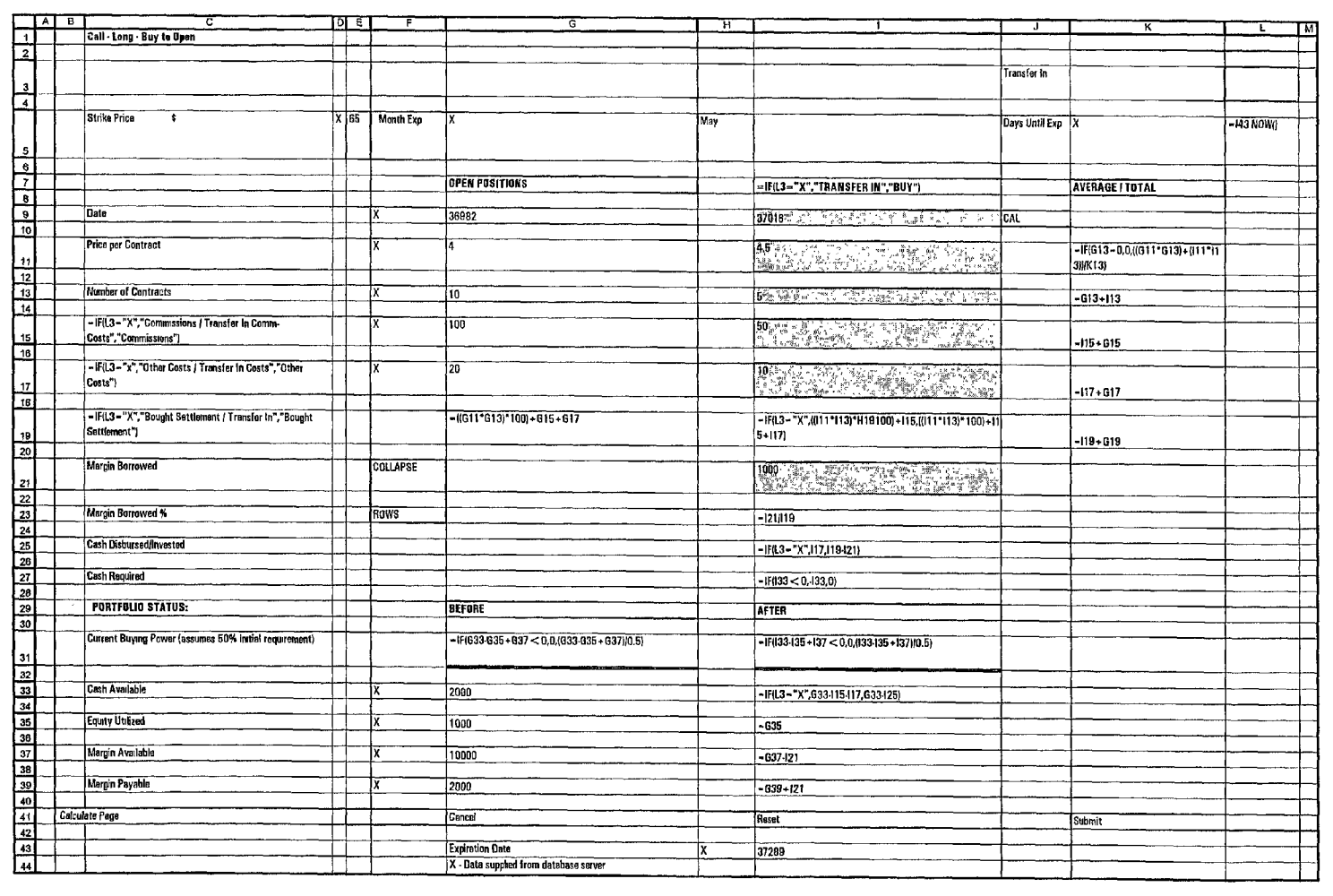

A tradescreen provided to a user for opening a long position in a call option is illustrated in FIG. 17a. The gray boxes of FIG. 17a are fields in which data may be entered by the user. An Excel implementation of the routines embedded in the tradescreen of FIG. 17a is illustrated in FIG. 17b. The fields of the tradescreen of FIG. 17a are provided with cell references for purposes of correlation with FIG. 17b. General ledger debit and credit entries for the transaction illustrated in FIG. 17a and for a transfer using the same numbers are shown in FIG. 17c. A version of the tradescreen for the case where the position is being transferred in is shown in FIG. 17d.

The operation of the tradescreens of FIGS. 17a and 17d is very similar to that of the tradescreens of FIGS. 13a and 13d for opening long positions in put options and may be understood by reference to the corresponding descriptions.

Tradescreens for Closing Long Positions in Call Options

Figure 18B:
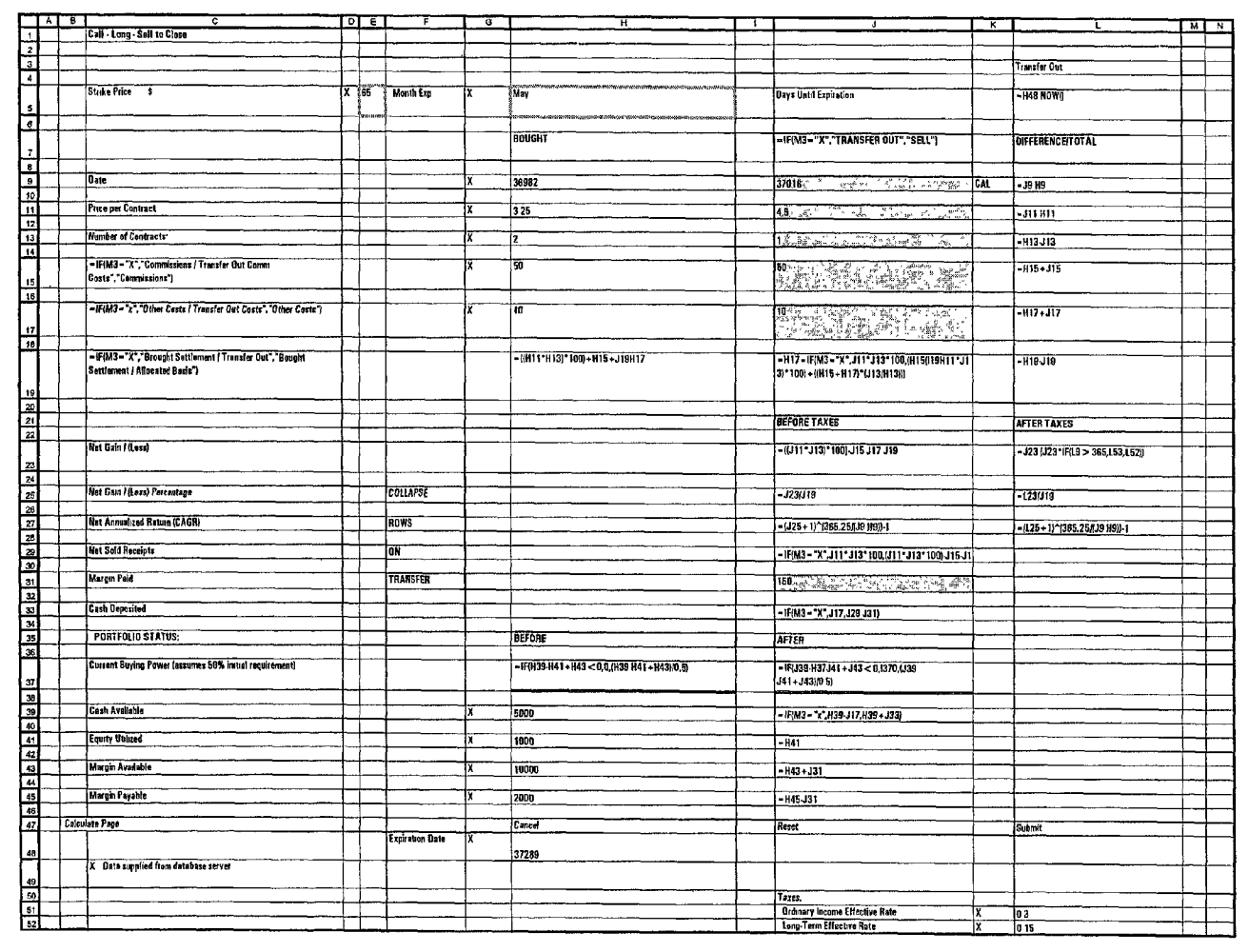

A tradescreen provided to a user for closing a long position in a call through an offsetting transaction is illustrated in FIG. 18a. The gray boxes of FIG. 18a are fields in which data may be entered by the user. An Excel implementation of the routines embedded in the tradescreen of FIG. 18a is illustrated in FIG. 18b. The fields of the tradescreen of FIG. 18a are provided with cell references for purposes of correlation with FIG. 18b. General ledger debit and credit entries for the transaction illustrated in FIG. 18a and for a transfer using the same numbers are shown in FIG. 18c. A version of the tradescreen for the case where the position is being transferred out is shown in FIG. 18d.

The operation of the tradescreens of FIGS. 18a and 18d is very similar to that of the tradescreens of FIGS. 14a and 14d for closing long positions in put options by an offsetting transaction and may be understood by reference to the corresponding descriptions.

Figure 19B:
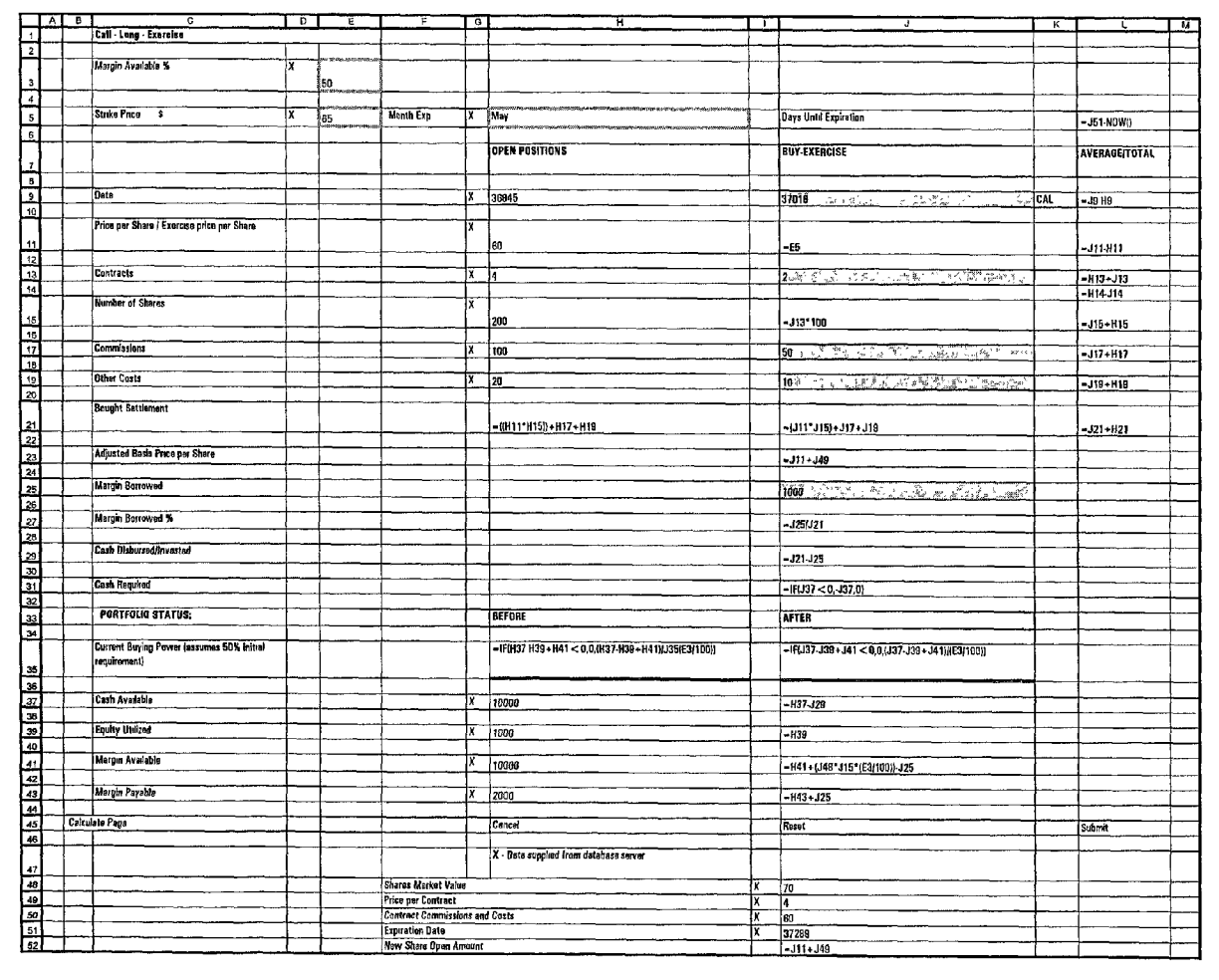

FIG. 19a shows a tradescreen for a hypothetical transaction for closing a long position in a call by exercising the call. FIG. 19b shows an Excel implementation of routines embedded in the tradescreen of FIG. 19a and FIG. 19c shows general ledger debit and credit entries for the transaction illustrated in FIG. 19a. The operation of the tradescreen of FIG. 19a is very similar to that of the tradescreen of FIG. 15a for closing long positions in call options by exercising the option and may be understood by reference to the corresponding description.

Figure 20B:
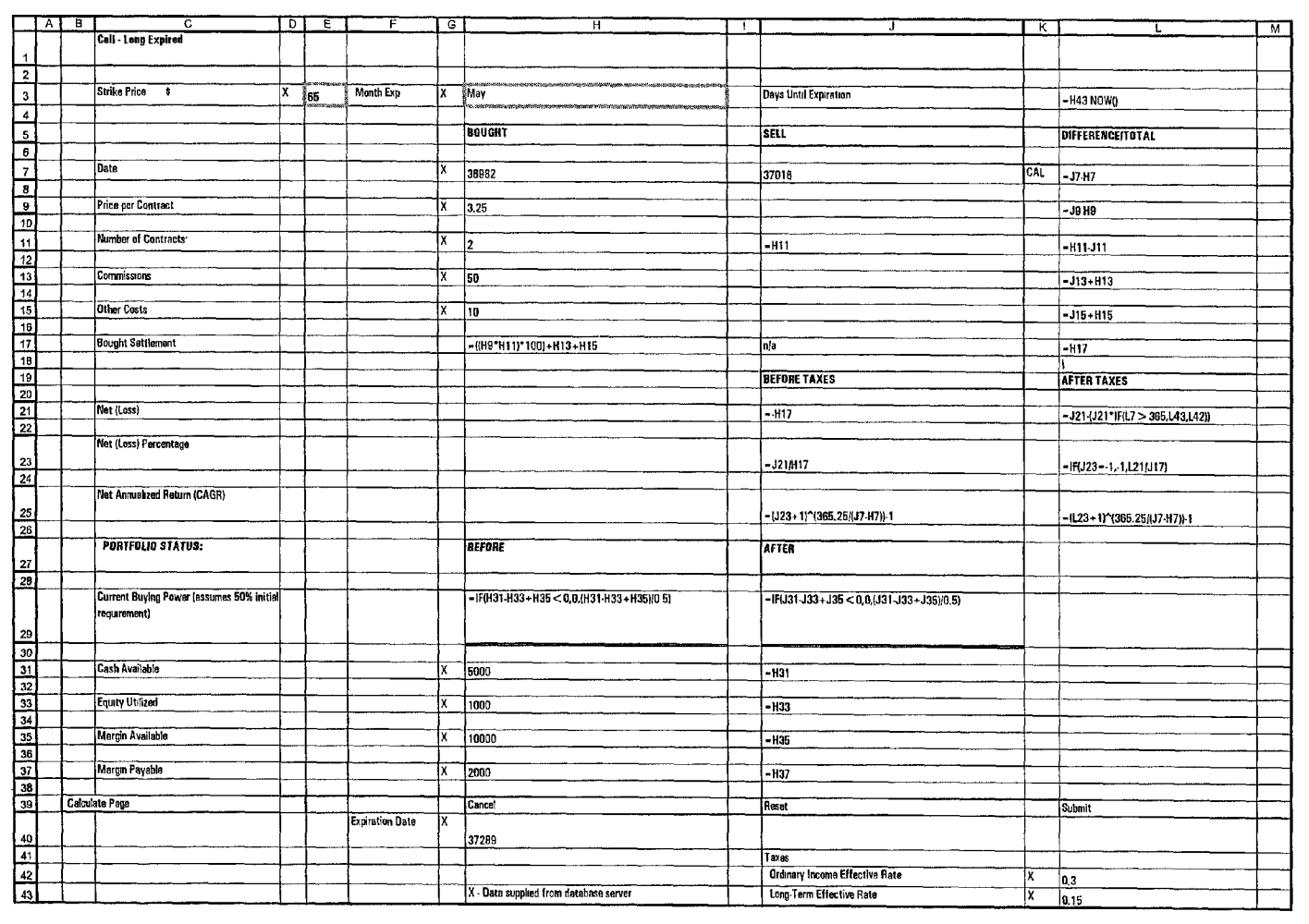

FIG. 20a shows a tradescreen for a hypothetical transaction for closing a long position in a call through expiration of the call. FIG. 20b shows an Excel implementation of routines embedded in the tradescreen of FIG. 20a and FIG. 20c shows general ledger debit and credit entries for the transaction illustrated in FIG. 20a. The operation of the tradescreen of FIG. 20a is very similar to that of the tradescreen of FIG. 16a for closing long positions in put options by expiration of the option and may be understood by reference to the corresponding description.

Tradescreen for Opening Covered Short Positions in Put Options

Figure 21B:
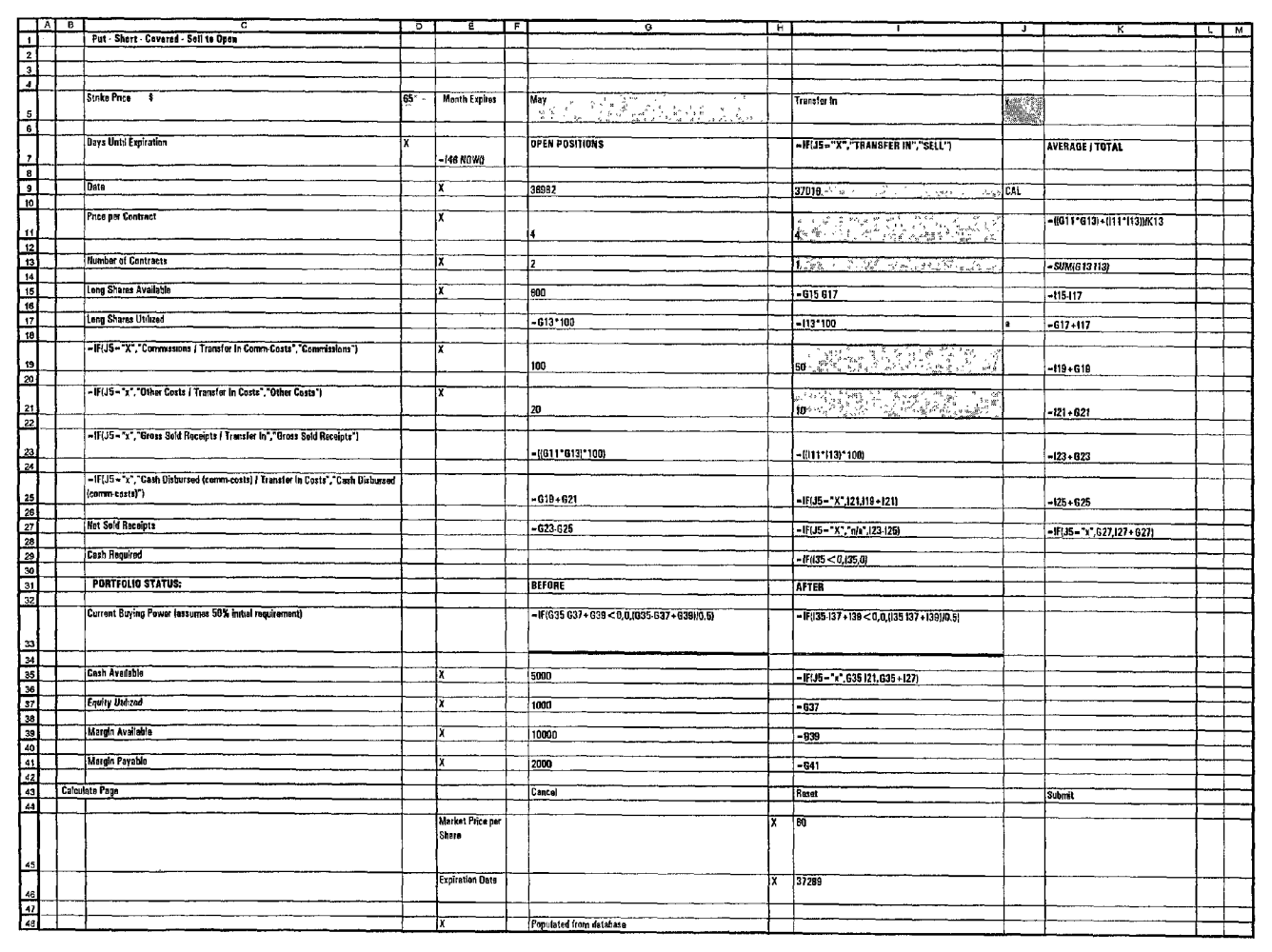

A tradescreen provided to a user for opening a covered short position in a put option is illustrated in FIG. 21a. The gray boxes of FIG. 21a are fields in which data may be entered by the user. An Excel implementation of the routines embedded in the tradescreen of FIG. 21a is illustrated in FIG. 21b. The fields of the tradescreen of FIG. 21a are provided with cell references for purposes of correlation with FIG. 21b. General ledger debit and credit entries for the transaction illustrated in FIG. 21a and for a transfer using the same numbers are shown in FIG. 21c. A version of the tradescreen for the case where the position is being transferred in is shown in FIG. 21d.

The tradescreen of FIG. 21a presents current open position information for the selected covered short put in the column headed "Open Positions." This information is dynamically generated by the server using data stored in the portfolio database for the selected portfolio. The open position information includes the date (or date range) of the opening of existing positions in the selected security (G9), price per contract (G11), number of contracts (G13), short shares available (G15), short shares utilized (G17), commissions paid (G19), other costs (G21), gross sold receipts (G23), cash disbursed (G25), and net sold receipts (G27). The tradescreen also presents current information for the portfolio as a whole under the heading "Before." This information includes current buying power (G33), cash available (G35), equity utilized (G37), margin available (G39) and margin payable (G41).

The tradescreen also includes fields for entering data characterizing a hypothetical trade. Based on the entered information, the tradescreen calculates the effects of execution of the hypothetical trade on the overall holdings of the security, and on the portfolio as a whole. The fields for entering data characterizing the hypothetical trade are provided under the heading "Sell." They include fields for the trade date (I9), price per contract (I11), number of contracts (I13), commissions paid (I19), and other costs (I21). The tradescreen also includes fields for entering the strike price (D5) and expiration month (G5) of the selected put.

Using the information entered in the aforementioned fields, the tradescreen calculates revised information that represents the final state of the transaction, the state of the user's portfolio, and the state of the user's holdings in the selected put, in the event that the hypothetical trade is executed. Revised information representing the final state of the trade is included under the "Sell" column, including short shares available (I15), short shares utilized (I17), gross sold receipts (I23), cash disbursed (I25), and net sold receipts (I27). Revised information representing the state of the portfolio after execution of the hypothetical trade is presented under the heading "After" and includes current buying power (I33), cash available (I35), equity utilized (I37), margin available (I39) and margin payable (I41). Revised information representing the state of the user's holdings in the selected put after execution of the hypothetical trade is presented under the heading "Average/Total" and includes average price per contract (K11), total number of contracts (K13), short shares available (K15), short shares utilized (K17), total commissions paid (K19), total other costs (K21), total gross sold receipts (K23), total cash disbursed (K25), and total net sold receipts (K27). The routines for calculating these quantities are shown in corresponding fields in FIG. 21b.

In the preferred embodiment, the quantities calculated by the tradescreen are calculated automatically upon entering data into the "Sell" fields I9, I11, I13, I19 and I21 and then tabbing out of field I21. In addition, a calculate tool is provided at the bottom of the tradescreen (C43) to enable the user to recalculate the tradescreen upon changing of any of the entered data. The tradescreen also includes a cancel tool (G43) for canceling the tradescreen and a reset tool (I43) for resetting all of the data fields.

The tradescreen of FIG. 21a further includes a submit tool (K43) that submits the hypothetical trade for execution in accordance with the entered data. Thus the user may vary the trade data entered into the tradescreen and view the effects on the portfolio and individual put, and then submit a trade once the appropriate parameters for the trade have been determined.

The tradescreen also includes a transfer in field (J5) for indicating that the entered data reflect parameters of a transfer in rather than a trade. A version of the tradescreen that is produced for transfer in is shown in FIG. 21d. When this field is marked, the "Sell" column is captioned as "Transfer In," and operation of the submit tool (K43) causes the data entered into the tradescreen to be transmitted to the server for entry in the general ledger and portfolio database, but does not initiate a trade.

Tradescreens for Closing Covered Short Positions in Put Options

Like long positions in options, short positions in options may be closed by making an offsetting transaction, by exercising the option, or by expiration of the option. The preferred embodiment of the invention provides tradescreens for each of these alternatives.

Figure 22B:
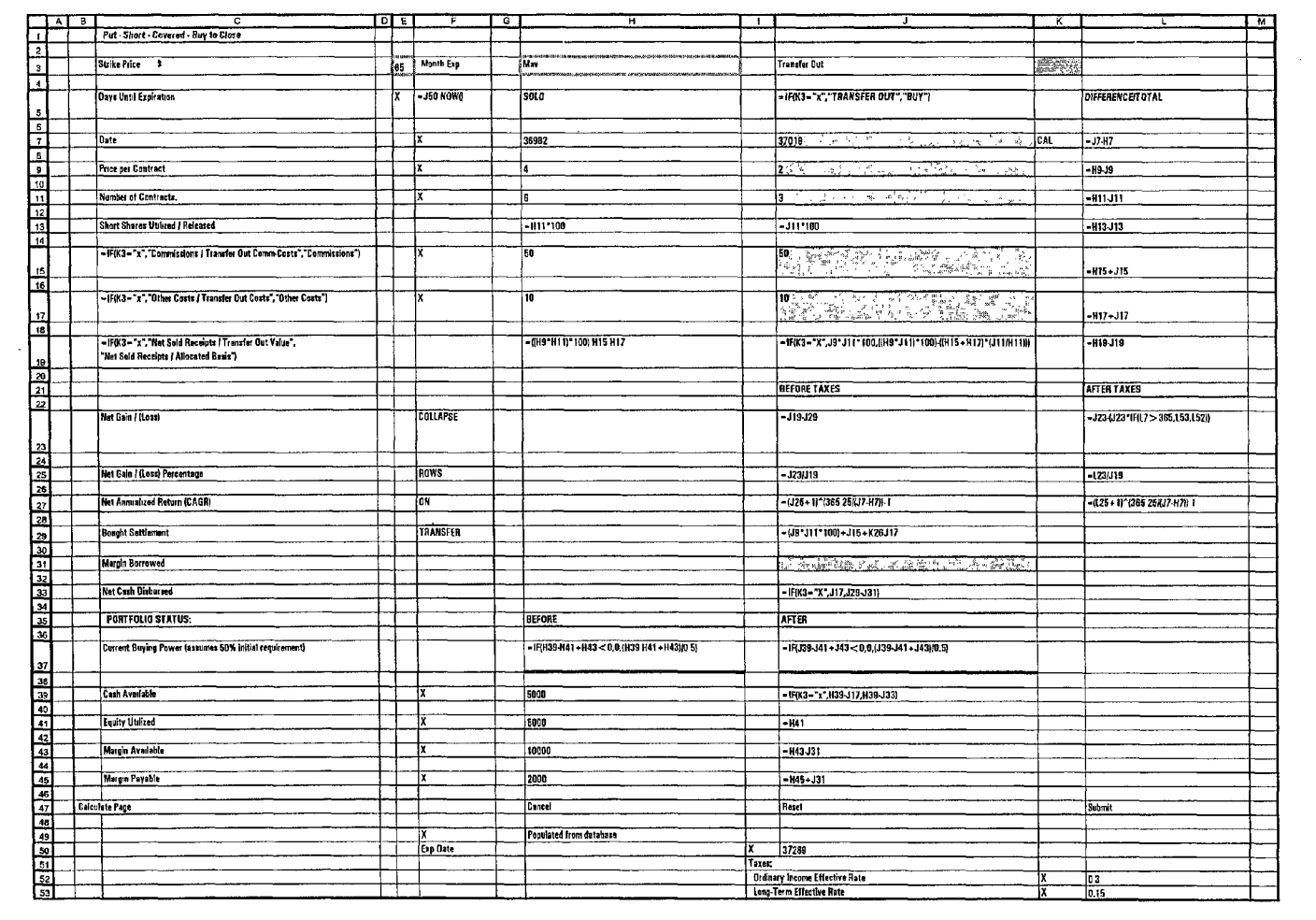

A first tradescreen provided to a user for closing a covered short position in a put by purchasing the put is illustrated in FIG. 22a. The gray boxes of FIG. 22a are fields in which data may be entered by the user. An Excel implementation of the routines embedded in the tradescreen of FIG. 22a is illustrated in FIG. 22b. The fields of the tradescreen of FIG. 22a are provided with cell references for purposes of correlation with FIG. 22b. General ledger debit and credit entries for the transaction illustrated in FIG. 22a and for a transfer using the same numbers are shown in FIG. 22c. A version of the tradescreen for the case where the position is being transferred out is shown in FIG. 22d.

The tradescreen of FIG. 22a presents current sold security information for the selected short put in the column headed "Sold." This information is dynamically generated by the server using data stored in the portfolio database for the selected portfolio. The sold security information includes the date (or date range) of the opening of existing positions in the selected security (H7), price per contract (H9), number of contracts (H11), short shares utilized (H13), commissions (H15), other costs (H17), and net sold receipts (H19). The tradescreen also presents current information for the portfolio as a whole under the heading "Before." This information includes current buying power (H37), cash available (H39), equity utilized (H41), margin available (H43) and margin payable (H45).

The tradescreen also includes fields for entering transaction data characterizing a hypothetical trade. Based on the entered information, the tradescreen calculates the effects of execution of the hypothetical trade on the overall holdings of the security and on the portfolio as a whole. The fields for entering data characterizing the hypothetical trade are provided under the heading "Buy." They include fields for the transaction date (J7), price per contract (J9), number of contracts (J11), commissions paid (J15), other costs (J17), and margin borrowed (J31).

Using the information entered in the aforementioned fields, the tradescreen calculates revised portfolio information and revised holdings information reflecting changes that will occur if the hypothetical trade is executed. Revised information representing the final state of the trade is included under the "Before Taxes" and "After Taxes" columns, including net gain/(loss) (J23), (L23), net gain/(loss) percentage (J25), (L25), net annualized return (CAGR) (J27), (L27). The "Before Taxes" column also presents bought settlement (J29) and cash disbursed (J33). The tradescreen also calculates short shares released (J13) and net allocated basis (J19). Revised information representing the state of the portfolio after execution of the hypothetical trade is presented under the heading "After" and includes current buying power (J37), cash available (J39), equity utilized (J41), margin available (J43) and margin payable (J45). Revised information representing the state of the user's holdings in the selected short put after execution of the hypothetical trade is presented under the heading "Difference/Total" and includes days held (L7), difference in price per contract (L9), difference in number of contracts (L11), total commissions paid (L15), total other costs (L17), and net allocated basis (L19). The tradescreen also calculates days until expiration (F5). The routines for calculating these quantities are shown in corresponding fields in FIG. 22b.

In the preferred embodiment, the quantities calculated by the tradescreen are calculated automatically upon entering data into the "Buy" fields J7, J9, J11, J15 and J17 and then tabbing out of field J17. The quantities are recalculated upon entering a value into and tabbing out of the margin borrowed field (J31). In addition, a calculate tool is provided at the bottom of the tradescreen (D47) to enable the user to recalculate the tradescreen upon changing of any of the entered data. The tradescreen also includes a cancel tool (H47) for canceling the tradescreen and a reset tool (J47) for resetting all of the data fields.

The tradescreen of FIG. 22a further includes a submit tool (L47) that submits the hypothetical trade for execution in accordance with the entered data. Thus the user may vary the trade data entered into the tradescreen and view the effects on the portfolio and positions held in the security, and then submit a trade once the appropriate parameters for the trade have been determined.

The tradescreen also includes a transfer out field (K3) for indicating that the entered information reflects a transfer out rather than a transaction. A version of the tradescreen that is produced for transfer out is shown in FIG. 22d. When this field is marked, the rows 21, 23, 25, 27, 29 and 31 (before taxes/after taxes, net gain/(loss), net gain/(loss) %, net annualized return, bought settlement, margin borrowed) are eliminated from the tradescreen, the "Buy" column is captioned as "Transfer Out," and operation of the submit tool (L47) causes the data entered into the tradescreen to be transmitted to the server for entry in the general ledger and portfolio database, but does not initiate a trade.

Figure 23B:
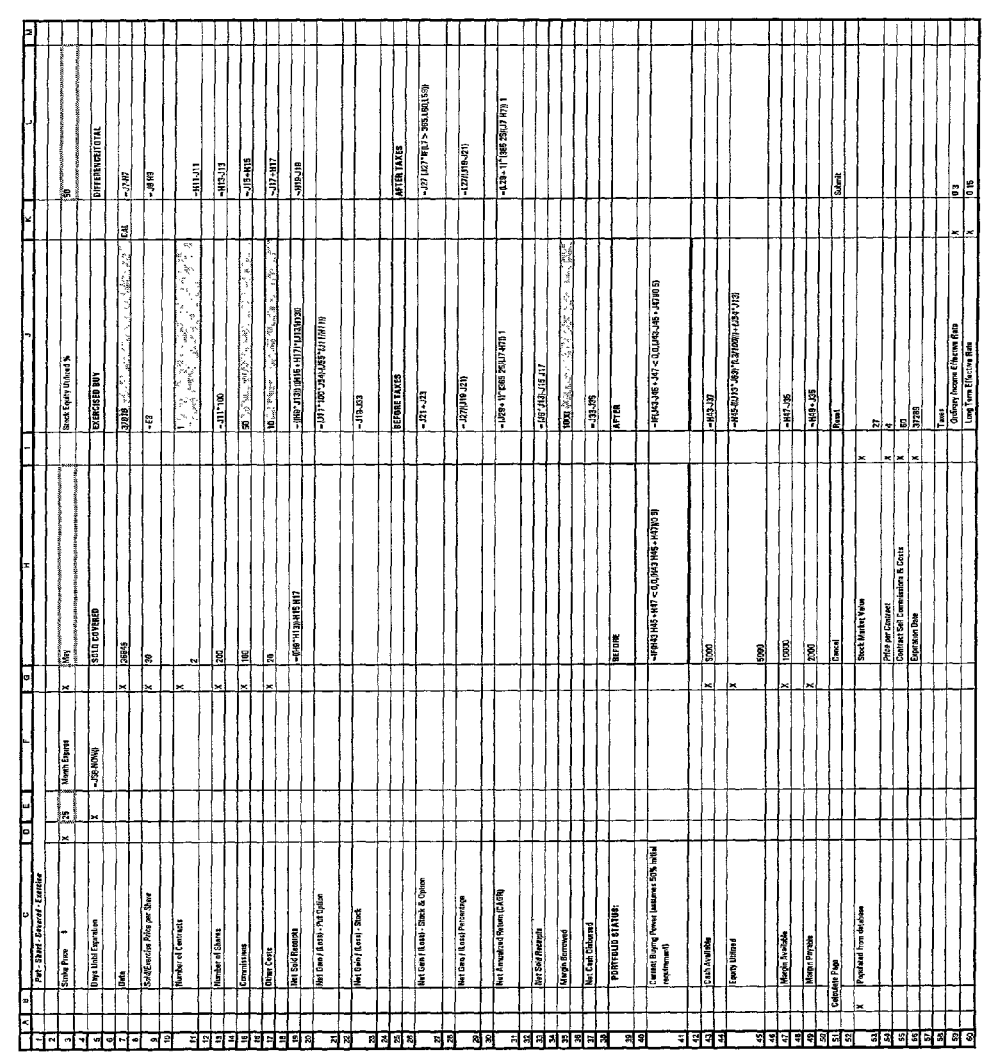

FIG. 23a shows a tradescreen for closing a covered short position in a put by exercising the put. FIG. 23b shows an Excel implementation of routines embedded in the tradescreen of FIG. 23a and FIG. 23c shows general ledger debit and credit entries for the exercise illustrated in FIG. 23a.

There are a number of notable differences between the exercise tradescreen of FIG. 23a and the offsetting transaction tradescreen of FIG. 22a. Rather than displaying the sold price of the contract and entering the bought price of the contract, the tradescreen of FIG. 23a shows the sold price per share (H9) and the strike (exercise) price of the put (J20). Similarly, rather than showing contracts bought and entering contracts sold, the tradescreen shows contracts open (H20) and has a field for entering contracts to be exercised (J9). The tradescreen also shows the number of shares represented by the open contracts (H13) and calculates the number of shares represented by the contracts to be exercised (J13). The tradescreen also calculates a net gain/loss on the option (J21) and a net gain/loss on the underlying security (J23).

Figure 24B:
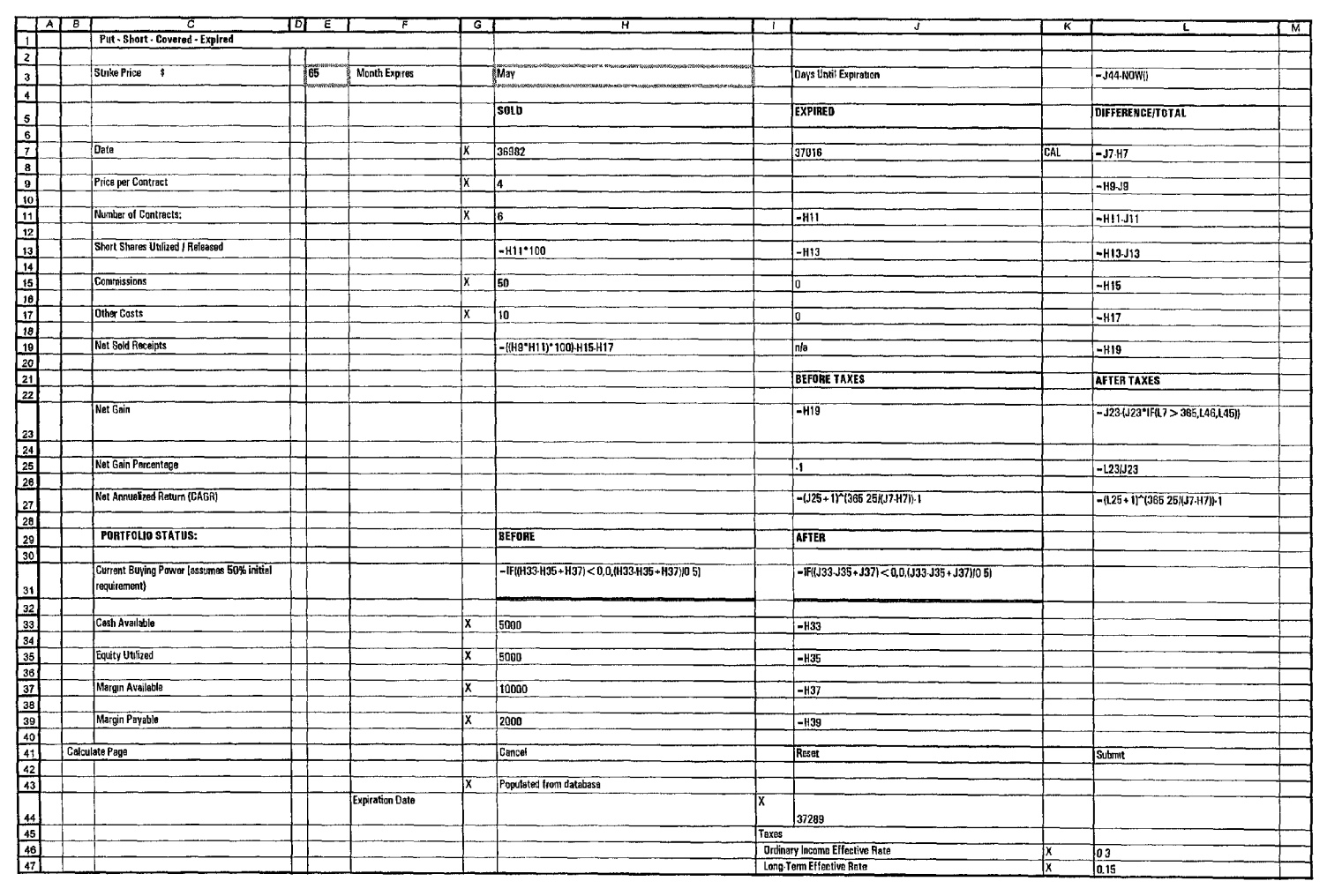

FIG. 24a shows a tradescreen for closing a long position in a put through expiration of the put. FIG. 24b shows an Excel implementation of routines embedded in the tradescreen of FIG. 24a and FIG. 24c shows general ledger debit and credit entries for the expiration illustrated in FIG. 24a.

There are a number of notable differences between the expiration tradescreen of FIG. 24a and the offsetting transaction tradescreen of FIG. 22a. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for bought settlement, margin borrowed, or cash disbursed.

Tradescreen for Opening Uncovered Short Positions in Put Options

Figure 25B:
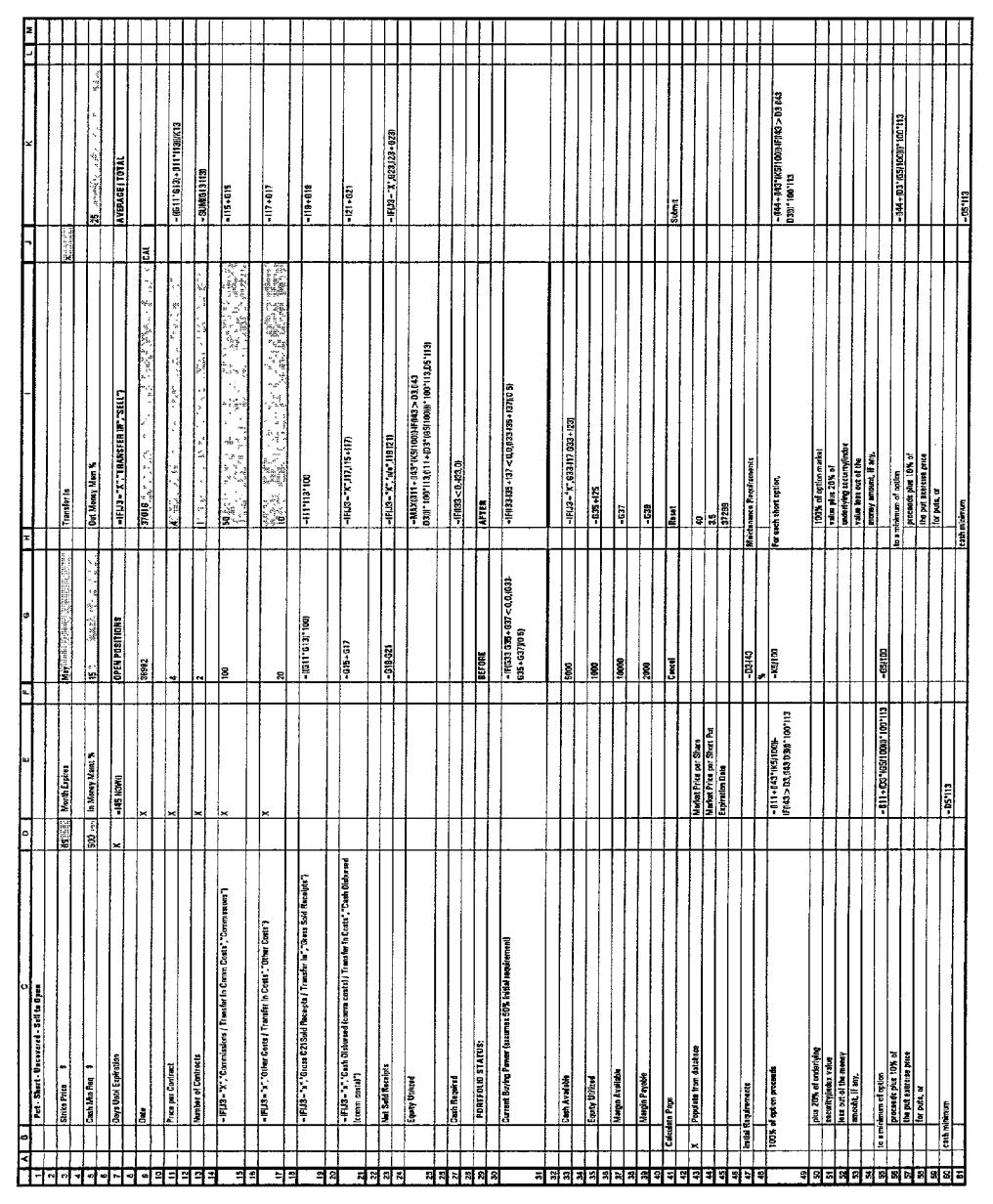

A tradescreen provided to a user for opening an uncovered short position in a put option is illustrated in FIG. 25a. The gray boxes of FIG. 25a are fields in which data may be entered by the user. An Excel implementation of the routines embedded in the tradescreen of FIG. 25a is illustrated in FIG. 25b. The fields of the tradescreen of FIG. 25a are provided with cell references for purposes of correlation with FIG. 25b. General ledger debit and credit entries for the transaction illustrated in FIG. 25a and for a transfer using the same numbers are shown in FIG. 25c. A version of the tradescreen for the case where the position is being transferred in is shown in FIG. 25d.

The tradescreen of FIG. 25a for an uncovered short put is similar to the tradescreen of FIG. 21a for a covered short put, but with several notable differences. Unlike the tradescreen for the covered short put, the tradescreen of FIG. 25a includes fields for entering a cash minimum requirement (D5), an in the money maintenance % (G5), and an out of the money maintenance % (K5). In addition, the tradescreen of FIG. 25a calculates equity utilized by the hypothetical trade (I25). The tradescreen of FIG. 25a does not calculate short shares available or utilized since the short position is uncovered.

The tradescreen also includes a transfer in field (J3) for indicating that the transaction data reflect parameters of a transfer in rather than an actual transaction. A version of the tradescreen that is produced for transfer in is shown in FIG. 25d. When this field is marked, the "Sell" column is captioned as "Transfer In," and operation of the submit tool (K41) causes the data entered into the tradescreen to be transmitted to the server for entry in the general ledger and portfolio database, but does not initiate a trade.

Tradescreens for Closing Uncovered Short Positions in Put Options

Like covered short positions in puts, uncovered short positions in puts may be closed by making an offsetting transaction, by exercising the option, or by expiration of the option. The preferred embodiment of the invention provides tradescreens for each of these alternatives.

Figure 26B:
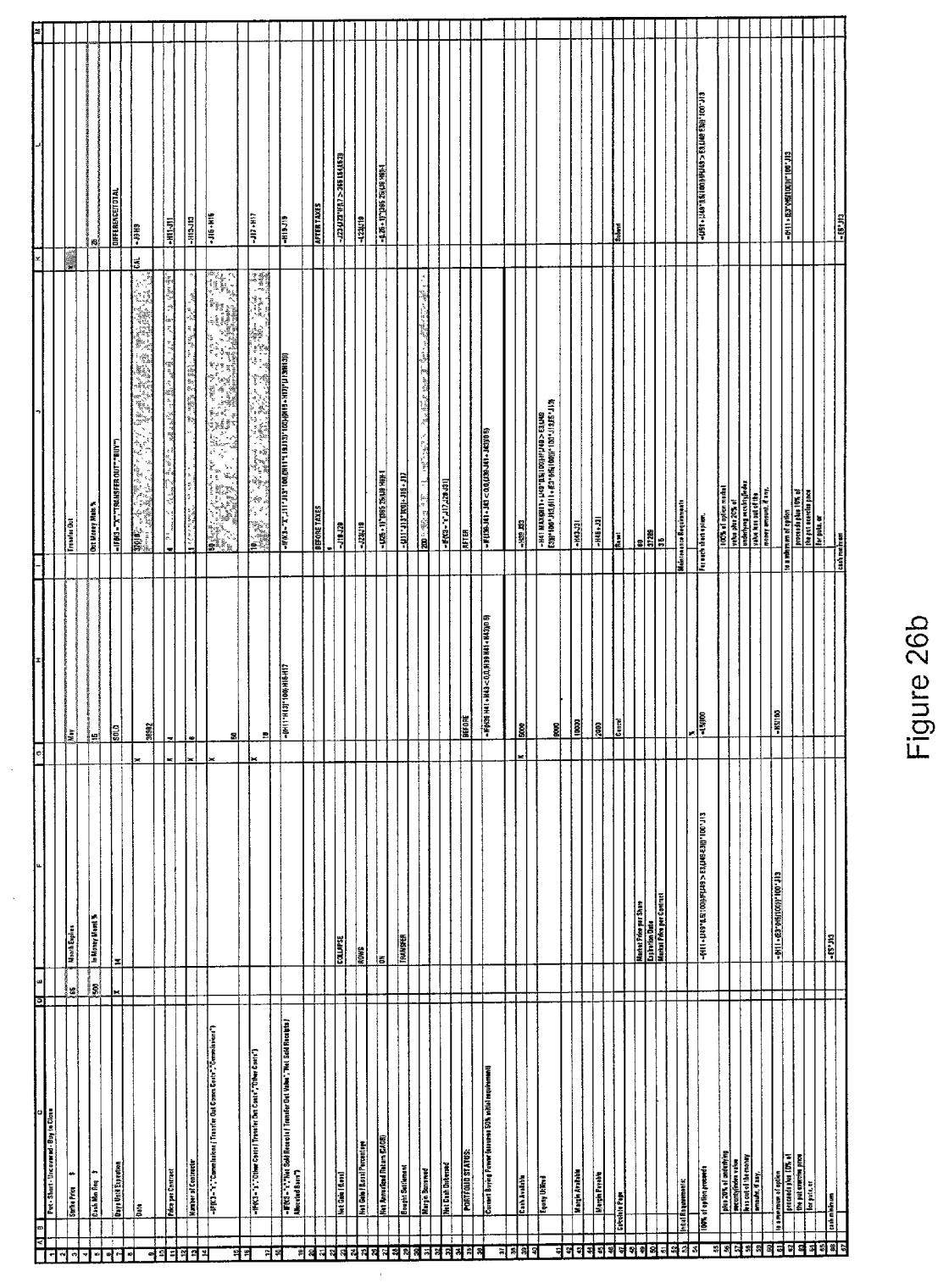

A first tradescreen provided to a user for closing an uncovered short position in a put by an offsetting transaction is illustrated in FIG. 26a. The gray boxes of FIG. 26a are fields in which data may be entered by the user. An Excel implementation of the routines embedded in the tradescreen of FIG. 26a is illustrated in FIG. 26b. The fields of the tradescreen of FIG. 26a are provided with cell references for purposes of correlation with FIG. 26b. General ledger debit and credit entries for the transaction illustrated in FIG. 26a and for a transfer using the same numbers are shown in FIG. 26c. A version of the tradescreen for the case where the position is being transferred out is shown in FIG. 26d.

The tradescreen of FIG. 26a for closing an uncovered short put by an offsetting transaction is similar to the tradescreen of FIG. 22a for closing a covered short put, but with several notable differences. Unlike the tradescreen for the covered short put, the tradescreen of FIG. 26a includes fields for entering a cash minimum requirement (E5), an in the money maintenance % (H5), and an out of the money maintenance % (L5). The tradescreen of FIG. 26a does not calculate short shares utilized or released since the short position is uncovered.

Figure 27B:
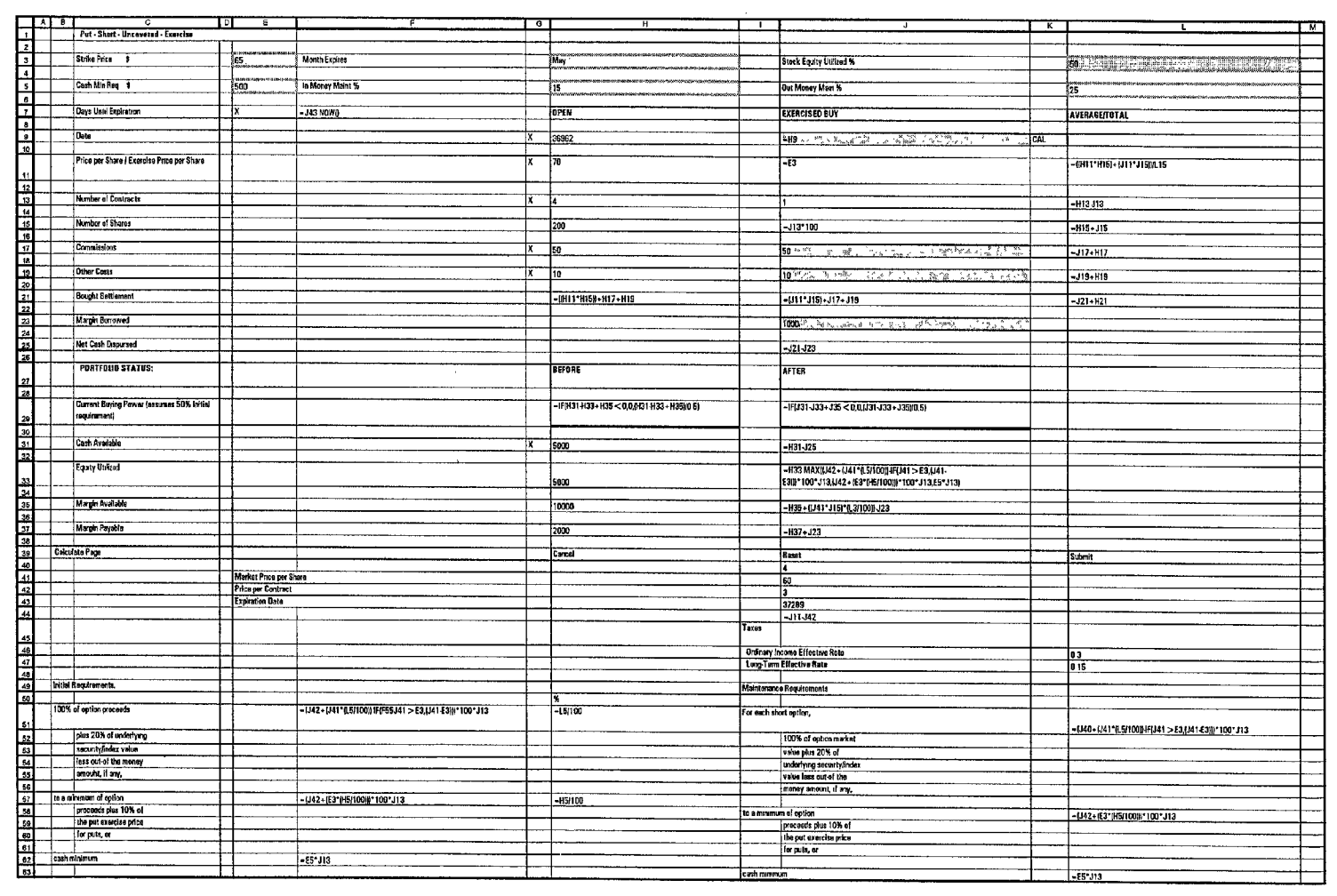

FIG. 27a shows a tradescreen for closing a covered short position in a put by exercising the put. FIG. 27b shows an Excel implementation of routines embedded in the tradescreen of FIG. 27a and FIG. 27c shows general ledger debit and credit entries for the transaction illustrated in FIG. 27a.

There are a number of notable differences between the exercise tradescreen of FIG. 27a and the offsetting transaction tradescreen of FIG. 26a. Rather than displaying the sold price of the contract and entering the bought price of the contract, the tradescreen of FIG. 27a shows the average price per share for shares long in the account (H20) and the strike (exercise) price of the put (J11). Similarly, rather than showing contracts sold and entering contracts bought in an offsetting transaction, the tradescreen shows contracts open (H13) and calculates contracts exercised (J13), and also shows the number of shares long in the account (H15) and calculates the number of shares represented by the exercised contracts (J15). The tradescreen of FIG. 27a also has a field for entering a stock equity utilized % (L3). The tradescreen of FIG. 27a does not calculate net sold receipts, net gain/(loss), net gain/(loss) %, or net annualized return. The tradescreen of FIG. 27a also calculates net cash disbursed (J25) as a result of the trade.

Figure 28B:
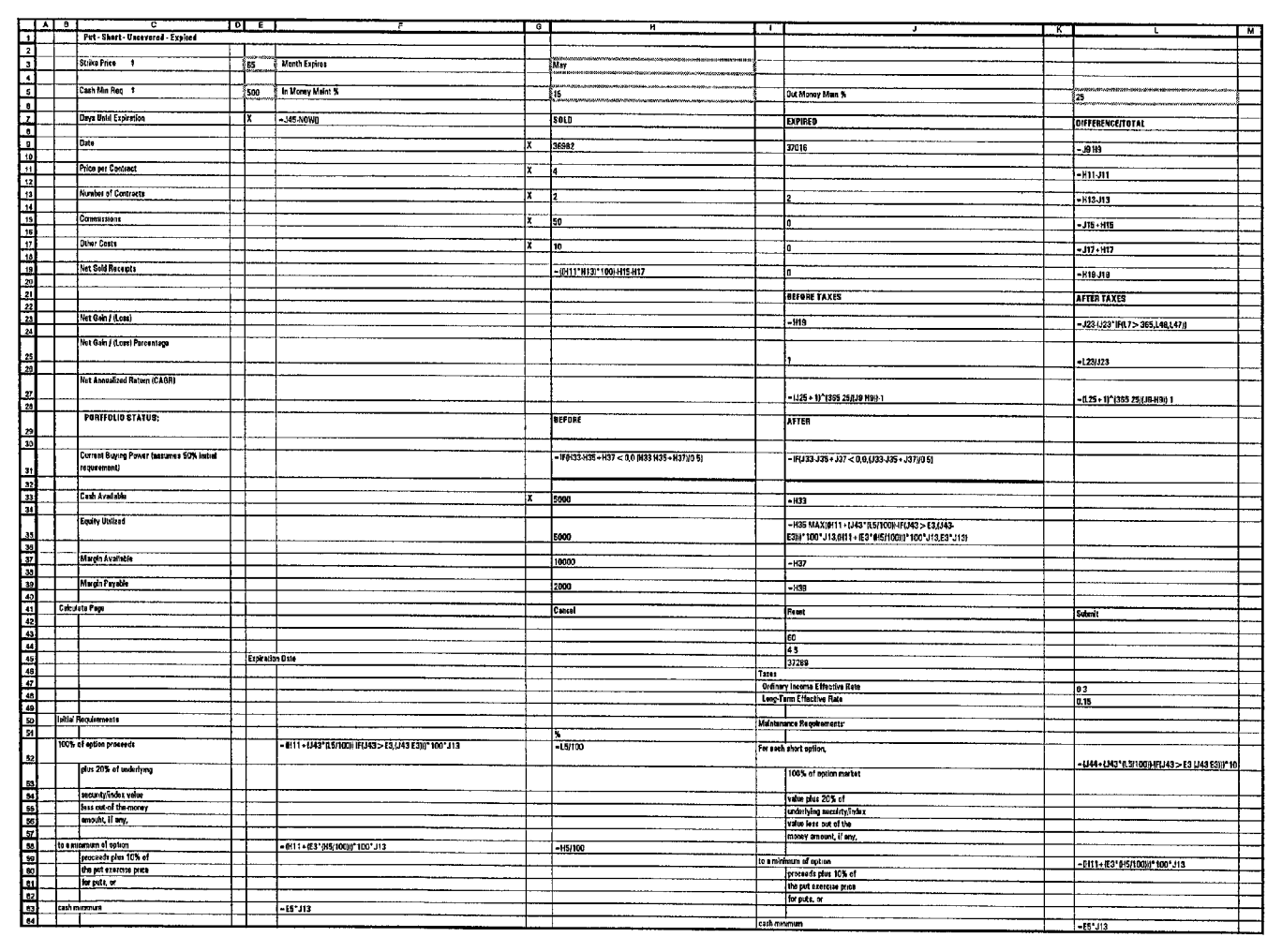

FIG. 28a shows a tradescreen for closing an uncovered short position in a put through expiration of the put. FIG. 28b shows an Excel implementation of routines embedded in the tradescreen of FIG. 28a and FIG. 28c shows general ledger debit and credit entries for the transaction illustrated in FIG. 28a.

There are a number of notable differences between the expiration tradescreen of FIG. 28a and the offsetting transaction tradescreen of FIG. 26a. Most notably, the expiration tradescreen does not have fields for entering information, since the fact of the expiration is the only new information needed to determine the effect of this occurrence using information previously recorded when the position was entered or transferred in to the portfolio. Also, the expiration tradescreen does not calculate quantities for bought settlement, margin borrowed, or cash disbursed.

Tradescreen for Opening Covered Short Positions in Call Options

Figure 29B:
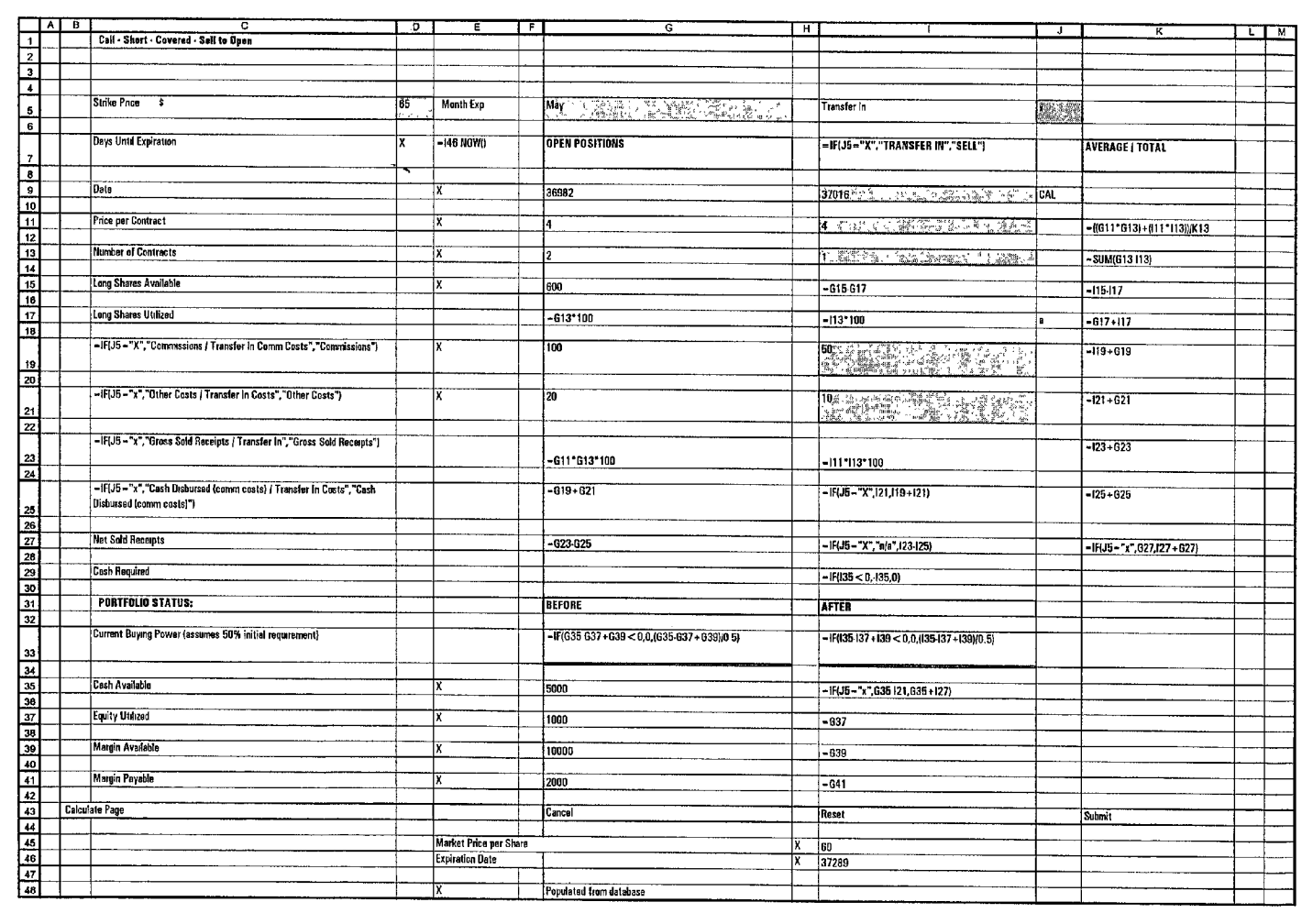

A tradescreen provided to a user for opening a covered short position in a call option is illustrated in FIG. 29a. The gray boxes of FIG. 29a are fields in which data may be entered by the user. An Excel implementation of the routines embedded in the tradescreen of FIG. 29a is illustrated in FIG. 29b. The fields of the tradescreen of FIG. 29a are provided with cell references for purposes of correlation with FIG. 29b. General ledger debit and credit entries for the transaction illustrated in FIG. 29a and for a transfer using the same numbers are shown in FIG. 29c. A version of the tradescreen for the case where the position is being transferred in is shown in FIG. 29d.

The operation of the tradescreens of FIGS. 29a and 29d is very similar to that of the tradescreens of FIGS. 21a and 21d for opening covered short positions in puts and may be understood by reference to the corresponding description.

Tradescreens for Closing Covered Short Positions in Call Options

Figure 30B:
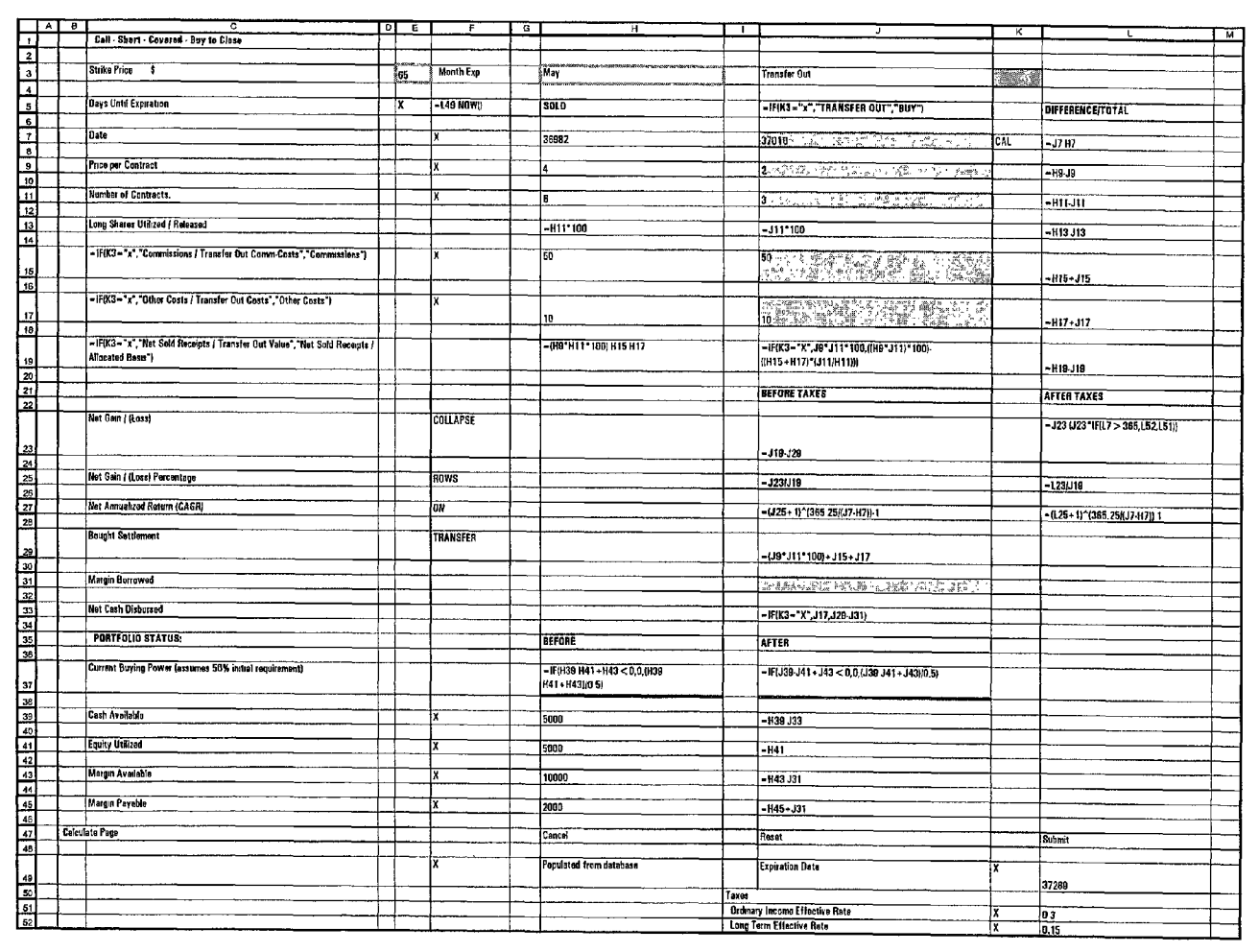

A tradescreen provided to a user for closing a covered short position in a call through an offsetting transaction is illustrated in FIG. 30a. The gray boxes of FIG. 30a are fields in which data may be entered by the user. An Excel implementation of the routines embedded in the tradescreen of FIG. 30a is illustrated in FIG. 30b. The fields of the tradescreen of FIG. 30a are provided with cell references for purposes of correlation with FIG. 30b. General ledger debit and credit entries for the transaction illustrated in FIG. 30a and for a transfer using the same numbers are shown in FIG. 30c. A version of the tradescreen for the case where the position is being transferred out is shown in FIG. 30d.

The operation of the tradescreens of FIGS. 30a and 30d is very similar to that of the tradescreens of FIGS. 22a and 22d for closing covered short positions in puts by an offsetting transaction and may be understood by reference to the corresponding description.

Figure 31B:
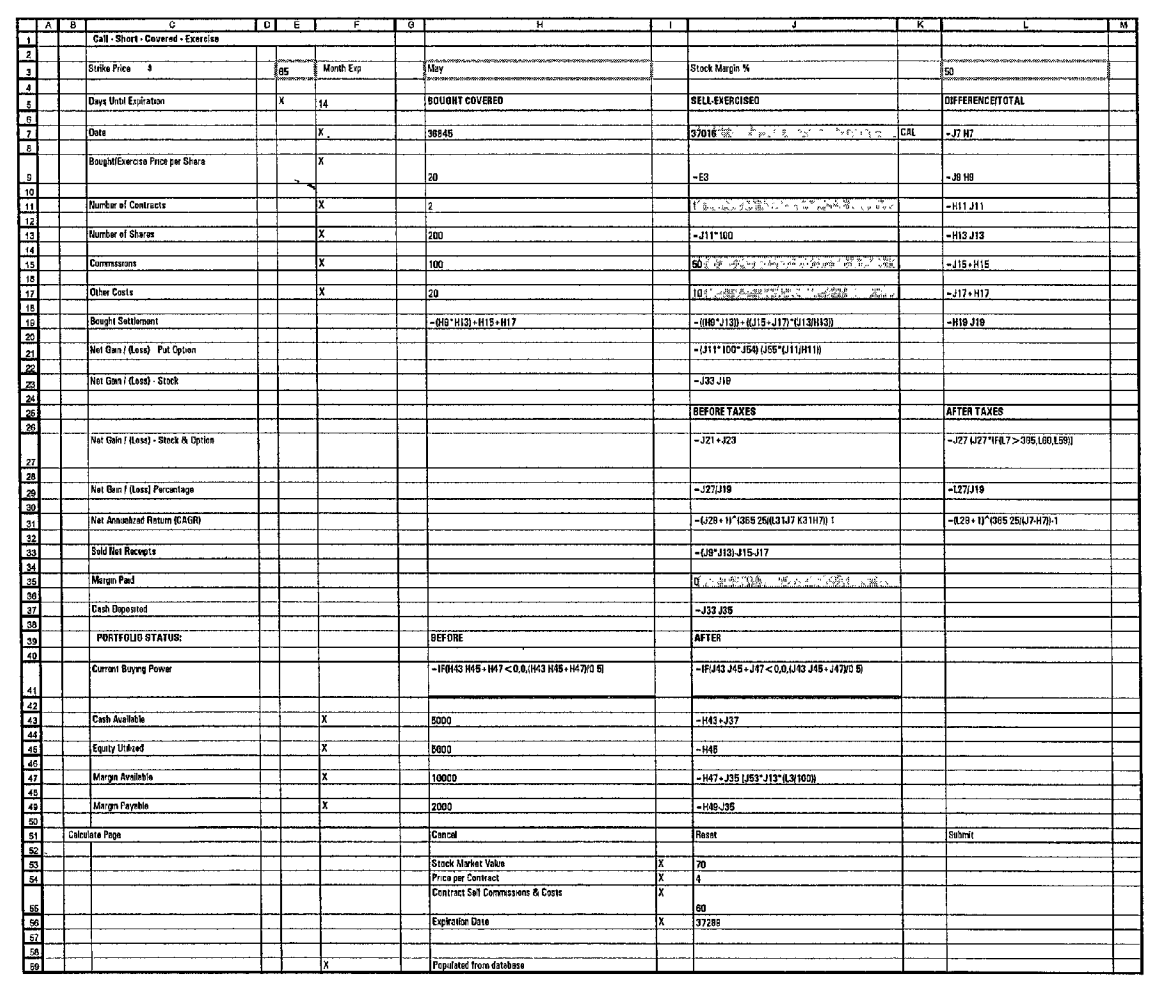

FIG. 31a shows a tradescreen for closing a covered short position in a call by exercising the call. FIG. 31b shows an Excel implementation of routines embedded in the tradescreen of FIG. 31a and FIG. 31c shows general ledger debit and credit entries for the transaction illustrated in FIG. 31a. The operation of the tradescreen of FIG. 31a is very similar to that of the tradescreen of FIG. 23a for closing covered short positions in puts by exercising the puts and may be understood by reference to the corresponding description.

FIG. 32a shows a tradescreen for closing a covered short position in a call through expiration of the call. FIG. 32b shows an Excel implementation of routines embedded in the tradescreen of FIG. 32a and FIG. 32c shows general ledger debit and credit entries for the transaction illustrated in FIG. 32a. The operation of the tradescreen of FIG. 32a is very similar to that of the tradescreen of FIG. 24a for closing uncovered short positions in puts by expiration of the puts and may be understood by reference to the corresponding description.

Tradescreen for Opening Uncovered Short Positions in Call Options

Figure 33B:
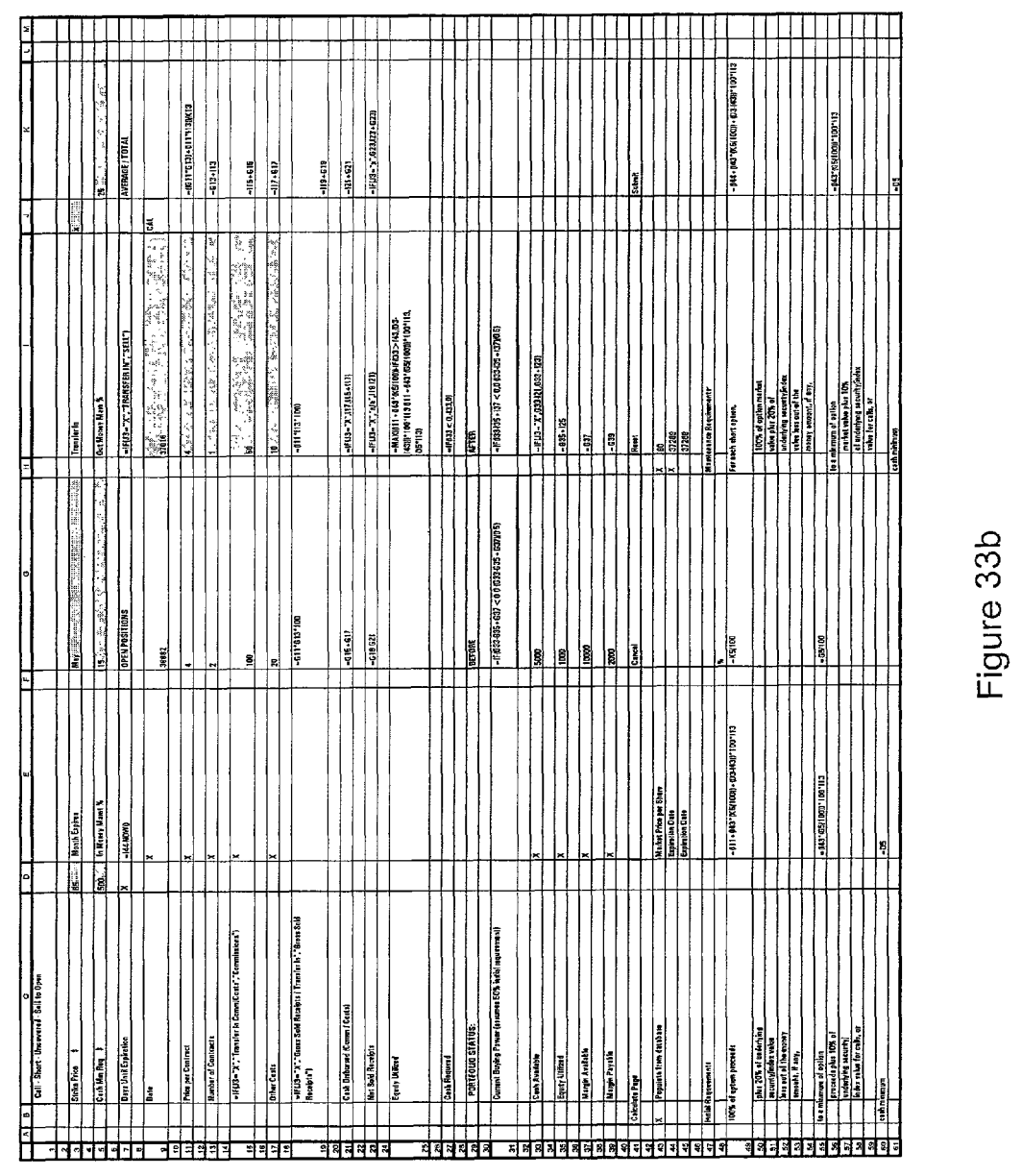

A tradescreen provided to a user for opening an uncovered short position in a call option is illustrated in FIG. 33a. The gray boxes of FIG. 33a are fields in which data may be entered by the user. An Excel implementation of the routines embedded in the tradescreen of FIG. 33a is illustrated in FIG. 33b. The fields of the tradescreen of FIG. 33a are provided with cell references for purposes of correlation with FIG. 33b. General ledger debit and credit entries for the transaction illustrated in FIG. 33a and for a transfer using the same numbers are shown in FIG. 33c. A version of the tradescreen for the case where the position is being transferred in is shown in FIG. 33d.

The operation of the tradescreens of FIGS. 33a and 33d is very similar to that of the tradescreens of FIGS. 25a and 25d for opening uncovered short positions in puts and may be understood by reference to the corresponding description.

Tradescreens for Closing Uncovered Short Positions in Call Options

Figure 34B:
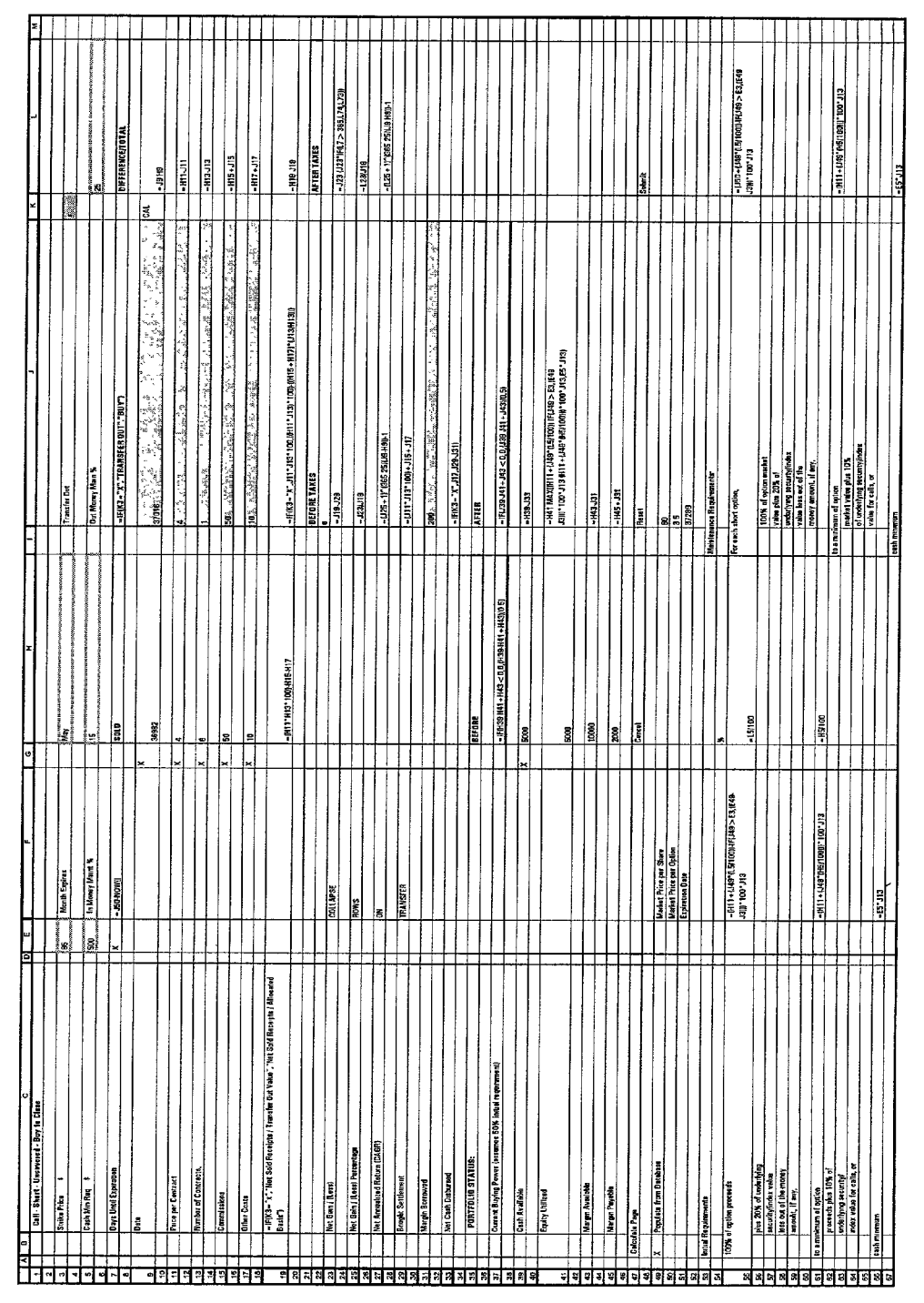

A tradescreen provided to a user for closing an uncovered short position in a call through an offsetting transaction is illustrated in FIG. 34a. The gray boxes of FIG. 34a are fields in which data may be entered by the user. An Excel implementation of the routines embedded in the tradescreen of FIG. 34a is illustrated in FIG. 34b. The fields of the tradescreen of FIG. 34a are provided with cell references for purposes of correlation with FIG. 34b. General ledger debit and credit entries for the transaction illustrated in FIG. 34a and for a transfer using the same numbers are shown in FIG. 34c. A version of the tradescreen for the case where the position is being transferred out is shown in FIG. 34d.

The operation of the tradescreens of FIGS. 34a and 34d is very similar to that of the tradescreens of FIGS. 26a and 26d for closing uncovered short positions in puts by an offsetting transaction and may be understood by reference to the corresponding description.

Figure 35B:
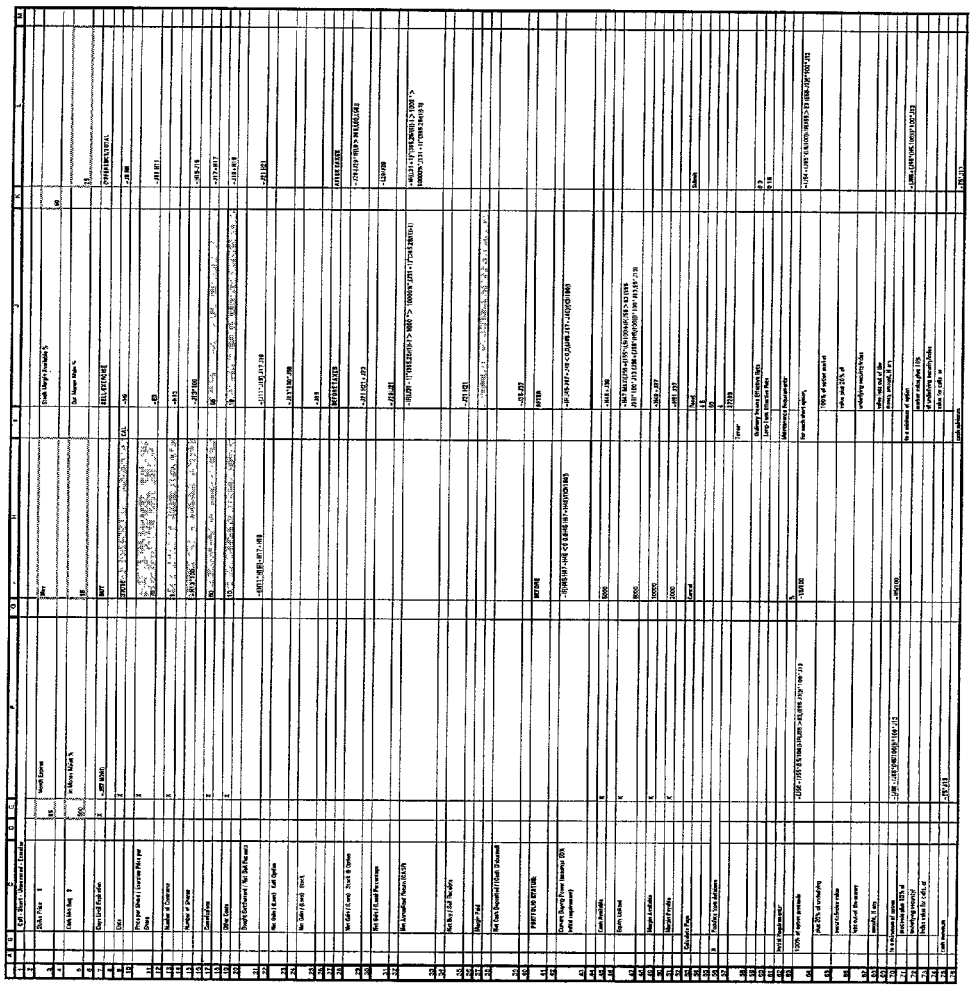

FIG. 35a shows a tradescreen for closing an uncovered short position in a call by exercising the call. FIG. 35b shows an Excel implementation of routines embedded in the tradescreen of FIG. 35a and FIG. 35c shows general ledger debit and credit entries for the transaction illustrated in FIG. 35a. The operation of the tradescreen of FIG. 35a is very similar to that of the tradescreen of FIG. 27a for closing uncovered short positions in puts by exercising the puts and may be understood by reference to the corresponding description.

Figure 36B:
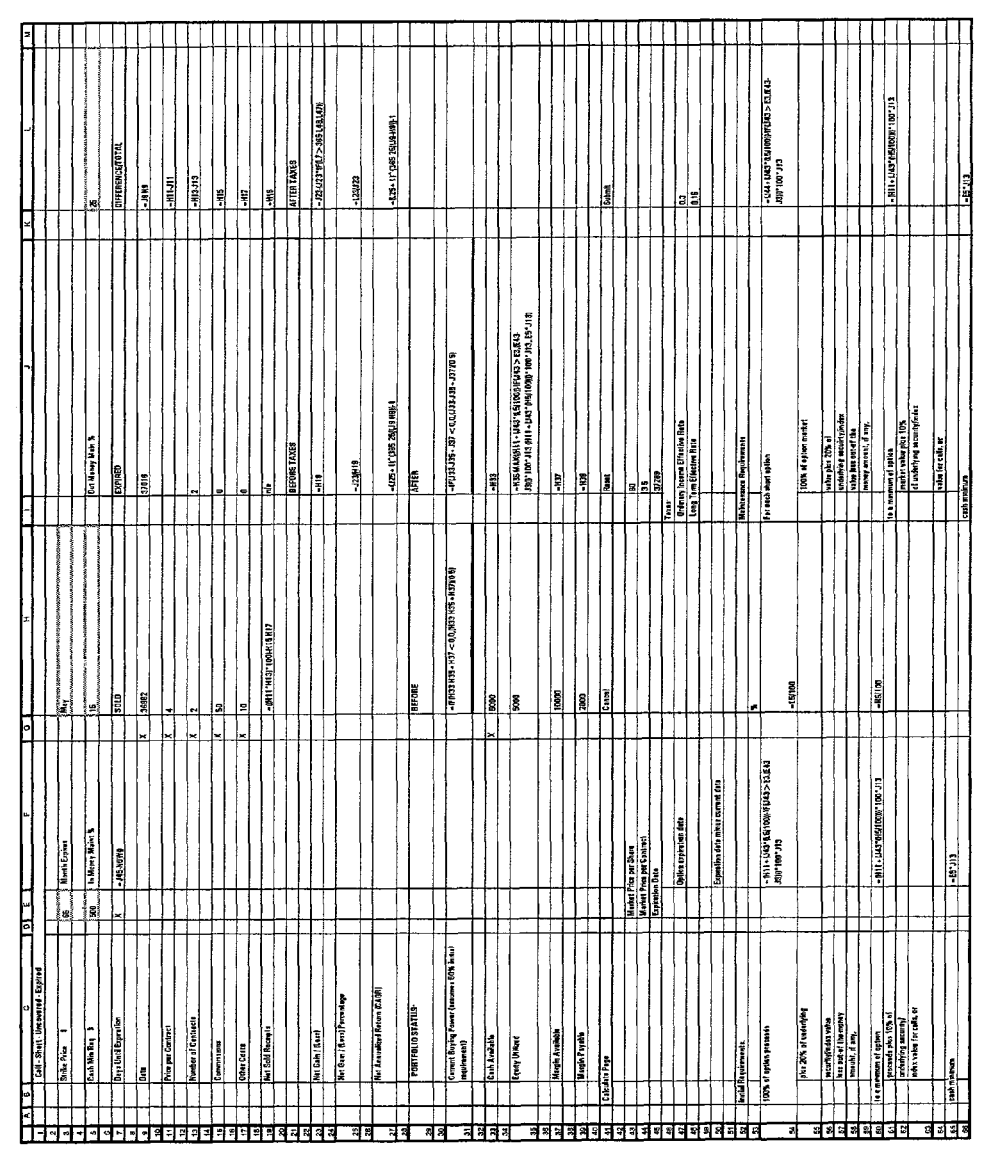

FIG. 36a shows a tradescreen for closing an uncovered short position in a call through expiration of the call. FIG. 36b shows an Excel implementation of routines embedded in the tradescreen of FIG. 36a and FIG. 36c shows general ledger debit and credit entries for the transaction illustrated in FIG. 36a. The operation of the tradescreen of FIG. 36a is very similar to that of the tradescreen of FIG. 28a for closing covered short positions in puts by expiration of the puts and may be understood by reference to the corresponding description.

Preferred Implementation Environments

The system described herein may be implemented in a number of environments, including an online trading system, a professional money manager (in-house) trading system, and a simulated (paper) trading system. It is preferable to tailor the features of open position tradescreens, close position tradescreens, and the security summary screen to the needs of the particular implementation environment. FIGS. 37a, 37b and 37c show tables describing the features preferably provided for open position tradescreens, close position tradescreens, and the security summary screen, respectively, for online, in-house and paper trading environments.

While the preferred embodiment described herein focus on securities and options transactions, alternative embodiments need not be limited to portfolios of these types of assets, but may be modified to encompass transactions in any other kind of tradable asset such as commodity and currency futures, debt instruments, commercial paper, or real property.

What is claimed is:

1. A method in a server of a financial instruments trading system comprising:
  maintaining a portfolio database in the server, the portfolio database including a portfolio of a user wherein the portfolio has current financial information for a plurality of holdings associated with the user;
  receiving a request for a tradescreen from the user, the request specifying a selected financial instrument and a type of action to be taken regarding the selected financial instrument;
  generating the tradescreen based on the portfolio database in the server, the tradescreen for displaying the current financial information for the portfolio, the tradescreen for calculating and displaying revised financial information for the portfolio, the tradescreen for entering proposed data comprising one of a proposed trade and a proposed transfer of the plurality of holdings of the user, the tradescreen for allowing the user to determine if the proposed data entered into the tradescreen would produce one of a first type of result and a second type of result;
  providing an interface on the tradescreen for enabling the user to submit a transaction corresponding to the proposed data entered into the tradescreen to update the portfolio database in the server with the revised financial information in an event the user determines that the proposed data would produce the first type of result; and updating the portfolio database in the server with the revised financial information upon the user submitting the transaction;

wherein the revised financial information for the portfolio of the user is based on the proposed data entered into the tradescreen and the current financial information for the portfolio of the user.

2. The method claimed in claim 1, wherein the executable tradescreen comprises:

financial information representing a current state of the portfolio;

financial information representing a current state of any holdings within the portfolio of the selected financial instrument;

fields for entry of data;

routines for calculating revised financial information representing a revised state of the portfolio reflecting changes that will occur if the transaction is executed; and routines for calculating revised financial information representing a revised state of the holdings within the portfolio of the selected financial instrument reflecting changes that will occur if the transaction is executed.

3. The method claimed in claim 1, wherein the tradescreen is customized to the selected financial instrument and a type of action to be taken.

4. The method claimed in claim 3, wherein the selected financial instrument is a stock and wherein the type of action to be taken is opening a long position in the stock.

5. The method claimed in claim 3, wherein the selected financial instrument is a stock and wherein the type of action to be taken is closing a long position in the stock.

6. The method claimed in claim 3, wherein the selected financial instrument is a stock and wherein the type of action to be taken is opening a short position in the stock.

7. The method claimed in claim 3, wherein the selected financial instrument is a stock and wherein the type of action to be taken is closing a short position in the stock.

8. The method claimed in claim 3, wherein the selected financial instrument is an option and wherein the type of action to be taken is opening a long position in the option.

9. The method claimed in claim 3, wherein the selected financial instrument is an option and wherein the type of action to be taken is closing a long position in the option by an offsetting transaction.

10. The method claimed in claim 3, wherein the selected financial instrument is an option and wherein the type of action to be taken is closing a long position in the option by exercising the option.

11. The method claimed in claim 3, wherein the selected financial instrument is an option and wherein the type of action to be taken is closing a long position in the option by expiration of the option.

12. The method claimed in claim 3, wherein the selected financial instrument is an option and wherein the type of action to be taken is opening a covered short position in the option.

13. The method claimed in claim 3, wherein the selected financial instrument is an option and wherein the type of action to be taken is closing a covered short position in the option by an offsetting transaction.

14. The method claimed in claim 3, wherein the selected financial instrument is an option and wherein the type of action to be taken is closing a covered short position in the option by exercising the option.

15. The method claimed in claim 3, wherein the selected financial instrument is an option and wherein the type of action to be taken is closing a covered short position in the option by expiration of the option.

16. The method of claim 1, wherein the portfolio is an investment portfolio comprising a financial position report, said financial position report produced by a method comprising:

obtaining single entry transaction data records for individual transactions of the investment portfolio;

receiving user input data representing a request for a financial position report for the investment portfolio;

calculating current double entry asset, liability and equity balances for the investment portfolio as a whole using the transaction data records and current prices for investments held in the investment portfolio, wherein the sum of the portfolio asset balances equals the sum of the portfolio liability balances and the portfolio equity balances, and wherein the liability balances include balances that reflect obligations that would result if all investments of the investment portfolio were liquidated at said current prices;

generating a financial position report for the portfolio that presents the asset, liability and equity balances of the portfolio in a double entry format, wherein at least some of the asset, liability and equity balances displayed in the financial position report are associated with hyperlinks to corresponding reports supporting the associated balances;

transmitting the financial position report to the user; and in response to receiving user input data representing user selection of one of said hyperlinks associated with one of said balances, transmitting a report to the user supporting the balance associated with the selected hyperlink.

17. The method of claim 1, wherein the exchange host is a live-market exchange host.

18. The method of claim 1, wherein providing an interface on the tradescreen comprises enabling the user to not submit the transaction corresponding to the proposed data entered into the tradescreen in an event the user determines that the proposed data would produce the second type of result.

19. The method of claim 1, wherein the first type of result comprises a result that is deemed appropriate by the user; and wherein the second type of result comprises a result that is deemed inappropriate by the user.

20. The method of claim 1, wherein receiving a request for a tradescreen from the user comprises receiving a request for a tradescreen from the user at the remote computer.

21. A method in a client of a financial instruments trading system comprising:

transmitting a request to a server for a tradescreen, the request specifying a selected financial instrument and a type of action to be taken;

receiving a tradescreen from the server, the tradescreen for displaying current financial information for a portfolio of a user comprising a plurality of holdings associated with the user, the tradescreen for calculating and displaying revised financial information for the portfolio, tradescreen for entering proposed data comprising one of a proposed trade and a proposed transfer of the plurality of holdings of the user, the tradescreen for allowing the user to determine if the proposed data entered into the tradescreen would produce one of a first type of result and a second type of result;

providing an interface on the tradescreen for enabling the user to submit a transaction corresponding to the proposed data entered into the tradescreen to update the portfolio database in the server with the revised financial information in an event the user determines that the proposed data would produce the first type of result; and updating the portfolio database in the server with the revised financial information upon the user submitting the transaction;

wherein the revised financial information for the portfolio of the user is based on the proposed data entered into the tradescreen and the current financial information for the portfolio of the user.

22. The method claimed in claim 21, wherein the executable tradescreen comprises:

financial information representing a current state of the portfolio;

financial information representing a current state of any holdings within the portfolio of the selected financial instrument;

routines for calculating revised financial information representing a revised state of the portfolio reflecting changes that will occur if the transaction is executed; and routines for calculating revised financial information representing a revised state of the holdings within the portfolio of the selected financial instrument reflecting changes that will occur the transaction is executed.

23. The method claimed in claim 21, wherein the tradescreen is customized to the selected financial instrument and a type of action to be taken.

24. The method claimed in claim 23, wherein the selected financial instrument is a stock and wherein the type of action to be taken is opening a long position in the stock.

25. The method claimed in claim 23, wherein the selected financial instrument is a stock and wherein the type of action to be taken is closing a long position in the stock.

26. The method claimed in claim 23, wherein the selected financial instrument is a stock and wherein the type of action to be taken is opening a short position in the stock.

27. The method claimed in claim 23, wherein the selected financial instrument is a stock and wherein the type of action to be taken is closing a short position in the stock.

28. The method claimed in claim 23, wherein the selected financial instrument is an option and wherein the type of action to be taken is opening a long position in the option.

29. The method claimed in claim 23, wherein the selected financial instrument is an option and wherein the type of action to be taken is closing a long position in the option by an offsetting transaction.

30. The method claimed in claim 23, wherein the selected financial instrument is an option and wherein the type of action to be taken is closing a long position in the option by exercising the option.

31. The method claimed in claim 23, wherein the selected financial instrument is an option and wherein the type of action to be taken is closing a long position in the option by expiration of the option.

32. The method claimed in claim 23, wherein the selected financial instrument is an option and wherein the type of action to be taken is opening a covered short position in the option.

33. The method claimed in claim 23, wherein the selected financial instrument is an option and wherein the type of action to be taken is closing a covered short position in the option by an offsetting transaction.

34. The method claimed in claim 23, wherein the selected financial instrument is an option and wherein the type of action to be taken is closing a covered short position in the option by exercising the option.

35. The method claimed in claim 23, wherein the selected financial instrument is an option and wherein the type of action to be taken is closing a covered short position in the option by expiration of the option.

36. The method of claim 21, wherein the portfolio is an investment portfolio comprising a financial position report, said financial position report produced by a method comprising:

obtaining single entry transaction data records for individual transactions of the investment portfolio;

receiving user input data representing a request for a financial position report for the investment portfolio;

calculating current double entry asset, liability and equity balances for the investment portfolio as a whole using the transaction data records and current prices for investments held in the investment portfolio, wherein the sum of the portfolio asset balances equals the sum of the portfolio liability balances and the portfolio equity balances, and wherein the liability balances include balances that reflect obligations that would result if all investments of the investment portfolio were liquidated at said current prices;

generating a financial position report for the portfolio that presents the asset, liability and equity balances of the portfolio in a double entry format, wherein at least some of the asset, liability and equity balances displayed in the financial position report are associated with hyperlinks to corresponding reports supporting the associated balances;

transmitting the financial position report to the user; and in response to receiving user input data representing user selection of one of said hyperlinks associated with one of said balances, transmitting a report to the user supporting the balance associated with the selected hyperlink.

37. The method of claim 21, wherein the exchange host is a live-market exchange host.

38. The method of claim 21, wherein providing an interface on the tradescreen comprises enabling the user to not submit the transaction corresponding to the proposed data entered into the tradescreen in an event the user determines that the proposed data would produce the second type of result.

39. The method of claim 21, wherein the first type of result comprises a result that is deemed appropriate by the user; and wherein the second type of result comprises a result that is deemed inappropriate by the user.

* * * * *